United States Patent
Kimura et al.

(10) Patent No.: US 10,230,095 B2
(45) Date of Patent: Mar. 12, 2019

(54) ELECTRODE, POWER STORAGE DEVICE, AND ELECTRONIC DEVICE

(71) Applicant: Semiconductor Energy Laboratory Co., LTD., Atsugi-shi, Kanagawa-ken (JP)

(72) Inventors: Kai Kimura, Kanagawa (JP); Tatsuya Ikenuma, Shizuoka (JP); Nobuhiro Inoue, Kanagawa (JP); Teppei Oguni, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 267 days.

(21) Appl. No.: 15/156,524

(22) Filed: May 17, 2016

(65) Prior Publication Data
US 2016/0344015 A1   Nov. 24, 2016

(30) Foreign Application Priority Data

May 19, 2015 (JP) ................................. 2015-102079
May 19, 2015 (JP) ................................. 2015-102080

(51) Int. Cl.
| | |
|---|---|
| *H01M 4/133* | (2010.01) |
| *H01M 4/36* | (2006.01) |
| *H01M 4/587* | (2010.01) |
| *H01M 4/62* | (2006.01) |

(Continued)

(52) U.S. Cl.
CPC ........... *H01M 4/133* (2013.01); *H01M 4/134* (2013.01); *H01M 4/386* (2013.01); *H01M 4/587* (2013.01);

(Continued)

(58) Field of Classification Search
None
See application file for complete search history.

(56) References Cited

U.S. PATENT DOCUMENTS

| | | |
|---|---|---|
| 9,196,906 B2 | 11/2015 | Kuriki et al. |
| 2005/0084760 A1 | 4/2005 | Hwang et al. |

(Continued)

FOREIGN PATENT DOCUMENTS

| | | |
|---|---|---|
| JP | 2005-108835 A | 4/2005 |
| JP | 2012-009414 A | 1/2012 |
| JP | 2013-214501 A | 10/2013 |

OTHER PUBLICATIONS

Nishida.T, "18.3.1 Crystal Structure at Various Charge/Discharge States", Lithium-Ion Batteries Science and Technologies, 2009, pp. 333-335, Springer.

*Primary Examiner* — Sarah A. Slifka
*Assistant Examiner* — Haroon S. Sheikh
(74) *Attorney, Agent, or Firm* — Nixon Peabody LLP; Jeffrey L. Costellia

(57) ABSTRACT

To provide a power storage device with a high capacity. To provide a power storage device with a high energy density. To provide a highly reliable power storage device. To provide a long-life power storage device. To provide an electrode with a high capacity. To provide an electrode with a high energy density. To provide a highly reliable electrode. To provide a long-life electrode. The power storage device includes a first electrode and a second electrode. The first electrode includes a first current collector and a first active material layer. The first active material layer includes a first active material and a first binder. The first active material is graphite. A separation strength F of the first electrode that is measured when the first active material layer is separated from the first current collector after the first electrode is immersed in a solution at a temperature higher than or equal to 20° C. and lower than or equal to 70° C. for longer than (Continued)

or equal to three hours is higher than or equal to 0.05 N/cm and lower than or equal to 5 N/cm per unit width of a sample that is separated.

15 Claims, 72 Drawing Sheets

(51) Int. Cl.
    *H01M 10/0525*     (2010.01)
    *H01M 4/134*     (2010.01)
    *H01M 4/38*     (2006.01)
    *H01M 10/052*     (2010.01)
    *H01M 4/02*     (2006.01)

(52) U.S. Cl.
    CPC ......... *H01M 4/622* (2013.01); *H01M 10/052* (2013.01); *H01M 10/0525* (2013.01); *H01M 4/366* (2013.01); *H01M 2004/021* (2013.01); *H01M 2220/20* (2013.01); *Y02E 60/122* (2013.01)

(56) References Cited

U.S. PATENT DOCUMENTS

| | | |
|---|---|---|
| 2006/0062717 A1 | 3/2006 | Tokuoka et al. |
| 2011/0266654 A1 | 11/2011 | Kuriki et al. |
| 2013/0236781 A1 | 9/2013 | Oguni et al. |
| 2014/0063719 A1 | 3/2014 | Yamazaki et al. |
| 2014/0342225 A1* | 11/2014 | Isshiki .................. H01M 4/139 429/217 |
| 2015/0111107 A1 | 4/2015 | Oguni et al. |

* cited by examiner

FIG. 37A
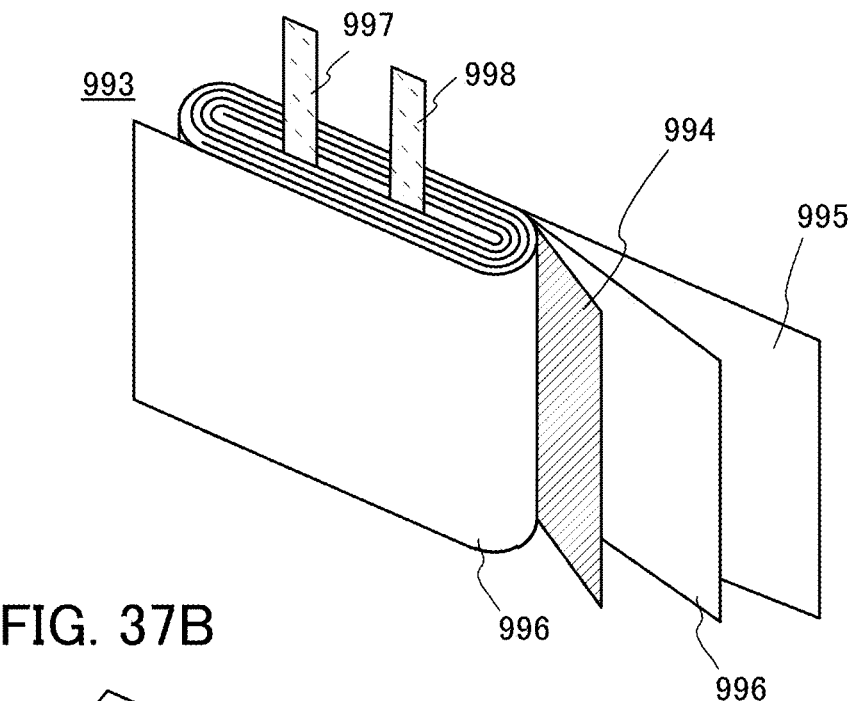
FIG. 37B
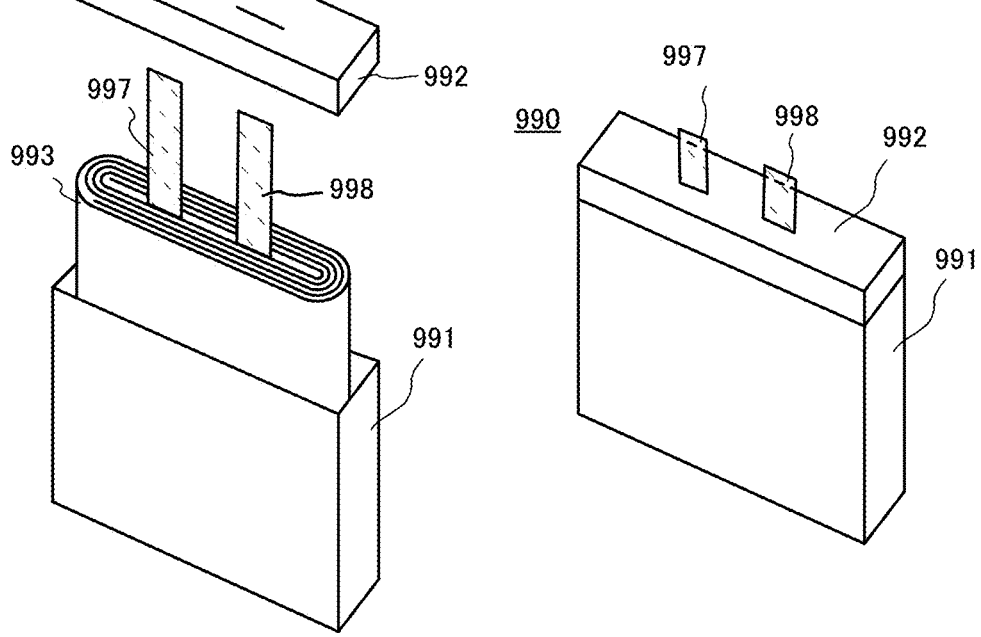
FIG. 37C

FIG. 39A1 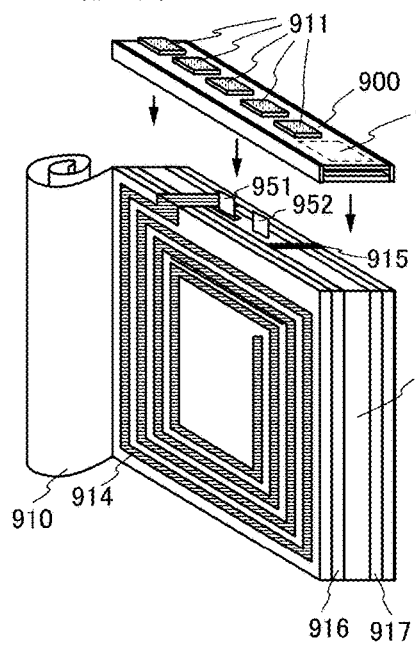
FIG. 39A2 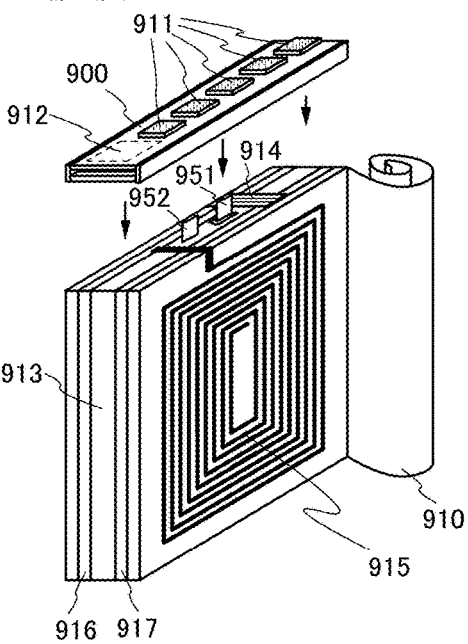
FIG. 39B1 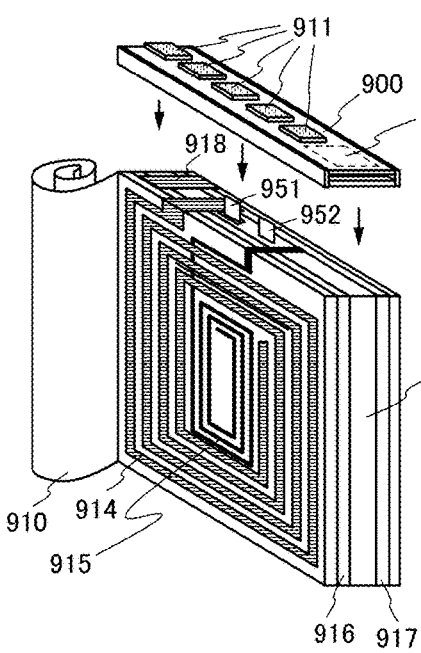
FIG. 39B2 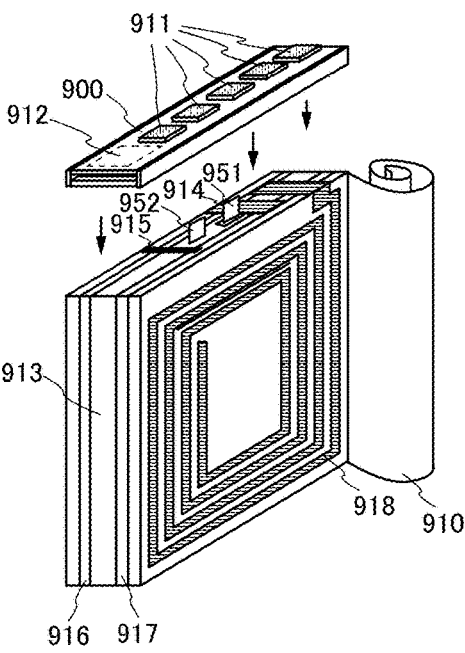

ELECTRODE, POWER STORAGE DEVICE, AND ELECTRONIC DEVICE

BACKGROUND OF THE INVENTION

1. Field of the Invention

The present invention relates to an object, a method, or a manufacturing method. The present invention relates to a process, a machine, manufacture, or a composition of matter. In particular, one embodiment of the present invention relates to a semiconductor device, a display device, a light-emitting device, a power storage device, a storage device, a driving method thereof, or a manufacturing method thereof. In particular, one embodiment of the present invention relates to a power storage device and a manufacturing method thereof.

Note that a power storage device in this specification refers to every element and/or device having a function of storing electric power.

2. Description of the Related Art

In recent years, a variety of power storage devices, for example, secondary batteries such as lithium-ion secondary batteries, lithium-ion capacitors, and air cells have been actively developed. In particular, demand for lithium-ion secondary batteries with a high output and a high energy density has rapidly grown with the development of the semiconductor industry, for electronic devices, for example, portable information terminals such as mobile phones, smartphones, and laptop computers, portable music players, and digital cameras; medical equipment; next-generation clean energy vehicles such as hybrid electric vehicles (HEVs), electric vehicles (EVs), and plug-in hybrid electric vehicles (PHEVs); and the like. The lithium-ion secondary batteries are essential as rechargeable energy supply sources for today's information society.

To enhance the performance of power storage devices, it is important to increase the capacity of the power storage devices and improve the reliability thereof. Patent Document 1 discloses an example of an electrode of a power storage device.

In a power storage device that utilizes the reaction of carrier ions, such as a lithium-ion battery, the volume of an active material might be changed by charge and discharge operations. For example, it is known that the interlayer distance of graphite increases from 0.336 nm to 0.370 nm as disclosed in Non-patent Document 1 (see Non-Patent Document 1, pp. 333-334).

Furthermore, as disclosed in Patent Document 2, for example, the shape or volume of an alloy-based material such as silicon might be changed by repeated charge and discharge cycles.

REFERENCE

[Patent Document 1] Japanese Published Patent Application No. 2012-009414
[Patent Document 2] Japanese Published Patent Application No. 2013-214501
[Non-Patent Document 1] Masaki Yoshio et al., "Lithium-Ion Batteries Science and Technologies", Springer, chapter 16, pp. 333-334

SUMMARY OF THE INVENTION

An object of one embodiment of the present invention is to provide a power storage device with a high capacity. Another object of one embodiment of the present invention is to provide a power storage device with a high energy density. Another object of one embodiment of the present invention is to provide a highly reliable power storage device. Another object of one embodiment of the present invention is to provide a long-life power storage device.

Another object of one embodiment of the present invention is to provide an electrode with a high capacity. Another object of one embodiment of the present invention is to provide an electrode with a high energy density. Another object of one embodiment of the present invention is to provide a highly reliable electrode. Another object of one embodiment of the present invention is to provide a long-life electrode.

Another object of one embodiment of the present invention is to provide a flexible power storage device. Another object of one embodiment of the present invention is to provide a novel power storage device, a novel electrode, or the like.

Note that the description of these objects do not disturb the existence of other objects. In one embodiment of the present invention, there is no need to achieve all the objects. Other objects will be apparent from and can be derived from the description of the specification, the drawings, the claims, and the like.

One embodiment of the present invention is an electrode including an active material and a first layer. The first layer contains carbon and oxygen. The first layer contains unsaturated bonds. The first layer includes a first region and a second region. The second region is located on the active material. The first region is located on the second region. The concentration of the unsaturated bonds contained in the second region is lower than the concentration of the unsaturated bonds contained in the first region. Here, the unsaturated bonds and osmium tetroxide are preferably reacted with each other so that osmium is added to the first layer.

Another embodiment of the present invention is an electrode including an active material and a first layer. The first layer includes a first region and a second region. The first layer includes a first material. The first material is a diene-based polymer. The second region is located on the active material. The first region is located on the second region. The concentration of the first material included in the first region is higher than the concentration of the first material included in the second region.

In the above structure, it is preferred that the first material contain carbon and oxygen and the value obtained by dividing the amount by mole of the unsaturated bonds contained in the first material by the sum of the number of the carbon atoms and the oxygen atoms be larger in the first region than in the second region. Furthermore, in the above structure, it is preferred that the value obtained by dividing the amount by mole of the unsaturated bonds contained in the first material by the sum of the number of the carbon atoms and oxygen atoms in the first region be twice or more and 100 times or less, more preferably 3 times or more and 50 times or less, still more preferably 5 times or more and 30 times or less as large as that in the second region. Furthermore, in the above structure, the first layer preferably has a thickness larger than or equal to 1 nm and smaller than or equal to 150 nm.

Furthermore, in the above structure, the first region and the second region may each have the shape of a layer. For example, the first region and the second region can also be referred to as a second layer and a third layer, respectively.

Furthermore, in the above structure, the first layer preferably includes a second material that is at least one of the following: carboxymethyl cellulose, methyl cellulose, ethyl cellulose, hydroxypropyl cellulose, and diacetyl cellulose.

Another embodiment of the present invention is a power storage device including the electrode described in any of the above.

Another embodiment of the present invention is a power storage device including a first electrode and a second electrode. The first electrode includes a first current collector and a first active material layer. The first active material layer includes a first active material and a first binder. The first active material is graphite. A separation strength F of the first electrode that is measured when the first active material layer is separated from the first current collector after the first electrode is immersed in a solution at a temperature higher than or equal to 20° C. and lower than or equal to 70° C. for longer than or equal to three hours is higher than or equal to 0.05 N/cm and lower than or equal to 5 N/cm per unit width of a sample that is separated.

In the above structure, the specific surface area of graphite is preferably larger than or equal to 0.2 $m^2/g$ and smaller than or equal to 4 $m^2/g$.

In the above structure, graphite preferably has a spherical shape or is preferably spherical graphite.

In the above structure, it is preferred that the first binder include a first material and a second material, the first material include a diene-based rubber material, and the second material include a cellulose derivative.

Another embodiment of the present invention is a power storage device including a first electrode and a second electrode. The first electrode includes a first current collector and a first active material layer. The first active material layer includes a first active material and a first binder. The first active material contains silicon. A separation strength F of the first electrode that is measured when the first active material layer is separated from the first current collector is higher than or equal to 0.5 N/cm and lower than or equal to 10 N/cm per unit width of a sample that is separated.

Another embodiment of the present invention is a power storage device including a first electrode and a second electrode. The first electrode includes a first current collector and a first active material layer. The first active material layer includes a first active material and a first binder. A variation $\Delta S$ in the thickness of the first active material layer by charge and discharge operations of the power storage device is greater than or equal to 5% and less than or equal to 200% of the smallest thickness of the first active material layer. A separation strength F of the first electrode that is measured when the first active material layer is separated from the first current collector is higher than or equal to 0.5 N/cm and lower than or equal to 10 N/cm per unit width of a sample that is separated.

One embodiment of the present invention is a power storage device including a first electrode and a second electrode. The first electrode includes a first current collector and a first active material layer. The first active material layer includes a first active material and a first binder. The first active material contains silicon. A separation strength F of the first electrode that is measured when the first active material layer is separated from the first current collector after the first electrode is immersed in a solution at a temperature higher than or equal to 20° C. and lower than or equal to 70° C. for longer than or equal to three hours is higher than or equal to 0.5 N/cm and lower than or equal to 10 N/cm per unit width of a sample that is separated.

Another embodiment of the present invention is a power storage device including a first electrode and a second electrode. The first electrode includes a first current collector and a first active material layer. The first active material layer includes a first active material and a first binder. A variation $\Delta S$ in the thickness of the first active material layer by charge and discharge operations of the power storage device is greater than or equal to 25% and less than or equal to 200% of the smallest thickness of the first active material layer. A separation strength F of the first electrode that is measured when the first active material layer is separated from the first current collector after the first electrode is immersed in a solution at a temperature higher than or equal to 20° C. and lower than or equal to 70° C. for longer than or equal to three hours is higher than or equal to 0.5 N/cm and lower than or equal to 10 N/cm per unit width of a sample that is separated.

In the above structure, a solvent in the solution preferably contains at least one of the following: ethylene carbonate, propylene carbonate, butylene carbonate, chloroethylene carbonate, vinylene carbonate, γ-butyrolactone, γ-valerolactone, dimethyl carbonate, diethyl carbonate, ethyl methyl carbonate, methyl formate, methyl acetate, methyl butyrate, 1,3-dioxane, 1,4-dioxane, dimethoxyethane, dimethyl sulfoxide, diethyl ether, methyl diglyme, acetonitrile, benzonitrile, tetrahydrofuran, sulfolane, and sultone.

In the above structure, the power storage device preferably contains an electrolytic solution including the above-described solvent in the solution.

In the above structure, it is preferred that the power storage device be capable of being repeatedly bent, the power storage device include a second electrode, the second electrode include a second active material, the first active material be a negative electrode active material, and the second active material be a positive electrode active material.

In the above structure, it is preferred that $\Delta T$, which represents a variation in the volume of the second active material by charge and discharge operations of the power storage device, be less than $\Delta S$.

In the above structure, it is preferred that the variation $\Delta T$ in the volume of the second active material by charge and discharge operations of the power storage device be 10% or less of the smallest volume of the second active material.

In the above structure, it is preferred that the power storage device include a plurality of stacked first electrodes, each of the first electrodes include a current collector and an active material layer, the active material layer include a first active material and a binder, the current collector include a first surface and a second surface opposite to the first surface, the current collector be capable of being bent along a curved surface, the first surface and the second surface be on an inner side and an outer side of the curved surface, at least one of the active material layers included in the plurality of first electrodes be provided only on the first surface.

Another embodiment of the present invention is an electronic device including the power storage device described in any of the above.

According to one embodiment of the present invention, a power storage device with a high capacity can be provided. According to another embodiment of the present invention, a power storage device with a high energy density can be provided. According to one embodiment of the present invention, a highly reliable power storage device can be provided. According to one embodiment of the present invention, a power storage device with a long lifetime can be provided.

One embodiment of the present invention can provide an electrode with a high capacity. One embodiment of the present invention can provide an electrode with a high energy density. One embodiment of the present invention can provide a highly reliable electrode. One embodiment of the present invention can provide a long-life electrode.

One embodiment of the present invention can provide a flexible power storage device. One embodiment of the present invention can provide a novel power storage device, a novel electrode, or the like.

Note that the description of these effects does not disturb the existence of other effects. One embodiment of the present invention does not necessarily have all the effects listed above. Other effects will be apparent from and can be derived from the description of the specification, the drawings, the claims, and the like.

BRIEF DESCRIPTION OF THE DRAWINGS

In the accompanying drawings:

FIGS. 37A to 37C illustrate an example of a power storage device;
FIGS. 39A1, 39A2, 39B1, and 39B2 illustrate examples of power storage devices.

DETAILED DESCRIPTION OF THE INVENTION

Figure 1:
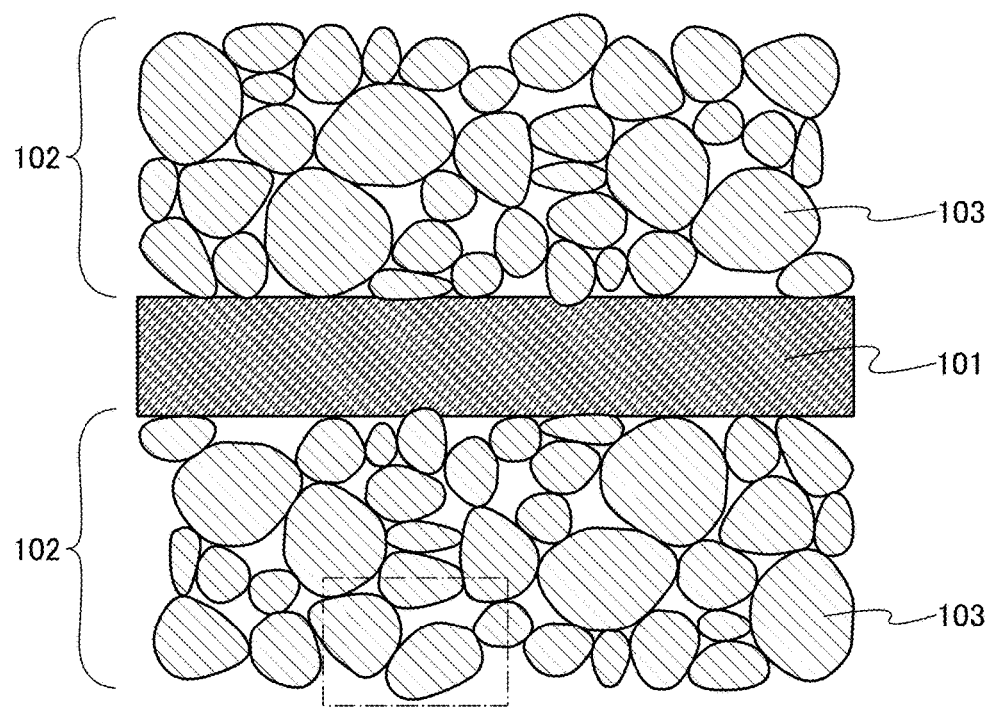
FIG. 1 is a cross-sectional view of an electrode.

Hereinafter, embodiments and examples of the present invention will be described in detail with reference to the accompanying drawings. However, the present invention is not limited to the description of the embodiments and examples and it is easily understood by those skilled in the art that the mode and details can be changed variously. Accordingly, the present invention should not be interpreted as being limited to the description of the embodiments below.

Note that in drawings used in this specification, the sizes, thicknesses, and the like of components such as films, layers, substrates, regions are exaggerated for simplicity in some cases. Therefore, the sizes of the components are not limited to the sizes in the drawings and relative sizes between the components.

Note that the ordinal numbers such as "first" and "second" in this specification and the like are used for convenience and do not denote the order of steps, the stacking order of layers, or the like. Therefore, for example, description can be made even when "first" is replaced with "second" or "third", as appropriate. In addition, the ordinal numbers in this specification and the like are not necessarily the same as those which specify one embodiment of the present invention.

Note that in structures of the present invention described in this specification and the like, the same portions or portions having similar functions are denoted by common reference numerals in different drawings, and descriptions thereof are not repeated. Further, the same hatching pattern is applied to portions having similar functions, and the portions are not especially denoted by reference numerals in some cases.

Note that in this specification and the like, a positive electrode and a negative electrode for a power storage device may be collectively referred to as a power storage device electrode; in this case, the power storage device electrode refers to at least one of the positive electrode and the negative electrode for the power storage device.

Here, a charge rate and a discharge rate of a power storage battery will be described. For example, in the case of charging a secondary battery with a certain capacity [Ah] at a constant current, a charge rate of 1 C means the current value I [A] with which charging is terminated in exactly 1 h, and a charge rate of 0.2 C means I/5 [A] (i.e., the current value with which charging is terminated in exactly 5 h). Similarly, a discharge rate of 1 C means the current value I [A] with which discharging is ended in exactly 1 h, and a discharge rate of 0.2 C means I/5 [A] (i.e., the current value with which discharging is ended in exactly 5 h).

Embodiment 1

In this embodiment, an electrode of one embodiment of the present invention will be described.

To increase the lifetime of a power storage device such as a lithium-ion battery, it is important to inhibit deterioration of components of the power storage device, such as electrodes, through repeated charge and discharge cycles.

Increased lifetime of a power storage device can reduce the frequency of battery changes and improve the convenience and reliability of a device provided with the power storage device. For example, a power storage device preferably has a lifetime of five or more years. Alternatively, a power storage device preferably has a lifetime long enough to withstand 1800 or more charges and discharge cycles.

In view of the use in a motor vehicle or outdoor use, a power storage device is preferably capable of operating at a wider range of temperatures. For example, the power storage device is preferably capable of operating stably even at a temperature over 45° C.

An electrode used in a power storage device such as a lithium-ion battery includes active materials. Most active materials expand and contract by charge and discharge operations.

Here, the case where an electrode includes a current collector and an active material layer on the current collector will be described. The active material layer includes an active material. The active material layer may further include a binder and a conductive additive.

Expansion and contraction of the active material in charging and discharging reduce the adhesion between the current collector and the active material layer in some cases. Furthermore, in the active material layer, the adhesion between active materials, between the active material and the conductive additive, or between the active material and a binder decreases in some cases. Here, the term "high strength of the electrode" means high adhesion between the current collector and the active material layer or high adhesion between components of the active material layer, in some cases.

Furthermore, the power storage device includes an electrolyte. The electrolyte can be either solid or liquid.

In the case where a liquid electrolyte (hereinafter referred to as an electrolytic solution) is used as the electrolyte, at least part of the active material, the conductive additive, and the binder, for example, included in the electrode of the power storage device is immersed in the electrolytic solution.

The term "immersed" means the state where something is in contact with the electrolytic solution or the state where something is in contact with the electrolytic solution for a certain period.

Note that in the case where the electrolytic solution contains a salt and a solvent, the salt contained in the electrolytic solution may be referred to as an electrolyte.

In the case where the active material, the conductive additive, the binder, and the like are immersed in the electrolytic solution, the volume of them is changed by the immersion in some cases. For example, immersing them in the electrolytic solution increases the volume thereof in some cases. The expansion of the active material, the conductive additive, the binder, and the like makes the contact between the current collector and the active material layer poor in some cases. Furthermore, the adhesion between the active materials, between the active material and the conductive additive, or between the active material and the binder, for example, decreases in some cases.

Moreover, in the case where the active material, the conductive additive, the binder, and the like are immersed in the electrolytic solution, the physical properties thereof such as the binding property, the state of atomic bonds, a functional group in a surface, and the composition are changed by the immersion in some cases. When the active material, the conductive additive, the binder, and the like include a polymer material, the polymerization degree, the molecular weight, or the like of the polymer changes in some cases. Such a change in the physical properties might lower the strength of the electrode.

In view of the above, it is important to increase the strength of an electrode that has been immersed in an electrolytic solution, in order to increase the lifetime of a power storage device.

Furthermore, a power storage device is desired to be mounted on a wearable device. The wearable device is preferably capable of being changed in form so as to conform to a body part on which it is worn. The power storage device is preferably capable of being changed in form when the form of the wearable device is changed, in which case the flexibility of the position where the power storage device is provided in the wearable device or on a surface of the wearable device, for example, is increased in some cases.

The power storage device mounted on the wearable device is changed in form by an external force applied when the wearable device is changed in form, in some cases. The electrode is curved when the power storage device is changed in form, which might make the contact between the active materials, between the active material and the conductive additive, or between the active material and the binder, for example, poor.

Thus, it is very important to inhibit a decrease in the adhesion of components in the electrode in the power storage device or the like mounted on the wearable device when the electrode is curved particularly after it is immersed in the electrolytic solution. It is also very important to increase the strength of the electrode in the power storage device or the like mounted on the wearable device.

In addition, for example, active materials with the same volume and different shapes will be described. An active material having a spherical shape can have a smaller surface area per unit volume than active materials having shapes other than a spherical shape in some cases. The surface area is preferably small in some cases because the area of contact between the active material and the electrolytic solution can be small and a side reaction between the active material and the electrolytic solution can be inhibited. However, active materials having a spherical shape have difficulty in being in contact with each other, for example, difficulty in taking contacts.

Thus, in the case where the active material is spherical, increasing the strength of the electrode is very important. In addition, in the case where the active material with a small surface area is used, increasing the strength of the electrode is very important.

The term "spherical" in this specification means having a substantially circular cross section, for example. Alternatively, the term "spherical" means that the corner of the cross section is rounded and the aspect ratio is smaller than or equal to 2, for example. The term "aspect ratio" refers to the value obtained by dividing the vertical length or the horizontal length of the cross section that is larger than the other by the smaller length.

In a power storage device using the redox reaction of carrier ions, such as a lithium-ion battery, insertion and extraction of carrier ions to and from an active material and an alloying reaction and a dealloying reaction with a metal to be carrier ions occur by charge and discharge operations.

Here, in the case where the electric resistance of the electrode of a power storage device is high, overvoltage is generated, so that a reaction caused by overvoltage occurs in the surface of the active material, for example, in some cases. For example, the reaction potential of a negative electrode is low in many cases, and when the electric resistance of the negative electrode is high, a metal to be carrier ions might be deposited on a surface of an active material, for example. For this reason, the resistance of the electrode of a power storage device is preferably low.

Furthermore, in or after expansion of an active material by charge, the contact between components of the electrode might become poor, for example. In such a case, carrier ions inserted or received in charging cannot be extracted from the active material and remain in the active material after discharging in some cases. The carrier ions remaining in the active material might reduce the capacity of a power storage device and thus are disadvantageous.

The carrier ions remaining in the active material can be measured by elementary analysis, for example. Examples of elementary analysis methods include inductively coupled plasma mass spectrometry (ICP-MS) and X-ray photoelectron spectroscopy (XPS).

It is preferred that the adhesion between the current collector and the active material layer be increased, for example, to lower the resistance of the electrode of a power storage device.

Alternatively, it is preferred that the contact between the active materials be improved and the area of contact between the active material and the conductive additive be increased in order to lower the resistance of the electrode of a power storage device. Here, to improve the contact between the active materials, dispersibility of the binder and the active material is preferably improved. Furthermore, to increase the area of contact between the active material and the conductive additive, dispersibility of the active material and the conductive additive is preferably improved. Here, the term "to improve dispersibility" means that objects are mixed well with each other.

The electrode of one embodiment of the present invention preferably has high strength. In the electrode of a power storage device that is one embodiment of the present invention, the adhesion between the current collector and the active material layer is preferably high. Furthermore, in the electrode of a power storage device that is one embodiment of the present invention, dispersibility of components in the active material layer is preferably high. For example, dispersibility of the active material, the conductive additive, and the binder is preferably high.

The power storage device of one embodiment of the present invention includes electrodes and an electrolytic solution, and the strengths of the electrodes immersed in the electrolytic solution are preferably high.

Here, dispersibilty of components of the active material layer in the electrode can be measured by any of a variety of methods. For example, observation with a scanning electron microscope (SEM) can be employed for the measurement in some cases. Alternatively, observation with a transmission electron microscope (TEM) can be employed for the measurement in some cases. In observation with a SEM or a TEM, for example, a cross section of the electrode is preferably processed and observed.

Alternatively, any of elementary analysis methods is preferably employed. For example, energy dispersive X-ray spectroscopy (EDX), electron energy-loss spectroscopy (EELS), or electron probe micro analysis (EPMA) can be employed. A material having unsaturated bonds can be subjected to elementary analysis after the material is reacted with osmium tetroxide so that osmium is added to the material.

FIG. 1 is a cross-sectional view of an electrode. The electrode includes the current collector 101 and the active material layer 102 on the current collector 101. The active material layer 102 includes active material particles 103 and a binder 104. The active material layer 102 preferably includes a conductive additive (not illustrated).

Figure 2A:
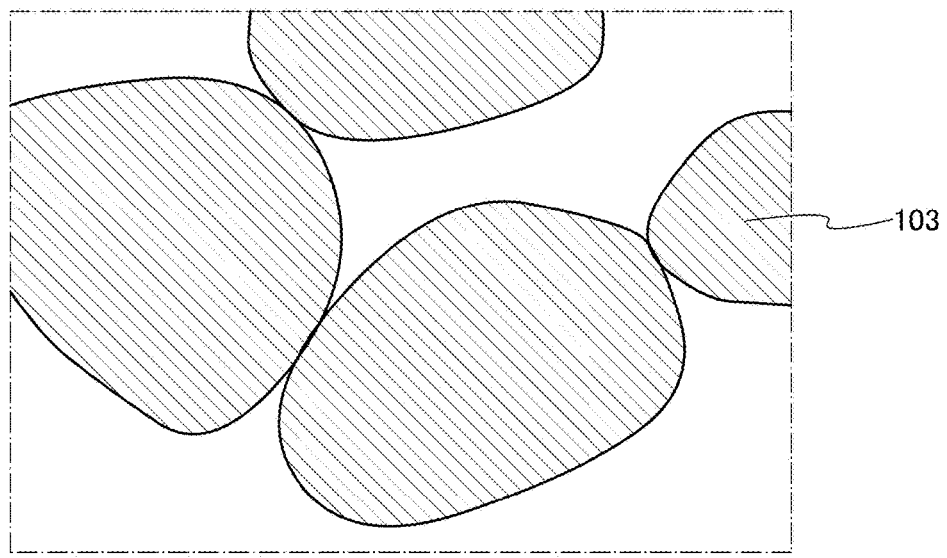
FIGS. 2A and 2B are each a cross-sectional view of an electrode.

FIGS. 2A and 2B and FIGS. 3A and 3B are enlarged views illustrating a region surrounded by the dashed dotted line in FIG. 1. In FIG. 2A, the binder 104 is not illustrated.

Figure 2B:
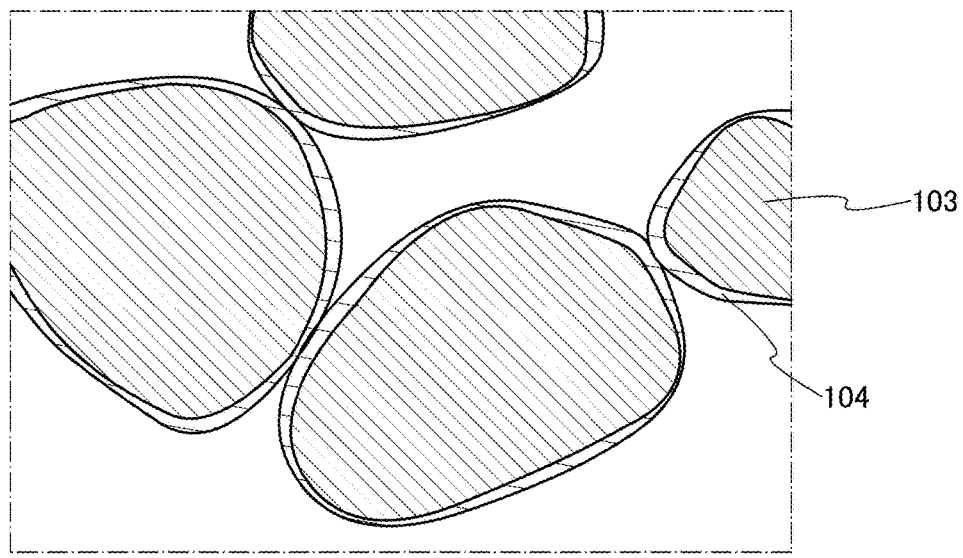
Figure 3A:
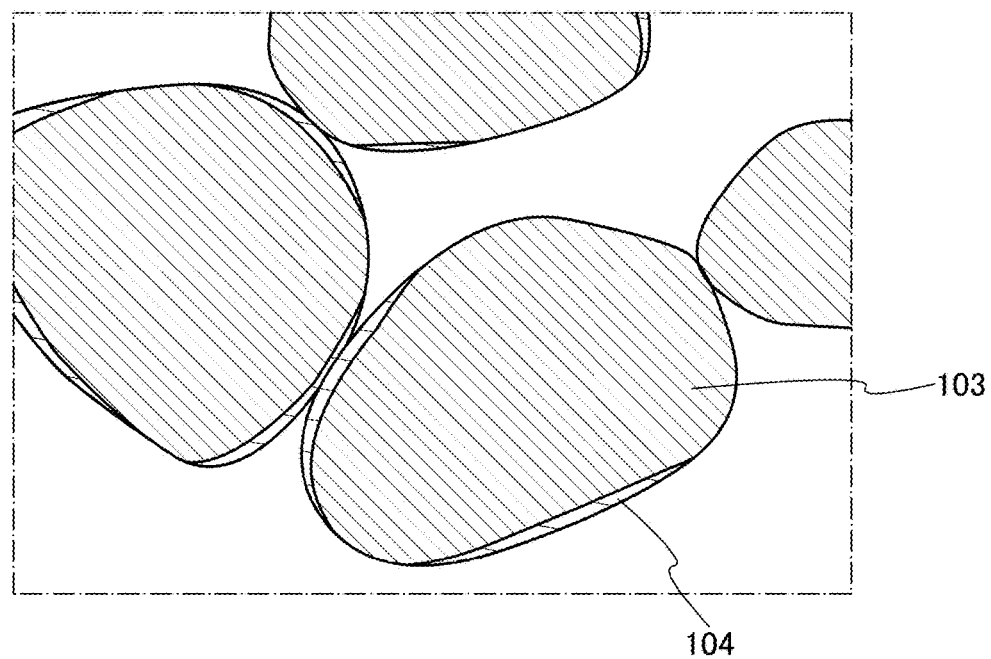
FIGS. 3A and 3B are each a cross-sectional view of an electrode.
Figure 3B:
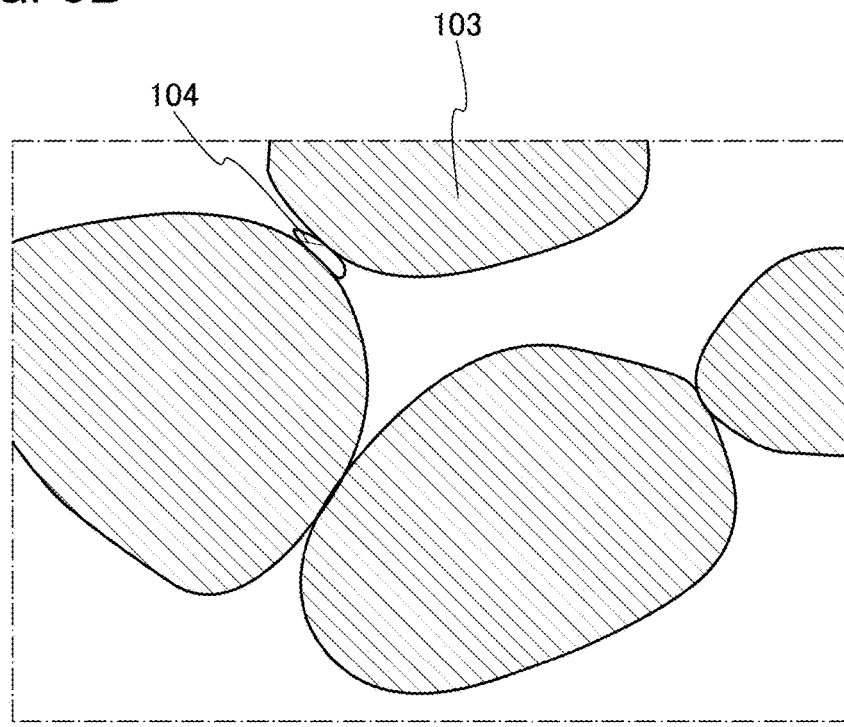

As illustrated in FIG. 2B, the binder 104 may cover the surface of the active material particle 103. As illustrated in FIG. 3A, the binder 104 may cover part of the surface of the active material particle 103. Furthermore, as illustrated in FIG. 3B, the binder 104 may be located between the active material particles 103. Although a conductive additive is not illustrated in FIGS. 2A and 2B and FIGS. 3A and 3B, the conductive additive can be located between the active material particles 103, for example. Alternatively, the conductive additive can be positioned so as to connect the active material particles 103.

Figure 4A:
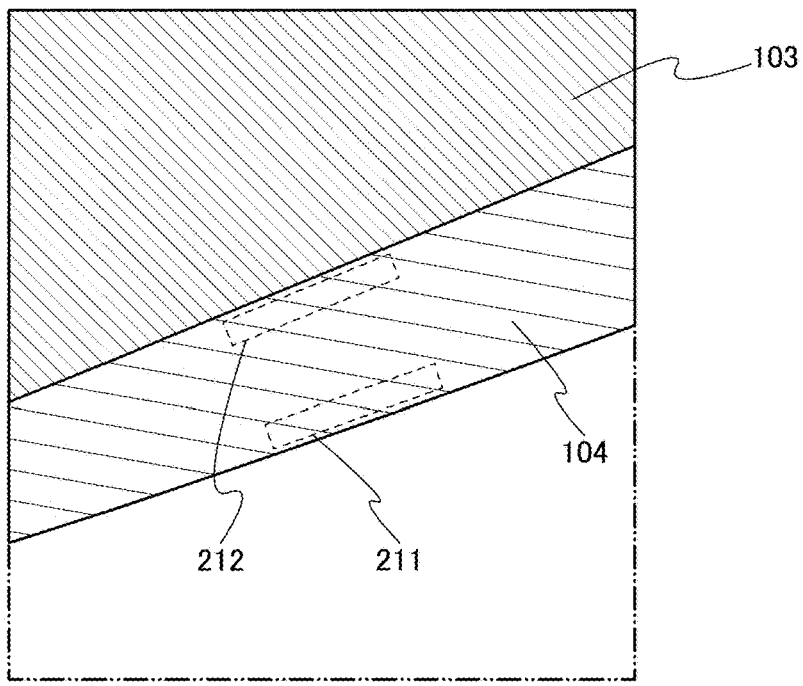
FIGS. 4A and 4B are each a cross-sectional view of an electrode.

FIG. 4A is an enlarged cross-sectional view illustrating the active material particle 103 and the binder 104 located in the vicinity of the surface of the active material particle 103. In FIG. 4A, the binder 104 has a film-like shape. The binder 104 includes a region 211 located in the vicinity of an outer surface of the binder 104 and a region 212 located in the vicinity of the surface of the active material particle 103. The region 211 may be in contact with the outer surface of the binder 104.

Figure 4B:
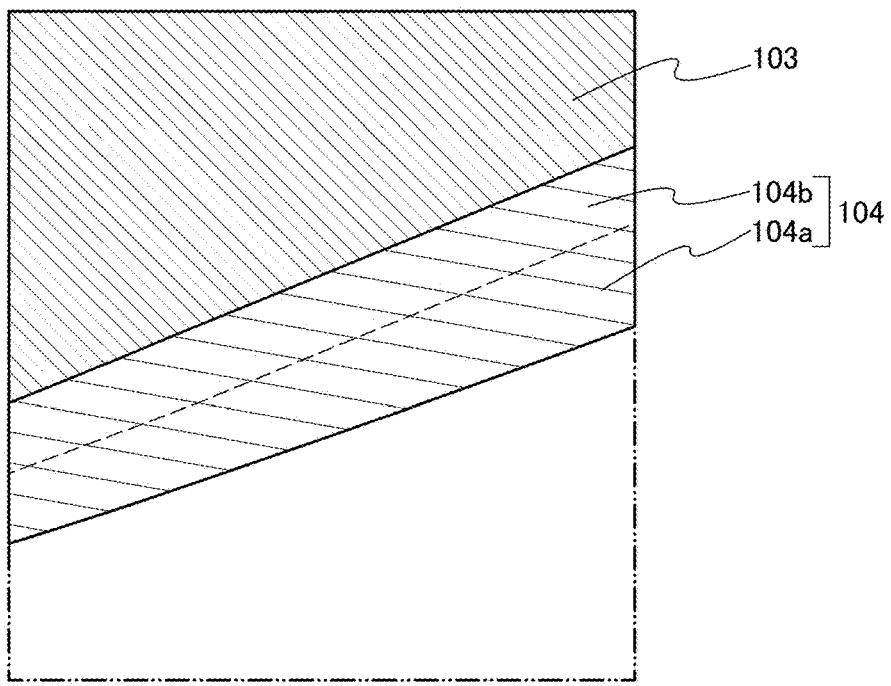

As illustrated in a cross-sectional view in FIG. 4B, the binder 104 may include a layer 104a and a layer 104b. At least part of the layer 104a is in contact with an outer surface of the binder 104. The layer 104b includes a region located between the active material particle 103 and the layer 104a.

Figure 5A:
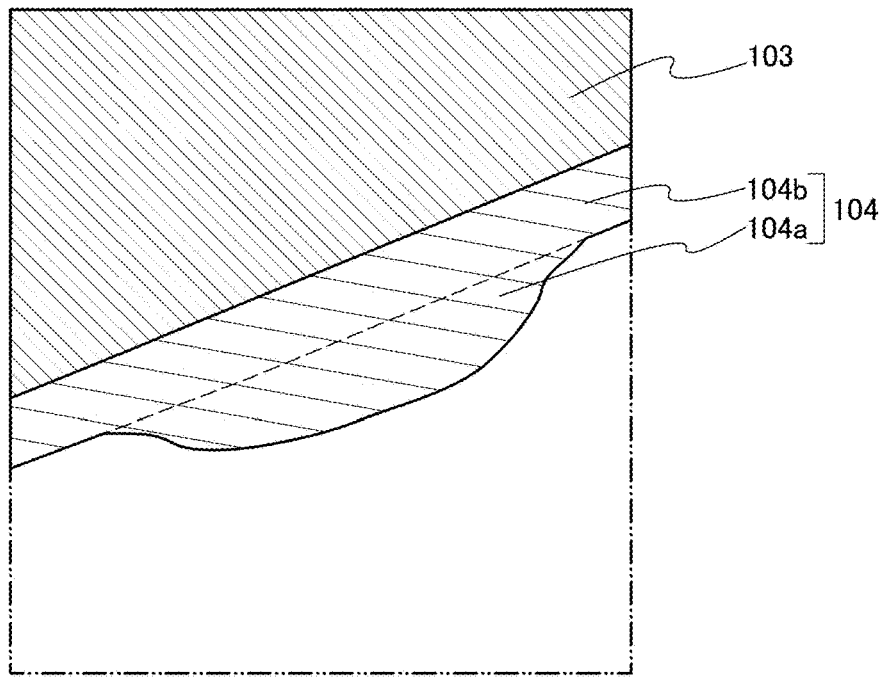
FIGS. 5A and 5B are each a cross-sectional view of an electrode.

Here, as illustrated in a cross-sectional view in FIG. 5A, only part of a surface of the layer 104b may be provided with the layer 104a. That is, the layer 104b may include a region in contact with the outer surface of the binder 104.

Figure 5B:
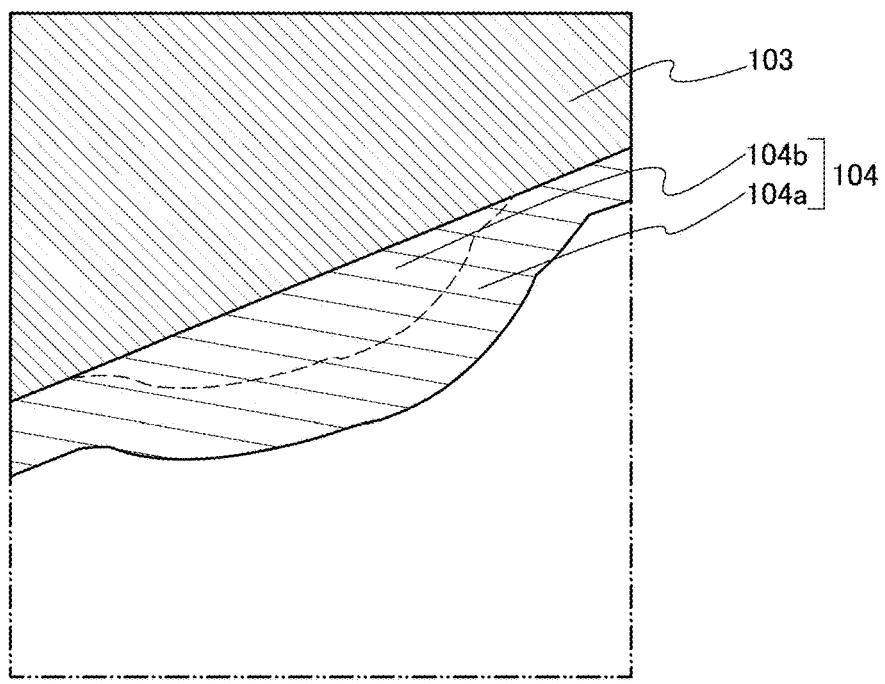

Alternatively, as illustrated in a cross-sectional view in FIG. 5B, the layer 104a may include a region overlapping with the layer 104b and a region not overlapping with the layer 104b, between the active material particle 103 and the layer 104a. The layer 104a may include a region in contact with the surface of the active material particle 103, for example.

The electrode of one embodiment of the present invention preferably includes a region where the binder 104 is formed in the form of a layer on the active material, and the binder 104 preferably includes a region including the region 211 and the region 212 as illustrated in FIG. 4A, for example.

Alternatively, the electrode of one embodiment of the present invention preferably includes a region where the binder 104 is formed in the form of a layer on the active material, and the binder 104 preferably includes a region including the layer 104a and the layer 104b as illustrated in FIG. 4B, for example.

Figure 6A:
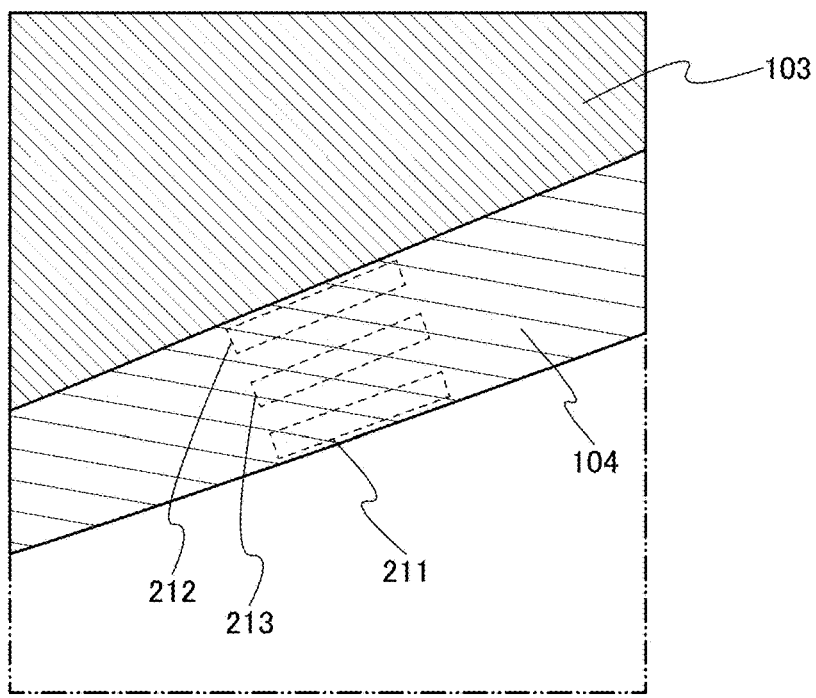
FIGS. 6A and 6B are each a cross-sectional view of an electrode.

FIG. 6A is different from FIG. 4A in that a region 213 is located between the region 211 and the region 212.

Figure 6B:
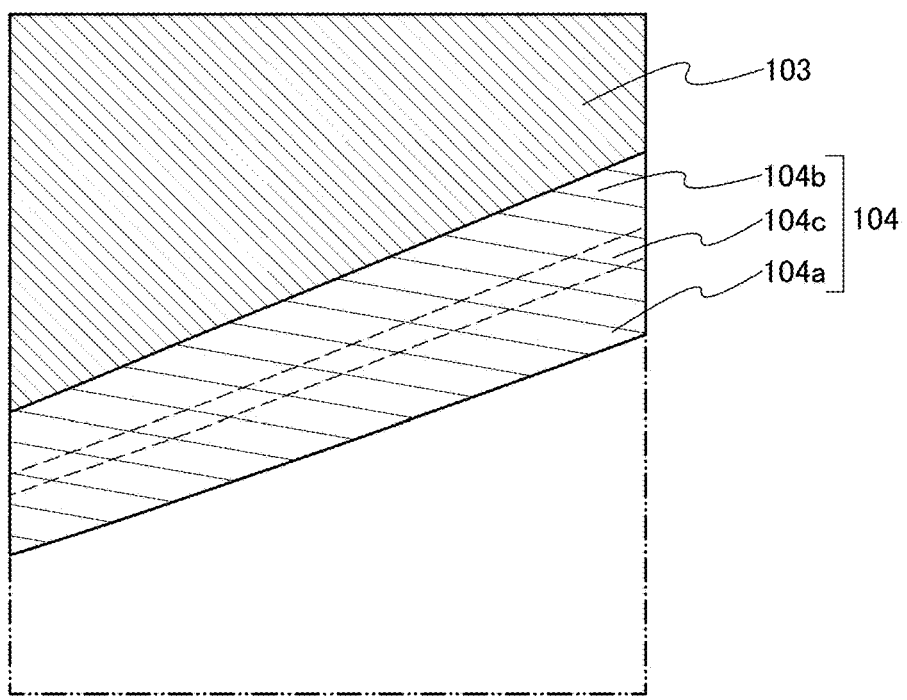

FIG. 6B is different from FIG. 4B in that a layer 104c is located between the layer 104a and the layer 104b.

The binder 104 includes a region that is in the form of a layer (film) and has a thickness larger than or equal to 1 nm and smaller than or equal to 150 nm, preferably larger than or equal to 3 nm and smaller than or equal to 100 nm, more preferably larger than or equal to 5 nm and smaller than or equal to 50 nm.

The thickness of the layer 104a is preferably 30% or more and 70% or less of that of the binder 104.

Figure 7:
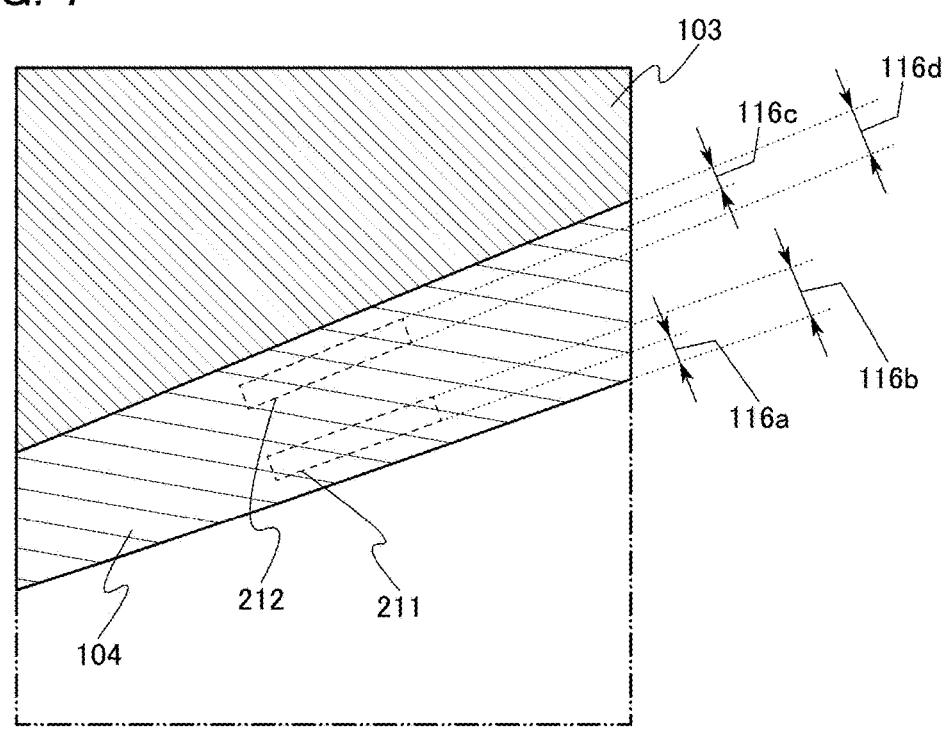
FIG. 7 is a cross-sectional view of an electrode.

The positional relation between the region 211 and the region 212 will be described with reference to FIG. 7. FIG. 7 is a cross sectional view illustrating the active material particle 103 and the binder 104. The region 211 includes a region located at a distance 116a to a distance 116b from the outer surface of the binder 104, for example. The region 212 includes a region located at a distance 116c to a distance 116d from the surface of the active material particle 103, for example.

The distance 116a and the distance 116c are preferably larger than or equal to 0 nm and smaller than or equal to 50 nm, more preferably larger than or equal to 0 nm and smaller than or equal to 20 nm, still more preferably larger than or equal to 0 nm and smaller than or equal to 10 nm, yet still more preferably larger than or equal to 0 nm and smaller than or equal to 5 nm.

The distance 116b is preferably larger than the distance 116a by 0.5 nm or more and 50 nm or less, more preferably 1 nm or more and 20 nm or less, still more preferably 1 nm or more and 10 nm or less, yet still more 1 nm or more and 5 nm or less.

The distance 116d is preferably larger than the distance 116c by 0.5 nm or more and 50 nm or less, more preferably 1 nm or more and 20 nm or less, still more preferably 1 nm or more and 10 nm or less, yet still more 1 nm or more and 5 nm or less.

Figure 8:
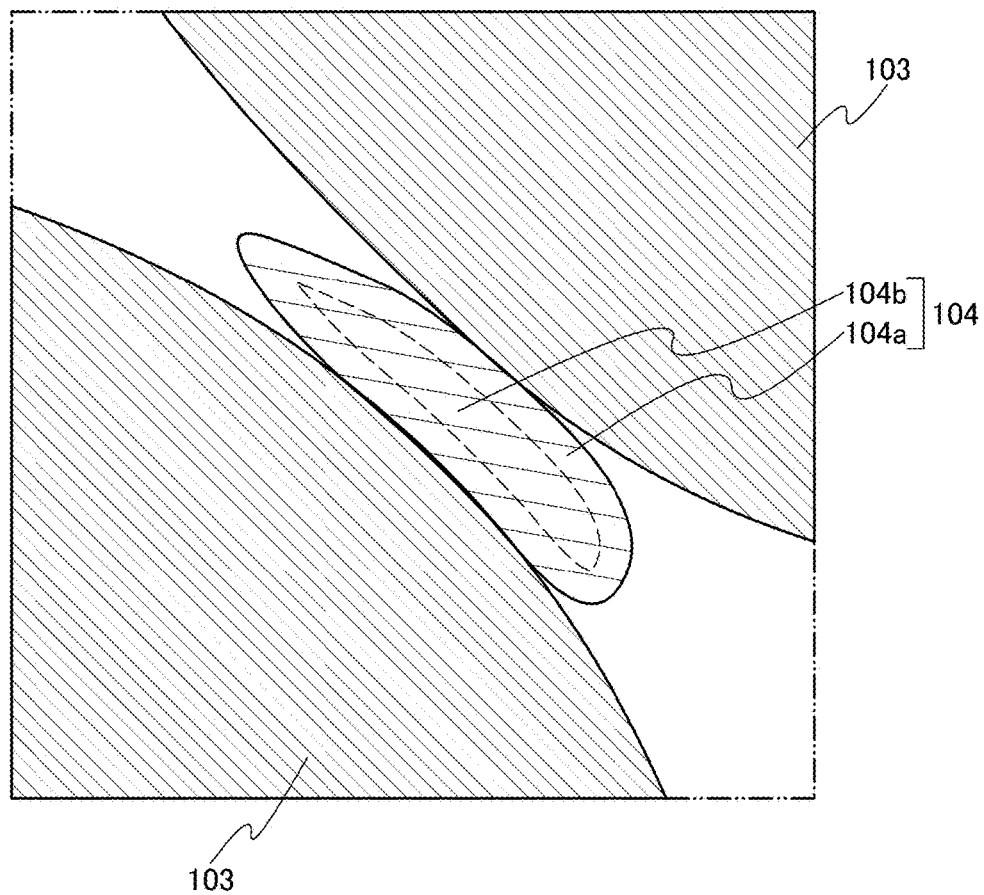
FIG. 8 is a cross-sectional view of an electrode.

FIG. 8 is a cross-sectional view illustrating adjacent two active material particles 103 and the binder 104 between the two active material particles 103. The binder 104 includes the layer 104a located in the vicinity of the surface of the binder 104 and the layer 104b located inward from the layer 104a. At least part of the layer 104a is in contact with the surface of the binder 104.

<Binder>

As the binder, a rubber material such as styrene-butadiene rubber (SBR), styrene-isoprene-styrene rubber, acrylonitrile-butadiene rubber, butadiene rubber, or ethylene-propylene-diene copolymer can be used. Alternatively, fluororubber can be used as the binder.

For the binder, for example, water-soluble polymers are preferably used. As the water-soluble polymers, a polysaccharide or the like can be used. As the polysaccharide, a cellulose derivative such as carboxymethyl cellulose (CMC), methyl cellulose, ethyl cellulose, hydroxypropyl cellulose, diacetyl cellulose, or regenerated cellulose, starch, or the like can be used. It is more preferred that such water-soluble polymers be used in combination with any of the above rubber materials.

Alternatively, as the binder, a material such as polystyrene, poly(methyl acrylate), poly(methyl methacrylate) (PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, isobutylene, polyethylene terephthalate, nylon, polyvinylidene fluoride (PVdF), polyacrylonitrile (PAN), polyvinyl chloride, ethylene-propylene-diene polymer, polyvinyl acetate, or nitrocellulose is preferably used.

Two or more of the above materials may be used in combination for the binder.

For example, a binder having high adhesion or high elasticity and a binder having a significant viscosity modifying effect may be used in combination. As the binder having a significant viscosity modifying effect, for example, a water-soluble polymer is preferably used. An example of a water-soluble polymer having an especially significant viscosity modifying effect is the above-mentioned polysaccharide; for example, a cellulose derivative such as carboxymethyl cellulose (CMC), methyl cellulose, ethyl cellulose, hydroxypropyl cellulose, diacetyl cellulose, or regenerated cellulose, or starch can be used.

Note that a cellulose derivative such as carboxymethyl cellulose obtains a higher solubility when converted into a salt such as a sodium salt or an ammonium salt of carboxymethyl cellulose, and accordingly, easily exerts an effect as a viscosity modifier. The high solubility can also increase the dispersibility of an active material and other components in the formation of slurry for an electrode. In this specification, cellulose and a cellulose derivative used as a binder of an electrode include salts thereof.

The water-soluble polymers stabilize viscosity by being dissolved in water and allow stable dispersion of the active material and another material combined as a binder such as styrene-butadiene rubber in an aqueous solution. Furthermore, a water-soluble polymer is expected to be easily and stably adsorbed to an active material surface because it has a functional group. Many cellulose derivatives such as carboxymethyl cellulose have functional groups such as a hydroxyl group and a carboxyl group. Because of functional groups, polymers are expected to interact with each other and cover an active material surface in a large area.

In the case where the binder covering or being in contact with the active material surface forms a film, the film is expected to serve as a passivation film to suppress the decomposition of the electrolytic solution. Here, the passivation film refers to a film without electric conductivity or a film with extremely low electric conductivity, and can inhibit the decomposition of an electrolytic solution at a potential at which a battery reaction occurs in the case where the passivation film is formed on the active material surface, for example. It is preferred that the passivation film can conduct lithium ions while suppressing electric conduction.

Here, the case where the binder 104 includes two or more materials will be described. For example, the case where the binder 104 includes a first material and a second material will be described. The adhesion of the first material is assumed to be higher than that of the second material, for example. Here, the term "high adhesion" refers, for example, to high adhesion between the binder 104 and the active material or high adhesion between the binders 104.

In the case where the binder 104 is formed by mixing the first material and the second material, regions whose contents of the first material to the second material are different may be generated in the binder 104. A high first material content in the surface of the binder 104 may be able to improve the adhesion of the surface of the binder 104, for example.

In the case where the binder 104 is provided so as to cover the active material particle 103, improving the adhesion of the surface of the binder 104 may be able to improve the adhesion between the active material particles 103 with the binder laid therebetween.

<First Material>

Here, any of the above materials for the binder 104 can be used as the first material. As the first material, a rubber material such as styrene-butadiene rubber (SBR), styrene-isoprene-styrene rubber, acrylonitrile-butadiene rubber, butadiene rubber, ethylene-propylene-diene copolymer, or fluororubber is preferably used.

<Second Material>

Any of the above materials for the binder 104 can be used as the second material. For the second material, water-soluble polymers are preferably used. For example, a polysaccharide or the like is preferably used. As the polysaccharide, for example, a cellulose derivative such as carboxymethyl cellulose (CMC), methyl cellulose, ethyl cellulose, hydroxypropyl cellulose, diacetyl cellulose, or regenerated cellulose, starch, or the like is preferably used.

The first material content preferably varies between the region 211, the region 212, and the region 213. For example, the first material content is preferably higher in the region 211 than in the region 212. Furthermore, for example, the first material content is preferably higher in the region 213 than in the region 212 and lower in the region 213 than in the region 211. Note that it is acceptable in some cases as long as relative first material contents in the regions 211 to 213 can be measured.

In the case where the first material content is higher in the region 211 than in the region 212, the adhesion between the active material particles 103 with the binder 104 therebetween may be improved, for example.

The first material content preferably varies between the layer 104a, the layer 104b, and the layer 104c. For example, the first material content is preferably higher in the layer 104a than in the layer 104b. Furthermore, for example, the first material content is preferably higher in the layer 104c than in layer 104b and lower in layer 104c than in the layer 104a. Note that it is acceptable in some cases as long as relative first material contents in the layers 104a to 104c can be measured.

In the case where the first material content is higher in the layer 104a than in the layer 104b, the adhesion between the active material particles 103 with the binder 104 therebetween may be improved, for example.

<Content Measurement>

Here, the first material contents or concentrations in the regions 211 to 213 or the layers 104a to 104c can be measured by any of a variety of methods. For example, observation with a SEM can be employed for the measurement in some cases. Alternatively, observation with a TEM can be employed for the measurement in some cases. In observation with a SEM or a TEM, for example, a cross section including the active material particle 103 and the binder 104 is preferably processed and observed.

Any of a variety of elementary analysis methods can be employed in analyzing elements contained in the first material. For example, EDX, EELS, or EPMA can be employed.

Alternatively, elementary analysis may be performed in such a manner that a compound having high reactivity with the first material is used and the compound or an element contained in the compound is added to the first material. For example, elementary analysis for a material containing unsaturated bonds can be performed after the material is reacted with osmium tetroxide so that osmium is added to the material. Alternatively, a halogen such as bromine may be added.

In the case where rubber containing unsaturated bonds is used as the first material, osmium can be added to the first material. Examples of rubber containing unsaturated bonds include diene-based rubber such as butadiene rubber and isoprene rubber, specifically, styrene-butadiene rubber (SBR), styrene-isoprene-styrene rubber, acrylonitrile-butadiene rubber, and ethylene-propylene-diene copolymer. These rubber materials can also be called a diene-based rubber. Here, the term "diene-based polymer" refers to a polymer using diene as a monomer of a raw material. The term "diene-based rubber" refers to rubber using diene as a monomer of a raw material.

For the second material, water-soluble polymers are preferably used, for example. As the water-soluble polymers, a polysaccharide or the like can be used. As the polysaccharide, a cellulose derivative such as carboxymethyl cellulose (CMC), methyl cellulose, ethyl cellulose, hydroxypropyl cellulose, diacetyl cellulose, or regenerated cellulose, starch, or the like can be used.

The first material content in the region 211 is preferably, for example, twice or more and 100 times or less, 3 times or more and 50 times or less, or 5 times or more and 30 times or less as large as that in the region 212 in atomic ratio. Alternatively, the value obtained by dividing the amount by mole of the unsaturated bonds contained in the first material in the region 211 by the sum of the number of carbon atoms and oxygen atoms in the region 211 is preferably, for example, twice or more and 100 times or less, 3 times or more and 50 times or less, or 5 times or more and 30 times or less as large as that in the region 212. Alternatively, the value obtained by dividing the amount by mole of osmium contained in the first material in the region 211 after the electrode of one embodiment of the present invention and osmium tetroxide are reacted with each other by the sum of the number of carbon atoms and oxygen atoms in the region 211 is preferably, for example, twice or more and 100 times or less, 3 times or more and 50 times or less, or 5 times or more and 30 times or less as large as that in the region 212.

The first material content in the layer 104a is preferably, for example, twice or more and 100 times or less, 3 times or more and 50 times or less, or 5 times or more and 30 times or less as large as that in the layer 104b in atomic ratio.

Figure 9:
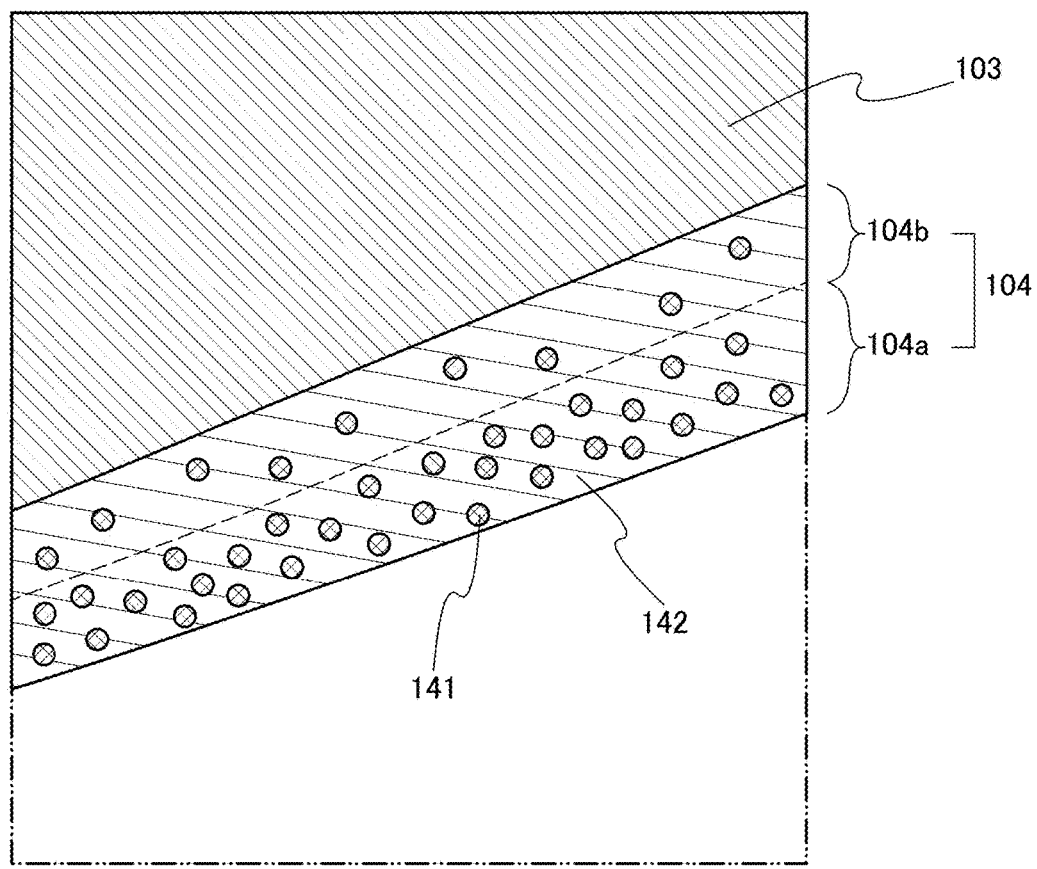
FIG. 9 is a cross-sectional view of an electrode.

FIG. 9 illustrates a cross section of the electrode of one embodiment of the present invention. As illustrated in FIG. 9, the binder 104 may include regions 141 scattering in the binder 104 and a region 142 in the vicinity of the regions 141. In the cross section in FIG. 9, the proportion of the area occupied by the regions 141 is higher in the layer 104a than in the layer 104b.

The regions 141 are preferably formed of the first material. The regions 142 are preferably formed of the second material.

Alternatively, it is preferred that the regions 141 include a high first material content and the region 142 include a lower first material content than the region 141 does. Furthermore, it is preferred that the region 142 include a high content of the second material and the region 141 include a lower content of the second material than the region 142 does.

Here, for example, the case of using a rubber material as the first material will be described. The rubber material is dispersed in slurry in an electrode fabrication process that will be described later. Thus, the regions 141 presumably scatter in the binder 104 in some cases as in the example illustrated in FIG. 9. The regions 141 may have a spherical or elliptic shape in the binder 104.

The content of the binder with respect to the total amount of the active material layer 102 is preferably greater than or equal to 1 wt % and less than or equal to 10 wt %, more preferably greater than or equal to 2 wt % and less than or equal to 8 wt %, and still more preferably greater than or equal to 3 wt % and less than or equal to 5 wt %. The content of the conductive additive with respect to the total amount of the active material layer 102 is preferably greater than or equal to 1 wt % and less than or equal to 10 wt %, more preferably greater than or equal to 1 wt % and less than or equal to 5 wt %.

In many cases, binders swell or are changed in quality by being immersed in an electrolytic solution. The electrode of one embodiment of the present invention preferably has high strength even after being immersed in an electrolytic solution.

In the case where the binder content in the total amount of the active material layer 102 is too high, immersing the electrode in an electrolytic solution might cause swell or a change in quality of the binder, resulting in a reduction in the strength of the electrode. Thus, for example, the binder content in the total amount of the active material layer 102 is preferably higher than or equal to 1 wt % and lower than or equal to 5 wt %, more preferably higher than or equal to 1 wt % and lower than or equal to 3 wt %.

In the case where CMC-Na and SBR are used for the binder, for example, the CMC-Na content in the total amount of the active material layer 102 is preferably higher than or equal to 1 wt % and lower than or equal to 5 wt %, more preferably higher than or equal to 1 wt % and lower than or equal to 3 wt %, still more preferably higher than or equal to 1 wt % and lower than 2 wt %.

<Negative Electrode Active Material>

In the case where the active material is a negative electrode active material, for example, a carbon-based material, an alloy-based material, or the like can be used.

As the carbon-based material, graphite, graphitizing carbon (soft carbon), non-graphitizing carbon (hard carbon), a carbon nanotube, graphene, carbon black, or the like can be used.

Examples of graphite include artificial graphite and natural graphite. Examples of artificial graphite include mesocarbon microbeads (MCMB), coke-based artificial graphite, and pitch-based artificial graphite. As artificial graphite, spherical graphite having a spherical shape can be used. For example, MCMB is preferably used because it may have a spherical shape. Moreover, MCMB may preferably be used because it can relatively easily have a small surface area. Examples of natural graphite include flake graphite and spherical natural graphite.

Graphite has a low potential substantially equal to that of a lithium metal (higher than or equal to 0.1 V and lower than or equal to 0.3 V vs. $Li/Li^+$) when lithium ions are intercalated into the graphite (while a lithium-graphite intercalation compound is formed). For this reason, a lithium-ion secondary battery can have a high operating voltage. In addition, graphite is preferred because of its advantages such as a relatively high capacity per unit volume, relatively small volume expansion, low cost, and higher level of safety than that of a lithium metal.

Note that it is known that when lithium ions are intercalated in graphite, the interlayer distance of graphite increases from 0.336 nm to 0.370 nm, for example (see Non-patent Document 1, pp. 333-334). That is, the interlayer distance increases by approximately 11%.

For the negative electrode active material, an element which enables charge-discharge reactions by an alloying reaction and a dealloying reaction with lithium can be used. For example, a material containing at least one of silicon, tin, gallium, aluminum, germanium, lead, antimony, bismuth, silver, zinc, cadmium, indium, and the like can be used. Such elements have higher capacity than carbon. In particular, silicon has a significantly high theoretical capacity of 4200 mAh/g. For this reason, silicon is preferably used as the negative electrode active material. Alternatively, a compound containing any of the above elements may be used. Examples of the compound include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like. Here, an element that enables charge-discharge reactions by an alloying reaction and a dealloying reaction with lithium, a compound containing the element, and the like may be referred to as an alloy-based material.

Furthermore, as disclosed in Patent Document 2, the volume of an alloy-based material such as silicon is increased by lithium reception in many cases.

In this specification and the like, SiO refers, for example, to silicon monoxide. SiO can alternatively be expressed as SiOx. Here, x preferably has an approximate value of 1. For example, x is preferably 0.2 or more and 1.5 or less, more preferably 0.3 or more and 1.2 or less.

Alternatively, for the negative electrode active materials, an oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the negative electrode active materials, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm³).

A nitride containing lithium and a transition metal is preferably used, in which case lithium ions are contained in the negative electrode active materials and thus the negative electrode active materials can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used for the negative electrode active materials; for example, a transition metal oxide which does not form an alloy with lithium, such as cobalt oxide (CoO), nickel oxide (NiO), and iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as a positive electrode active material because of its high potential.

The reaction potential of the negative electrode active material is preferably as low as possible, in which case the voltage of the power storage device can be high. On the other hand, when the potential is low, power of reducing an electrolytic solution is increased, so that an organic solvent or the like in an electrolytic solution might be subjected to reductive decomposition. The range of potentials in which the electrolysis of an electrolytic solution does not occur is referred to as a potential window. The electrode potential of the negative electrode needs to be within a potential window of an electrolytic solution; however, the potentials of many active materials used for negative electrodes of lithium-ion secondary batteries and lithium-ion capacitors are out of the potential windows of almost all electrolytic solutions. Specifically, materials with low reaction potentials such as graphite and silicon can increase the voltage of power storage devices but are likely to cause the reductive decomposition of electrolytic solutions.

<Positive Electrode Active Material>

Examples of a positive electrode active material that is used for the active material include a composite oxide with an olivine crystal structure, a composite oxide with a layered rock-salt crystal structure, and a composite oxide with a spinel crystal structure.

As the positive electrode active material, a compound such as $LiFeO_2$, $LiCoO_2$, $LiNiO_2$, $LiMn_2O_4$, $V_2O_5$, $Cr_2O_5$, or $MnO_2$ can be used. $LiCoO_2$ is particularly preferable because it has a high capacity, stability in the air higher than that of $LiNiO_2$, and thermal stability higher than that of $LiNiO_2$, for example. It is preferable to add a small amount of lithium nickel oxide ($LiNiO_2$ or $LiNi_{1-x}M_xO_2$ (M=Co, Al, or the like)) to a lithium-containing material with a spinel crystal structure which contains manganese such as $LiMn_2O_4$ because the characteristics of a secondary battery using such a material can be improved.

The average diameter of primary particles of the positive electrode active material is preferably greater than or equal to 5 nm and less than or equal to 50 more preferably greater than or equal to 100 nm and less than or equal to 500 nm, for example. Furthermore, the specific surface area is preferably greater than or equal to 5 m²/g and less than or equal to 15 m²/g. Furthermore, the average diameter of secondary particles is preferably greater than or equal to 5 μm and less than or equal to 50 Note that the average particle sizes can be measured with a particle size distribution analyzer or the like using a laser diffraction and scattering method or by observation with a SEM or a TEM. The specific surface area can be measured by a gas adsorption method.

Another example of the positive electrode active material is a lithium-manganese composite oxide that is represented by a composition formula $Li_aMn_bM_cO_d$. Here, the element M is preferably a metal element other than lithium and manganese, or silicon or phosphorus, more preferably nickel. Furthermore, in the case where the whole particle of a lithium-manganese composite oxide is measured, it is preferable to satisfy the following at the time of discharging: $0<a/(b+c)<2$; $c>0$; and $0.26 \leq (b+c)/d < 0.5$. To achieve a high capacity, the lithium-manganese composite oxide preferably includes a region where the surface portion and the middle portion are different in the crystal structure, the crystal orientation, or the oxygen content. In order that such a lithium-manganese composite oxide can be obtained, the composition formula is preferably $Li_aMn_bNi_cO_d$ satisfying the following: $1.6 \leq a \leq 1.848$; $0.19 \leq c/b \leq 0.935$; and $2.5 \leq d \leq 3$. Furthermore, it is particularly preferable to use a lithium-manganese composite oxide represented by a composition formula $Li_{1.68}Mn_{0.8062}Ni_{0.318}O_3$. In this specification and the like, a lithium-manganese composite oxide represented by a composition formula $Li_{1.68}Mn_{0.8062}Ni_{0.318}O_3$ refers to that formed at a ratio (molar ratio) of the amounts of raw materials of $Li_2CO_3:MnCO_3:NiO=0.84:0.8062:0.318$. Although this lithium-manganese composite oxide is represented by a composition formula $Li_{1.68}Mn_{0.8062}Ni_{0.318}O_3$, the composition might deviate from this.

Note that the ratios of metal, silicon, phosphorus, and other elements to the total composition in the whole particle of a lithium-manganese composite oxide can be measured with, for example, an inductively coupled plasma mass spectrometer (ICP-MS). The ratio of oxygen to the total composition in the whole particle of a lithium-manganese composite oxide can be measured by, for example, energy dispersive X-ray spectroscopy (EDX). Alternatively, the ratio of oxygen to the total composition in the whole particle of a lithium-manganese composite oxide can be measured by ICP-MS combined with fusion gas analysis and valence evaluation of X-ray absorption fine structure (XAFS) analysis. Note that the lithium-manganese composite oxide is an oxide containing at least lithium and manganese, and may contain at least one selected from chromium, cobalt, aluminum, nickel, iron, magnesium, molybdenum, zinc, indium, gallium, copper, titanium, niobium, silicon, phosphorus, and the like.

Figure 10A:
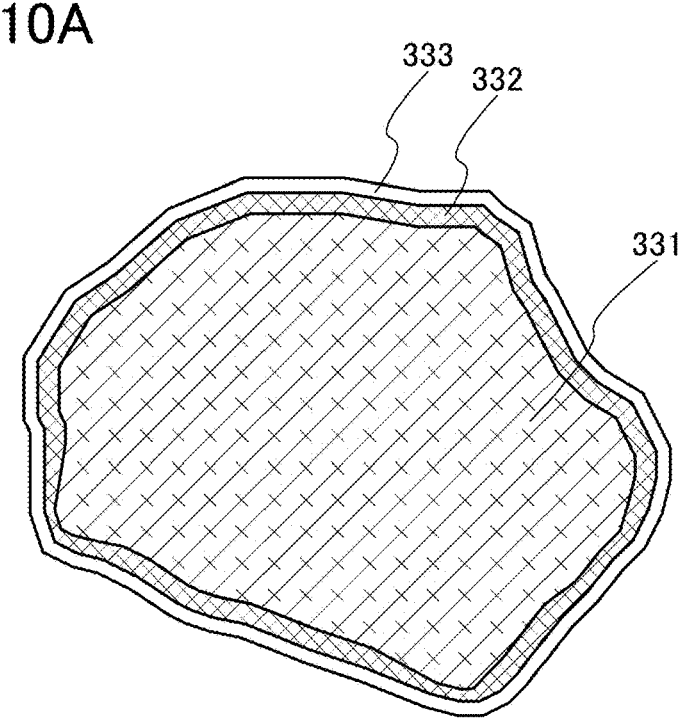
FIGS. 10A and 10B are each a cross-sectional view of a particle.
Figure 10B:
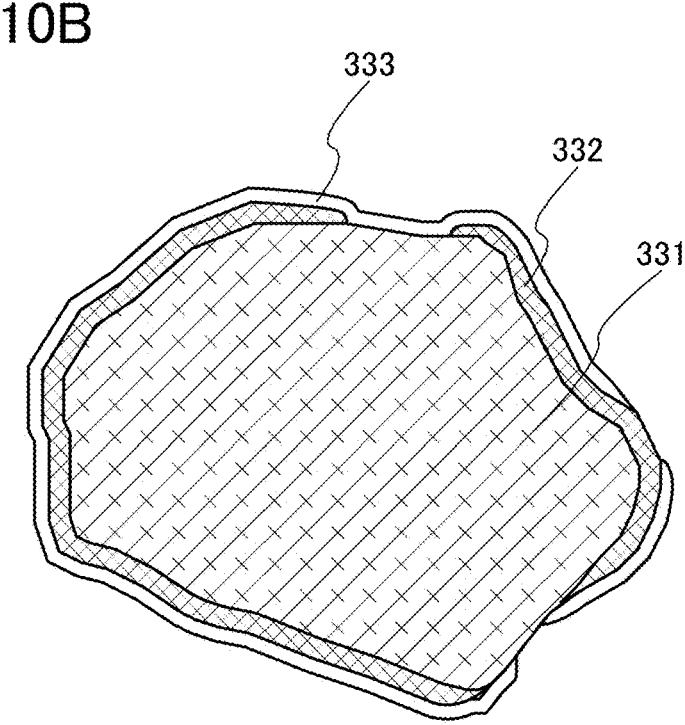

FIGS. 10A and 10B each illustrate an example of a cross-sectional view of a particle of a lithium-manganese composite oxide having a region with different crystal structures, crystal orientations, or oxygen contents.

As illustrated in FIG. 10A, the lithium-manganese composite oxide having a region with different crystal structures, crystal orientations, or oxygen contents preferably include a region 331, a region 332, and a region 333. The region 332 is in contact with at least part of the outer side of the region 331. Here, the term "outer side" refers to the side closer to a surface of a particle. The region 333 preferably includes a region corresponding to a surface of a particle containing the lithium-manganese composite oxide.

As shown in FIG. 10B, the region 331 may include a region not covered with the region 332. The region 332 may include a region not covered with the region 333. Furthermore, the region 331 may include a region in contact with the region 333, for example. Furthermore, the region 331 may include a region covered with neither the region 332 nor the region 333.

The region 332 preferably has composition different from that of the region 331.

For example, the case will be described where the composition of the region 331 and that of the region 332 are separately measured and the region 331 and the region 332 each contain lithium, manganese, the element M, and oxygen; the atomic ratio of lithium to manganese, the element M, and oxygen in the region 331 is represented by $a1:b1:c1:d1$; and the atomic ratio of lithium to manganese, the element M, and oxygen in the region 332 is represented by $a2:b2:c2:d2$. Note that the composition of each of the region 331 and the region 332 can be measured by, for example, EDX using a TEM. In measurement by EDX, the proportion of lithium is sometimes difficult to measure. Thus, a difference between the region 331 and the region 332 in composition except for lithium will be described below. Here, $d1/(b1+c1)$ is preferably greater than or equal to 2.2, more preferably greater than or equal to 2.3, still more preferably greater than or equal to 2.35 and less than or equal to 3. Furthermore, $d2/(b2+c2)$ is preferably less than 2.2, more preferably less than 2.1, much more preferably greater than or equal to 1.1 and less than or equal to 1.9. In this case, the composition of the whole particle of lithium-manganese composite oxide including the region 331 and the region 332 also preferably satisfies the above inequality: $0.26 \leq (b+c)/d < 0.5$.

The valence of manganese in the region 332 may be different from that of manganese in the region 331. The valence of the element M in the region 332 may be different from that of the element M in the region 331.

Specifically, the region 331 is preferably a lithium-manganese composite oxide having a layered rock-salt crystal structure. The region 332 is preferably a lithium-manganese composite oxide having a spinel crystal structure.

Here, in the case where the compositions of the regions or valences of elements in the regions are spatially distributed, the compositions or valences in a plurality of portions are obtained, the average values thereof are calculated, and the average values are regarded as the compositions or valences of the regions, for example.

A transition layer may be provided between the region 332 and the region 331. The transition layer is a region where the composition, crystal structure, or crystal lattice constant changes continuously or gradually. A mixed layer may be provided between the region 332 and the region 331. The mixed layer is a layer in which, for example, two or more crystals having different crystal orientations are mixed, two or more crystals having different crystal structures are mixed, or two or more crystals having different compositions are mixed.

The region 333 preferably contains carbon or a metal compound. Examples of the metal include cobalt, aluminum, nickel, iron, manganese, titanium, zinc, and lithium. Examples of the metal compound include an oxide and a fluoride of the metal.

It is particularly preferable that the region 333 contain carbon. Since carbon has high conductivity, the particle covered with carbon in the electrode of the power storage device can reduce the resistance of the electrode, for example. The region 333 preferably includes a graphene compound. The use of the graphene compound in the region 333 allows the lithium-manganese composite oxide particle to be efficiently coated with the region 333. The graphene compound will be described later. The region 333 may include, specifically, graphene or graphene oxide, for example. Furthermore, graphene formed by reducing graphene oxide is preferably used as graphene. Graphene has excellent electrical characteristics of high conductivity and excellent physical properties of high flexibility and high mechanical strength. When graphene oxide is used for the region 333 and is reduced, the region 332 in contact with the region 333 is oxidized in some cases.

When the region 333 includes a graphene compound, the secondary battery using the lithium-manganese composite oxide as a positive electrode material can have improved cycle performance.

The thickness of a layer containing carbon is preferably greater than or equal to 0.4 nm and less than or equal to 40 nm.

Furthermore, the average diameter of primary particles of the lithium-manganese composite oxide is preferably greater than or equal to 5 nm and less than or equal to 50 mm, more preferably greater than or equal to 100 nm and less than or equal to 500 nm, for example. Furthermore, the specific surface area is preferably greater than or equal to 5 $m^2/g$ and less than or equal to 15 $m^2/g$. Furthermore, the average diameter of secondary particles is preferably greater than or equal to 5 μm and less than or equal to 50 μm.

Figure 11:
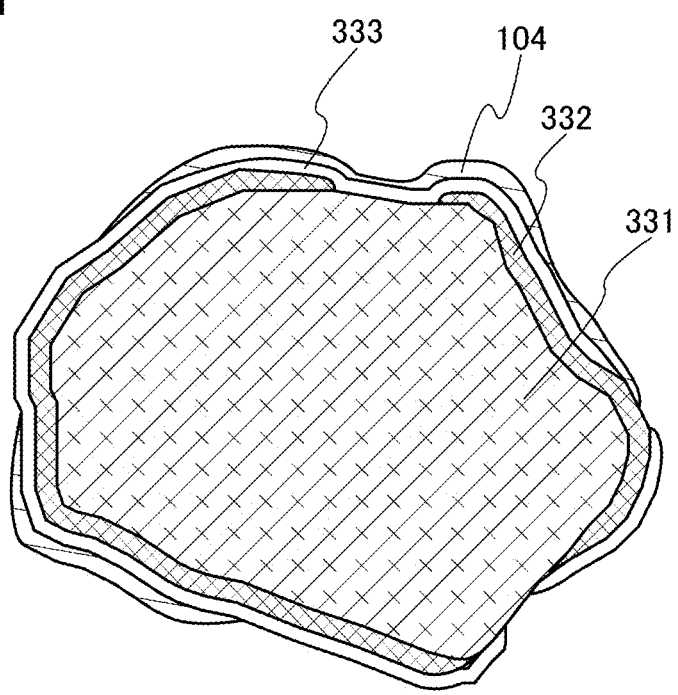
FIG. 11 is a cross-sectional view of a particle of one embodiment of the present invention.

FIG. 11 illustrates an example in which the surface of the lithium-manganese composite oxide illustrated in FIG. 10B is provided with the binder 104. The binder 104 preferably includes a layered region in contact with a surface of the region 333. In addition, the binder 104 may include a region in the form of a layer in contact with a surface of the region 332. Moreover, the binder 104 may include a region in the form of a layer in contact with a surface of the region 331.

Alternatively, a complex material ($LiMPO_4$ (general formula) (M is one or more of Fe(II), Mn(II), Co(II), and Ni(II))) can be used as the positive electrode active material. Typical examples of the general formula $LiMPO_4$ are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ ($a+b \leq 1$, $0<a<1$, and $0<b<1$), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and LiFe$_f$Ni$_g$Co$_h$Mn$_i$PO$_4$ (f+g+h+i≤1, 0<f<1, 0<g<1, 0<h<1, and 0<i<1).

LiFePO$_4$ is particularly preferable because it properly has properties necessary for the positive electrode active material, such as safety, stability, a high capacity density, and the existence of lithium ions which can be extracted in initial oxidation (charge).

Alternatively, a complex material such as Li$_{(2-j)}$MSiO$_4$ (general formula) (M is one or more of Fe(II), Mn(II), Co(II), and Ni(II); 0≤j≤2) may be used as the positive electrode active material. Typical examples of the general formula Li$_{(2-j)}$MSiO$_4$ are lithium compounds such as Li$_{(2-j)}$FeSiO$_4$, Li$_{(2-j)}$CoSiO$_4$, Li$_{(2-j)}$MnSiO$_4$, Li$_{(2-j)}$Fe$_k$Ni$_l$SiO$_4$, Li$_{(2-j)}$Fe$_k$Co$_l$SiO$_4$, Li$_{(2-j)}$Fe$_k$Mn$_l$SiO$_4$, Li$_{(2-j)}$Ni$_k$Co$_l$SiO$_4$, Li$_{(2-j)}$Ni$_k$Mn$_l$SiO$_4$ (k+l≤1, 0<k<1, and 0<l<1), Li$_{(2-j)}$Fe$_m$Ni$_n$Co$_q$SiO$_4$, Li$_{(2-j)}$Fe$_m$Ni$_n$Mn$_q$SiO$_4$, Li$_{(2-j)}$Ni$_m$Co$_n$Mn$_q$SiO$_4$ (m+n+q≤1, 0<m<1, 0<n<1, and 0<q<1), and Li$_{(2-j)}$Fe$_r$Ni$_s$Co$_t$Mn$_u$SiO$_4$ (r+s+t+u≤1, 0<r<1, 0<s<1, 0<t<1, and 0<u<1).

Still alternatively, a nasicon compound expressed by A$_x$M$_2$(XO$_4$)$_3$ (general formula) (A=Li, Na, or Mg, M=Fe, Mn, Ti, V, or Nb, X=S, P, Mo, W, As, or Si) can be used for the positive electrode active material. Examples of the nasicon compound are Fe$_2$(MnO$_4$)$_3$, Fe$_2$(SO$_4$)$_3$, and Li$_3$Fe$_2$(PO$_4$)$_3$. Further alternatively, a compound expressed by Li$_2$MPO$_4$F, Li$_2$MP$_2$O$_7$, or Li$_5$MO$_4$ (general formula) (M=Fe or Mn), a perovskite fluoride such as NaFeF$_3$ and FeF$_3$, a metal chalcogenide (a sulfide, a selenide, or a telluride) such as TiS$_2$ and MoS$_2$, an oxide with an inverse spinel structure such as LiMVO$_4$, a vanadium oxide (V$_2$O$_5$, V$_6$O$_{13}$, LiV$_3$O$_8$, or the like), a manganese oxide, an organic sulfur compound, or the like can be used as the positive electrode active material.

In the case where carrier ions are alkali metal ions other than lithium ions, or alkaline-earth metal ions, a material containing an alkali metal (e.g., sodium and potassium) or an alkaline-earth metal (e.g., calcium, strontium, barium, beryllium, and magnesium) instead of lithium may be used as the positive electrode active material. For example, the positive electrode active material may be a layered oxide containing sodium, such as NaFeO$_2$ and Na$_{2/3}$[Fe$_{1/2}$Mn$_{1/2}$]O$_2$.

Further alternatively, any of the aforementioned materials may be combined to be used as the positive electrode active material. For example, a solid solution obtained by combining two or more of the above materials can be used as the positive electrode active material. For example, a solid solution of LiCo$_{1/3}$Mn$_{1/3}$Ni$_{1/3}$O$_2$ and Li$_2$MnO$_3$ can be used as the positive electrode active material.

Note that although not illustrated, a conductive material such as a carbon layer may be provided on the surface of the positive electrode active material. Providing a conductive material such as a carbon layer lead to increase in the conductivity of an electrode. For example, the positive electrode active material can be coated with a carbon layer by mixing a carbohydrate such as glucose at the time of baking the positive electrode active material.

The average diameter of primary particles of the positive electrode active material is preferably greater than or equal to 50 nm and less than or equal to 100 μm.

<Conductive Additive>

Examples of the conductive additive include a carbon material, a metal material, and a conductive ceramic material. Alternatively, a fiber material may be used as the conductive additive. The content of the conductive additive in the active material layer is preferably greater than or equal to 1 wt % and less than or equal to 10 wt %, more preferably greater than or equal to 1 wt % and less than or equal to 5 wt %.

A network for electric conduction can be formed in the electrode by the conductive additive. The conductive additive also allows maintaining of a path for electric conduction between the positive electrode active material particles. The addition of the conductive additive to the active material layer increases the electric conductivity of the active material layer.

Examples of the conductive additive include natural graphite, artificial graphite such as mesocarbon microbeads, and carbon fiber. Examples of carbon fiber include mesophase pitch-based carbon fiber, isotropic pitch-based carbon fiber, carbon nanofiber, and carbon nanotube. Carbon nanotube can be formed by, for example, a vapor deposition method. Other examples of the conductive additive include carbon materials such as carbon black (e.g., acetylene black (AB)), graphite (black lead) particles, graphene, and fullerene. Alternatively, metal powder or metal fibers of copper, nickel, aluminum, silver, gold, or the like, a conductive ceramic material, or the like can be used.

Flaky graphene has an excellent electrical characteristic of high conductivity and excellent physical properties of high flexibility and high mechanical strength. Thus, the use of graphene as the conductive additive can increase contact points and the contact area of active materials.

Graphene may be either single-layer graphene or layered graphene including two or more and hundred or less layers. The single-layer graphene refers to a one-atom-thick layer of carbon having π bonds. Here, graphene including two or more and hundred or less layers is referred to as multilayer graphene.

Multilayer graphene has a length in the longitudinal direction of greater than or equal to 50 nm and less than or equal to 100 μm or greater than or equal to 800 nm and less than or equal to 20 μm.

Multilayer graphene may have one sheet-like shape formed of a plurality of multilayer graphenes and/or a plurality of single-layer graphenes that partly overlap with each other. Such multilayer graphene may be called a multilayer graphene sheet. The multilayer graphene sheet includes a region having, for example, a thickness larger than or equal to 0.33 nm and smaller than or equal to 50 μm, more preferably larger than or equal to 0.34 nm and smaller than or equal to 10 μm.

Here, single-layer graphene and multilayer graphene may contain atoms other than carbon atoms, an atomic group containing atoms other than carbon atoms, or an atomic group mainly containing carbon atoms, such as an alkyl group. Note that an atomic group may be called a substituent or a functional group.

Graphene can be formed by reducing graphene oxide. Reducing graphene oxide is preferred because conductivity can be increased. Reducing graphene oxide can reduce oxygen concentration. Graphene oxide will be described later. Note that graphene formed by reducing graphene oxide is referred to as reduced graphene oxide (RGO). When graphene oxide is reduced to form graphene, oxygen contained in the graphene oxide is not entirely released and part of oxygen remains bound with graphene, in some cases.

In the case where graphene contains oxygen, the concentration of oxygen in the graphene, which is measured by XPS is, for example, higher than or equal to 2 atomic % and lower than or equal to 20 atomic %, preferably higher than or equal to 2 atomic % and lower than or equal to 11 atomic %, more preferably higher than or equal to 3 atomic % and lower than or equal to 10 atomic %.

Note that graphene oxide can be formed by oxidizing the graphene, for example, or separating graphite oxide. Graphite oxide can be formed by oxidizing graphite. In addition, graphene modified with oxygen is called graphene oxide, in some cases. Thus, graphene having a functional group containing oxygen is called graphene oxide, in some cases. Examples of a functional group containing oxygen include an epoxy group, a carbonyl group such as a carboxy group, and a hydroxy group.

Here, a compound containing graphene as a basic skeleton is called a graphene compound. That is, graphene and graphene oxide are graphene compounds. In addition, a graphene compound includes, in its category, graphene modified with a functional group or the like.

Graphene may contain a six-membered ring composed of carbon atoms, a five-membered ring composed of carbon atoms, or a poly-membered ring which is a seven or more-membered ring composed of carbon atoms. Note that a region surrounded with carbon atoms in the poly-membered ring becomes an opening in some cases.

In the case where graphene is multilayer graphene including two or more layers, the interlayer distance between adjacent graphene layers is preferably larger than or equal to 0.33 nm and smaller than or equal to 0.5 nm, more preferably larger than or equal to 0.34 nm and smaller than or equal to 0.5 nm.

The interlayer distance of graphene can be measured by observing a cross section of the graphene with a TEM. The interlayer distance of graphene can be calculated (as interplanar spacing) by X-ray diffraction (XRD).

In the case where a graphene compound is analyzed by XPS and the spectrum of binding energy of carbon corresponding to C1s is subjected to waveform separation, the proportion of peaks indicating $sp^2$ with respect to the whole spectrum of C1s can be estimated as an area ratio. The proportion of $sp^2$ in graphene and multilayer graphene is preferably higher than or equal to 50% and lower than or equal to 90% with respect to the whole spectrum of C1s.

Graphene has a sheet-like shape and thus is capable of making low-resistance surface contact. Furthermore, graphene has extremely high conductivity even with a small thickness; thus, even a small amount of graphene can efficiently form a conductive path.

In the case where an active material with a small average particle diameter (e.g., 1 μm or less) is used, the specific surface area of the active material is large and thus more conductive paths for the active material particles are needed. In such a case, it is particularly preferred that graphene with extremely high conductivity that can efficiently form a conductive path even in a small amount is used.

A cross-sectional structure example of an active material layer containing graphene as a conductive additive will be described below. Note that a negative electrode active material layer may contain graphene as a conductive additive.

Figure 12A:
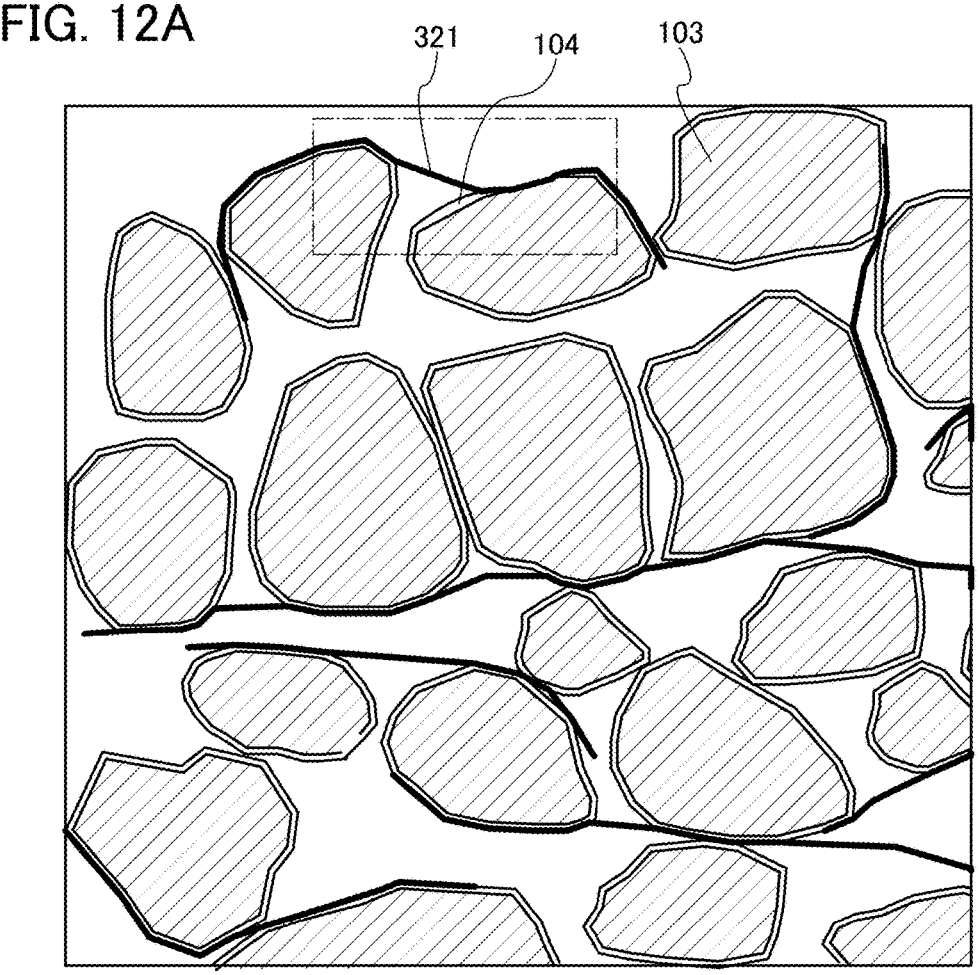
FIGS. 12A and 12B are each a cross-sectional view of an electrode.

FIG. 12A is a longitudinal sectional view of the active material layer 102. The active material layer 102 includes the active material particles 103, graphene flakes 321 as a conductive additive, and a binder (not illustrated). The graphene flake 321 is preferably multilayer graphene.

The longitudinal section of the active material layer 102 in FIG. 12A shows substantially uniform dispersion of the graphene flakes 321 in the active material layer 102. The graphene flakes 321 are schematically shown by thick lines in FIG. 12A but are actually thin films each having a thickness corresponding to the thickness of a single layer or a multi-layer of carbon molecules. The plurality of graphene flakes 321 are formed in such a way as to wrap, coat, or adhere to the surfaces of the plurality of active material particles 103, so that the graphene flakes 321 make surface contact with the active material particles 103. Furthermore, the graphene flakes 321 are also in surface contact with each other; consequently, the plurality of graphene flakes 321 form a three-dimensional network for electric conduction.

This is because graphene oxide with extremely high dispersibility in a polar solvent is used for the formation of the graphene flakes 321. The solvent is removed by volatilization from a dispersion medium in which graphene oxide is uniformly dispersed, and the graphene oxide is reduced to graphene; hence, the graphene flakes 321 remaining in the active material layer 102 partly overlap with each other and are dispersed such that surface contact is made, thereby forming an electrical conduction path. Note that graphene oxide can be reduced either by heat treatment or with the use of a reducing agent, for example.

Unlike a conductive additive in the form of particles, such as acetylene black, which makes point contact with an active material, the graphene flake 321 is capable of making low-resistance surface contact; accordingly, the electrical conduction between the active material particles 103 and the graphene flakes 321 can be improved without an increase in the amount of a conductive additive. Thus, the proportion of the active material particles 103 in the active material layer 102 can be increased. This can increase the discharge capacity of a power storage device.

Graphene flakes can be bonded to each other to form net-like graphene (hereinafter referred to as a graphene net). The graphene net covering the active material can function as a binder for binding particles. The amount of a binder can thus be reduced, or the binder does not have to be used. This can increase the proportion of the active material in the electrode volume or weight. That is to say, the capacity of the power storage device can be increased.

Figure 12B:
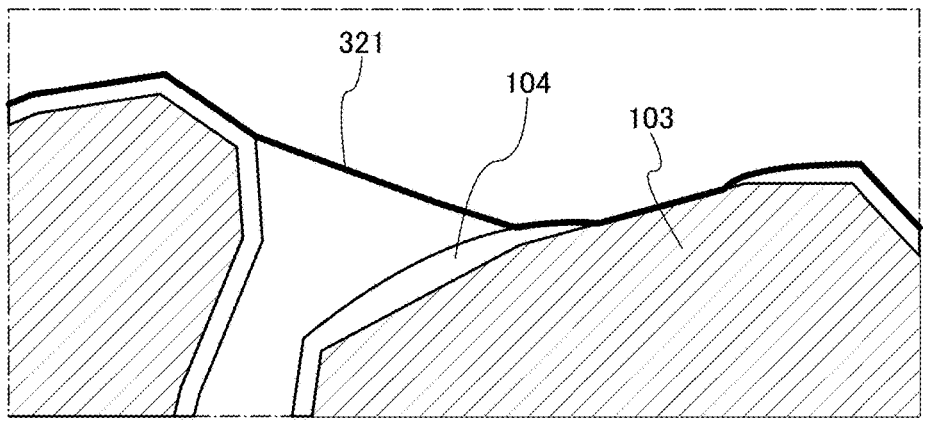

FIG. 12B is an enlarged view illustrating a region surrounded by a dashed dotted line in FIG. 12A. The binder 104 preferably exists in the shape of a layer on a surface of the active material particle 103. The graphene flake 321 preferably includes a region in contact with a surface of the binder 104. The binder 104 is located between the active material particle 103 and the graphene flake 321, for example. Preferably, the binder 104 is provided on the active material particle 103 and the graphene flake 321 is provided on the binder 104.

<Current Collector>

The current collector 101 can be formed using a material that has high conductivity, such as a metal like stainless steel, gold, platinum, aluminum, or titanium, or an alloy thereof. In the case where the current collector 101 is used in the positive electrode, it is preferred that it not dissolve at the potential of the positive electrode. In the case where the current collector 101 is used in the negative electrode, it is preferred that it not be alloyed with carrier ions such as lithium ions. Alternatively, the current collector 101 can be formed using an aluminum alloy to which an element that improves heat resistance, such as silicon, titanium, neodymium, scandium, or molybdenum, is added. Still alternatively, a metal element that forms silicide by reacting with silicon can be used. Examples of the metal element that forms silicide by reacting with silicon include zirconium, titanium, hafnium, vanadium, niobium, tantalum, chromium, molybdenum, tungsten, cobalt, nickel, and the like. The current collector 101 can have any of various shapes including a foil-like shape, a plate-like shape (sheet-like shape), a net-like shape, a punching-metal shape, and an expanded-metal shape. The current collector 101 preferably has a thickness of 5 μm to 30 μm inclusive.

Alternatively, a carbon material may be used for the current collector.

<Method for Fabricating Electrode>

In one embodiment of the present invention, slurry is formed and an electrode is fabricated by application of the slurry. It is preferred that dispersibility of an active material, a binder, a conductive additive, and the like of the electrode be increased in the slurry, in which case the strength of the electrode can be increased.

[Formation of Slurry]

Figure 13:
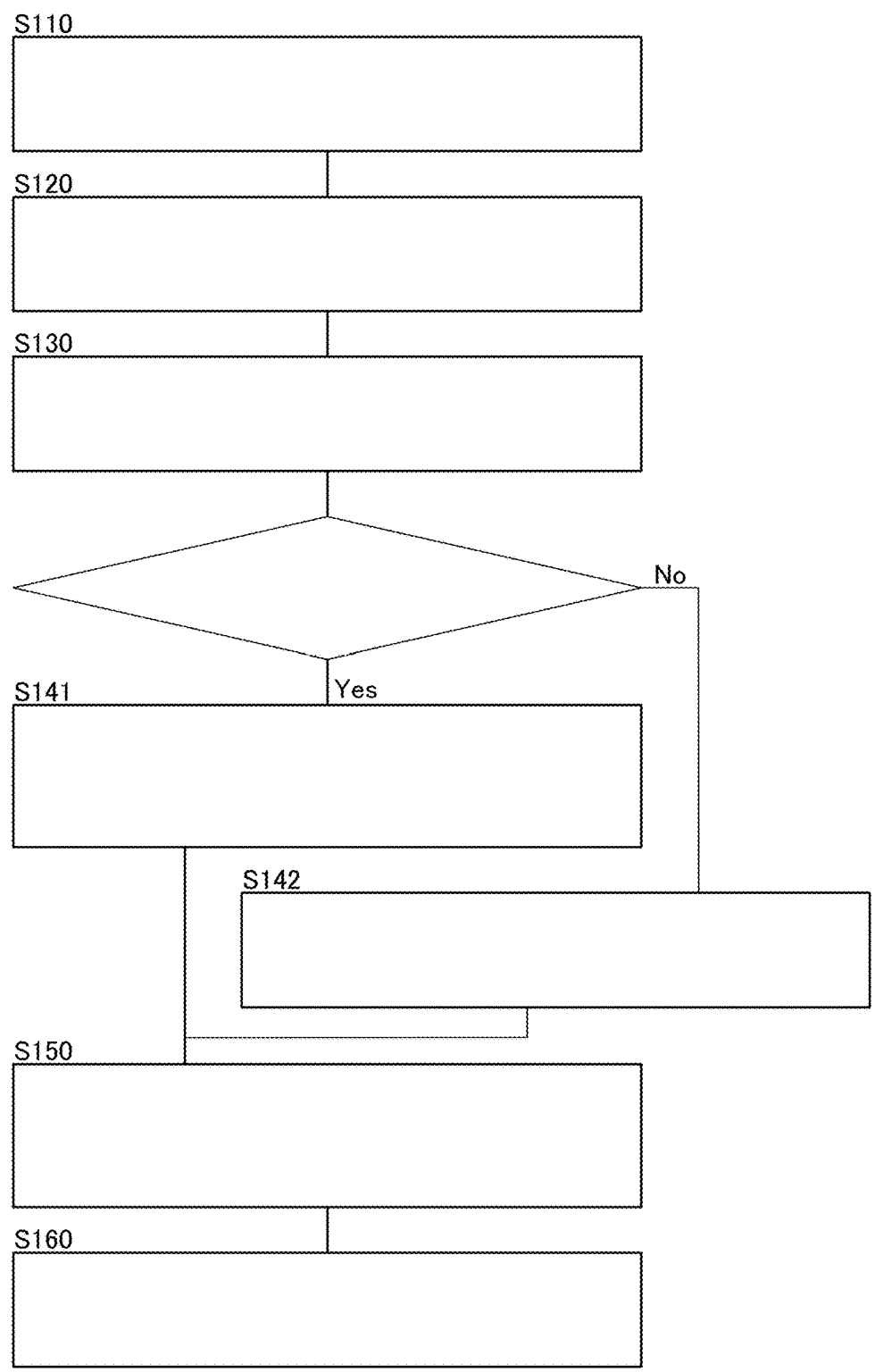
FIG. 13 is a flow chart showing a method for fabricating an electrode.

A method for forming slurry used for electrode fabrication will be described with reference to FIG. 13.

The electrode of one embodiment of the present invention can be fabricated by any of a variety of methods such as a coating method, a sheet method, and a printing method, among which a coating method is particularly preferable.

In the case where a coating method is employed, the electrode can be fabricated in such a manner, for example, that slurry is formed and applied to a current collector to form an active material layer on the current collector. The slurry can be formed by mixing a solvent and components of the active material layer. For example, in the case where the active material layer includes an active material, a binder, and a conductive additive, the active material, the binder, the conductive additive, and the solvent are mixed together. The mixing is preferably performed with a mixer, for example.

A polar solvent is preferably used as the solvent used for formation of the slurry. Examples of the polar solvent include water, methanol, ethanol, acetone, tetrahydrofuran (THF), dimethylformamide (DMF), N-methylpyrrolidone (NMP), dimethyl sulfoxide (DMSO), and a mixed solution of any two or more of the above.

First, the active material, the conductive additive, and the binder are mixed to form Mixture A (Step S110). Next, the solvent is added to Mixture A and kneading (mixing with a high viscosity) is performed, so that Mixture B is formed (Step S120). Here, Mixture B is preferably in a paste form, for example. In the case where a second binder is added in a later step S141, a first binder is not necessarily added in Step S110 in some cases.

Next, the solvent is added to Mixture B and kneading is performed, so that Mixture C is formed (Step S130).

Next, in the case where the second binder is used, the second binder is added to form Mixture D (Step S141). At this time, a solvent may be added. In the case where the second binder is not used, a solvent is added as needed to form Mixture E (Step S142).

Then, Mixture D or Mixture E is mixed in a reduced-pressure atmosphere to form Mixture F (Step S150). At this time, a solvent may be added. In the mixing and kneading steps in Steps S110 to S150, a mixer may be used, for example.

Next, the viscosity of Mixture F is measured (Step S160). After that, a solvent is added as needed to adjust the viscosity. Through the above steps, slurry for application of the active material layer is obtained.

Here, for example, the higher the viscosity of Mixtures C to F in Steps S130 to S160 is, the higher the dispersibility of the active material, the binder, and the conductive additive in the mixtures is (the better they are mixed together), in some cases. Thus, the viscosity F is preferably higher. However, an excessively high viscosity of Mixture F is not preferred in terms of productivity because it might reduce the electrode application speed.

[Formation 2 of Slurry]

Next, a specific example of a method for forming slurry will be described. The electrode of one embodiment of the present invention preferably includes a binder on an active material. Furthermore, the binder preferably includes the first material, and the first material in the binder preferably has a concentration distribution, for example. In the case where the binder is formed in the shape of a layer on the active material, the concentration of the first material is preferably particularly higher in the vicinity of the surface of the binder than in the other portion of the binder.

Thus, in the case where a mixture of a plurality of materials is used as the binder, the first material is preferably distributed on the surface side, for example, more than the other materials. To obtain such a distribution, it is preferred that the second material be added and mixing be performed after the active material and the first material are mixed.

Figure 16:
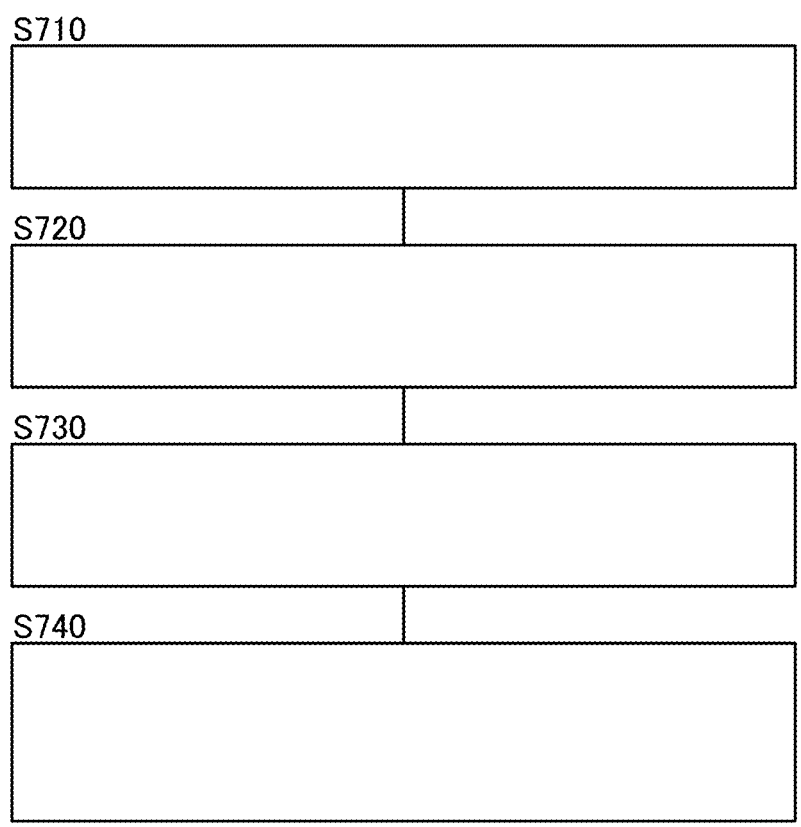
FIG. 16 is a flow chart showing a method for forming slurry.

An example of a method for fabricating the electrode will be described with reference to a flowchart in FIG. 16. Here, the first material and the second material are used for the binder.

Firstly, first mixing is performed to form Mixture S (Step S710). In the first mixing, the first material and the active material are mixed with each other. A conductive additive may also be mixed with them in Step S710.

Then, a solvent is added to Mixture S and mixing is performed, so that Mixture T is formed (Step S720). In the case where a conductive additive is not added in Step S710, a conductive additive may be added in Step S720.

After that, the second material is mixed into Mixture T to form Mixture U (Step S730). In the case where a conductive additive is not added in Steps S710 and S720, a conductive additive may be added in Step S730.

Then, the solvent is added to Mixture U and mixing is performed, so that Mixture V is formed as slurry (Step S740).

Note that the solvent may be added in two or more steps in Step S720, for example. For example, when a smaller amount of the solvent is added in the first step, the mixture that has a high viscosity and is in a paste form can be obtained. Mixing with a high viscosity may be referred to as kneading. Kneading may allow the binder to be formed in the shape of a layer on the active material, for example. Furthermore, kneading enables better dispersion of mixed components, in some cases.

As the first material, any of the above materials for the binder 104 can be used; a rubber material such as styrene-butadiene rubber (SBR), styrene-isoprene-styrene rubber, acrylonitrile-butadiene rubber, butadiene rubber, fluororubber, ethylene-propylene-diene copolymer is preferably used. As the second material, any of the above materials for the binder 104 can be used; water-soluble polymers are preferably used. For example, a polysaccharide or the like is preferably used. As the polysaccharide, for example, a cellulose derivative such as carboxymethyl cellulose (CMC), methyl cellulose, ethyl cellulose, hydroxypropyl cellulose, diacetyl cellulose, or regenerated cellulose, starch, or the like is preferably used.

As the solvent, a polar solvent can be used. Examples of the polar solvent include water, methanol, ethanol, acetone, tetrahydrofuran (THF), dimethylformamide (DMF), N-methylpyrrolidone (NMP), dimethyl sulfoxide (DMSO), and a mixed solution of any two or more of the above. In the case where a rubber material and a water-soluble polymer are used as the first material and the second material, respectively, water is preferably used as the solvent.

In one embodiment of the present invention, a region in which the binder is formed in the shape of a layer on the active material can be formed. For example, when a mixture including the active material and the second material is formed, kneading is performed, the first material is added into the mixture, and kneading is performed, the concentration of the first material in the vicinity of the surface of the layered binder may be able to be increased. Furthermore, time for performing kneading, the viscosity of slurry and each mixture in formation of the slurry, or the like is adjusted, whereby the concentration distribution of the first material in the binder in the shape of a layer may be able to be adjusted.

[Application of Active Material Layer]

Next, a method for forming the active material layer 102 on the current collector 101 with the use of the formed slurry will be described.

First, the slurry is applied to the current collector 101. Before the application of the slurry, surface treatment may be performed on the current collector 101. Examples of surface treatment include corona discharge treatment, plasma treatment, and undercoat treatment. Here, the "undercoat" refers to a film formed over a current collector before application of slurry onto the current collector for the purpose of reducing the interface resistance between an active material layer and the current collector or increasing the adhesion between the active material layer and the current collector. Note that the undercoat is not necessarily formed in a film shape, and may be formed in an island shape. In addition, the undercoat may serve as an active material to have capacity. For the undercoat, a carbon material can be used, for example. Examples of the carbon material include graphite, carbon black (registered trademark) such as acetylene black and ketjen black, and a carbon nanotube.

For the application of the slurry, a slot die method, a gravure method, a blade method, or combination of any of them can be used. Furthermore, a continuous coater or the like may be used for the application.

Then, the solvent of the slurry is volatilized to form the active material layer 102. The steps for volatilizing the solvent of the slurry are as follows, for example.

The step of volatilizing the solvent of the slurry is preferably performed at a temperature in the range from 50° C. to 200° C. inclusive, more preferably from 60° C. to 150° C. inclusive.

Heat treatment is performed using a hot plate at 30° C. or higher and 70° C. or lower in an air atmosphere for longer than or equal to 10 minutes, and then, for example, another heat treatment is performed at room temperature or higher and 100° C. or lower in a reduced-pressure environment for longer than or equal to 1 hour and shorter than or equal to 10 hours.

Alternatively, heat treatment may be performed using a drying furnace or the like. In the case of using a drying furnace, the heat treatment is performed at 30° C. or higher and 120° C. or lower for longer than or equal to 30 seconds and shorter than or equal to 20 minutes, for example.

The temperature may be increased in stages. For example, after heat treatment is performed at 60° C. or lower for shorter than or equal to 10 minutes, another heat treatment may further be performed at higher than or equal to 65° C. for longer than or equal to 1 minute.

The thickness of the active material layer 102 formed through the above steps is, for example, preferably greater than or equal to 5 μm and less than or equal to 300 μm, more preferably greater than or equal to 10 μm and less than or equal to 150 μm. Furthermore, the loading of the active material in the active material layer 102 is, for example, preferably greater than or equal to 2 mg/cm$^2$ and less than or equal to 50 mg/cm$^2$.

When the solvent of the slurry is volatilized, the active material, the conductive additive, and the binder might move, resulting in a reduction in dispersibilty thereof. For example, the concentration distribution of the binder might increase in the active material layer. Note that a higher viscosity of the slurry may be preferred, in which case a change in dispersibility after the solvent volatilization can be smaller. Furthermore, the rate at which the solvent of the slurry is volatilized may preferably be lower, in which case a change in dispersibility can be smaller.

The active material layer 102 may be formed over only one surface of the current collector 101, or the active material layers 102 may be formed such that the current collector 101 is sandwiched therebetween. Alternatively, the active material layers 102 may be formed such that part of the current collector 101 is sandwiched therebetween.

After the volatilization of the solvent from the active material layer 102, pressing may be performed by a compression method such as a roll press method or a flat plate press method. In performing pressing, heat may be applied.

Note that the active material layer 102 may be predoped. There is no particular limitation on the method for predoping the active material layer 102. For example, the active material layer 102 may be predoped electrochemically. For example, before the battery is assembled, the active material layer 102 can be predoped with lithium in an electrolytic solution described later with the use of a lithium metal as a counter electrode.

Specific Example 1 of Electrode Fabrication Method

An example of a method for fabricating an electrode when graphite is used as an active material in an active material layer, carbon fiber is used as a conductive additive, CMC-Na and SBR are used for a binder will be described below.

First, an example of a method for forming slurry will be described with reference to FIG. 14.

First, graphite, carbon fiber, and CMC-Na are mixed to form Mixture A (Step S110). Next, water is added to Mixture A and kneading is performed, so that Mixture B is formed (Step S120). Kneading is preferably performed with a planetary mixer, for example. Performing kneading enables favorable dispersion of graphite, carbon fiber, and CMC-Na.

Next, water is added to Mixture B and kneading is performed, so that Mixture C is formed (Step S130). Then, an SBR aqueous dispersion solution is added to Mixture C, water is further added to the mixture, and kneading is performed, so that Mixture D is formed (Step S141). After that, kneading is performed in a reduced-pressure atmosphere to form Mixture F (Step S150).

Next, the viscosity of Mixture F is measured (Step S160).

Then, Mixture F is applied to the current collector 101 using a continuous coater. After that, the solvent of Mixture F is volatilized by heat treatment using a drying furnace, so that the active material layer 102 is formed on the current collector 101. In the case where water is used as the solvent of the slurry, the heat treatment temperature is preferably, for example, higher than and equal to 30° C. and lower than or equal to 125° C., more preferably higher than and equal to 35° C. and lower than or equal to 90° C. For example, after heat treatment is performed at higher than or equal to 40° C. and lower than or equal to 60° C. for longer than or equal to 1 minute and shorter than or equal to 10 minutes, heat treatment is performed at higher than or equal to 65° C. and lower than or equal to 80° C. for longer than or equal to 1 minute and shorter than or equal to 10 minutes. Here, the lower the heat treatment temperature is, the lower the rate at which the solvent is volatilized might be.

Through the above steps, the electrode including the active material layer 102 on the current collector 101 is obtained.

Specific Example 2 of Electrode Fabrication Method

Next, an example of a method for fabricating an electrode in which SiO is used as an active material in an active material layer, acetylene black is used as a conductive additive, polyimide is used as a binder will be described.

An example of a method for forming slurry for application will be described with reference to FIG. 15.

First, SiO and acetylene black are mixed to form Mixture A (Step S110). Next, NMP is added to Mixture A and kneading is performed, so that Mixture B is formed (Step S120).

Then, NMP is added to Mixture B and kneading is performed, so that Mixture C is formed (Step S130). After that, an NMP solution, which is a precursor of polyimide, is added to Mixture C, so that Mixture D is formed (Step S141). After that, kneading is performed in a reduced-pressure atmosphere to form Mixture F (Step S150). Through the above steps, Mixture F is obtained as slurry for electrode application.

Next, the viscosity of Mixture F is measured (Step S160).

Then, Mixture F is applied to the current collector 101 using a continuous coater. After that, the solvent of Mixture F is volatilized by heat treatment using a drying furnace, so that the active material layer 102 is formed on the current collector 101. The heat treatment temperature is preferably, for example, higher than or equal to 30° C. and lower than or equal to 150° C., more preferably higher than or equal to 35° C. and lower than or equal to 110° C. The heat treatment time is preferably longer than or equal to 1 minute and shorter than or equal to 20 minutes, for example. Here, the lower the heat treatment temperature is, the lower the rate at which the solvent is volatilized might be. Alternatively, heat treatment may be performed at 50° C. or higher and 200° C. or lower, preferably at 60° C. or higher and 150° C. or lower, for longer than or equal to 1 hour and shorter than or equal to 10 hours, for example.

Through the above steps, the electrode including the active material layer 102 on the current collector 101 is obtained.

<Strength of Electrode>

An example of a method for examining the strength of the electrode of one embodiment of the present invention will be described.

As an example of the method for examining the electrode strength, a separation strength test will be described. In the separation strength test of the electrode, a current collector and an active material layer of the electrode are separated from each other at the interface therebetween and the force needed for the separation is measured, for example. Alternatively, separation is performed in the active material layer of the electrode and the force needed for the separation is measured.

<Separation Test>

Here, the case where the current collector is separated from the active material layer will be described, for example. In one embodiment of the present invention, the current collector is folded at an angle of 180° with respect to the active material layer and pulled in the direction in which the current collector is folded, the active material layer and the current collector are separated from each other, and the separation strength at that time is measured, for example. Separation is preferably performed at the interface between the active material layer and the current collector.

Figure 17A:
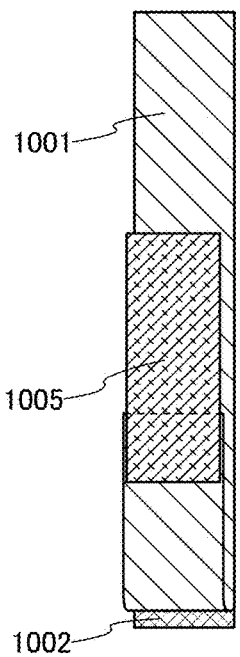
FIGS. 17A to 17C are perspective views illustrating an electrode separation test.
Figure 17B:
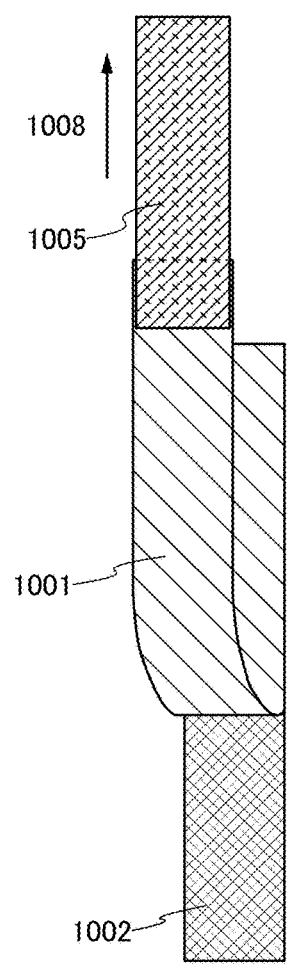

An example of a procedure of the separation test is as follows. FIGS. 17A and 17B are perspective views illustrating the state of the separation test. Before the separation, the active material layer 1002 is provided on the current collector 1001.

The current collector 1001 is separated from the active material layer 1002. After that, a tape 1005 is attached to the edge of the separated portion of the current collector 1001, and the tape 1005 is turned back at an angle of 180° (see FIG. 17A).

Figure 17C:
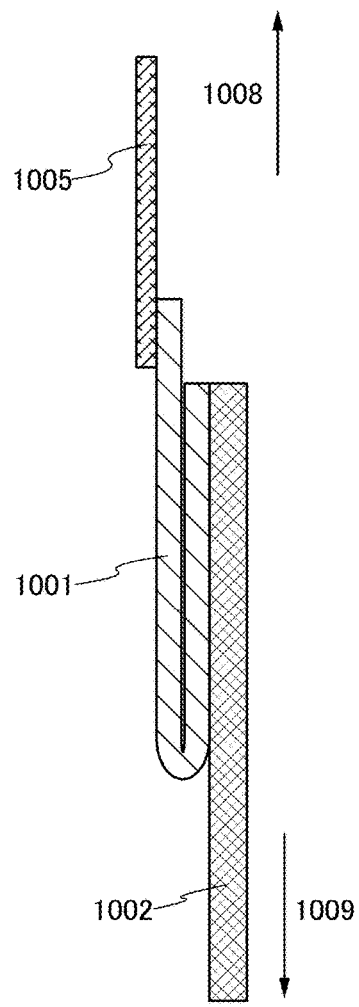

Next, the tape 1005 is pulled to separate the current collector 1001 from the active material layer 1002, and the force at the time of the separation is measured (see FIG. 17B). FIG. 17C is a cross-sectional view of FIG. 17B. An arrow 1008 illustrated in FIG. 17C indicates the direction in which the current collector 1001 is folded, and an arrow 1009 indicates the direction opposite to the arrow 1008 direction. The separation test is performed such that the angle formed by the arrow 1008 and the arrow 1009 equals to 180°.

Figure 18A:
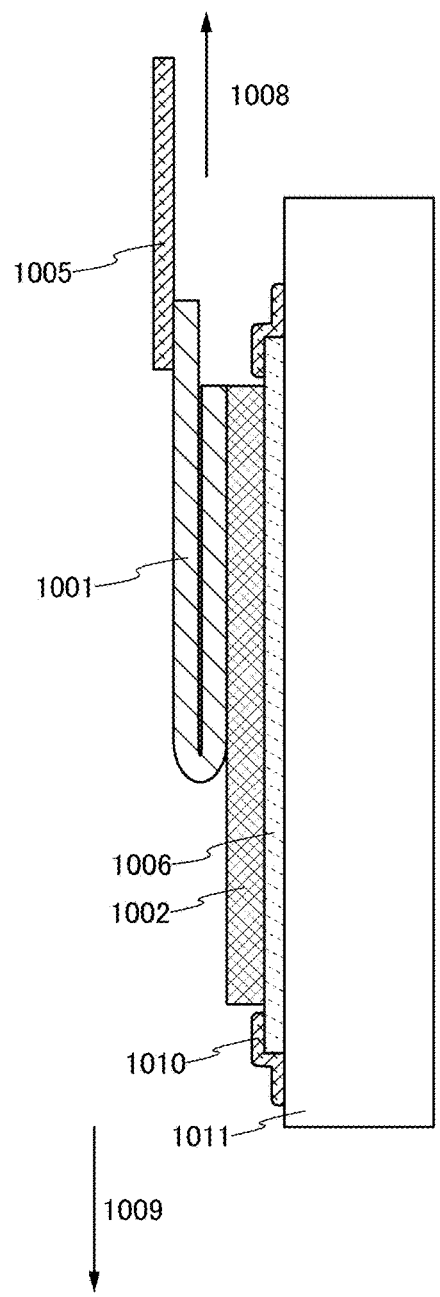
FIGS. 18A and 18B are perspective views each illustrating an electrode separation test.
Figure 18B:
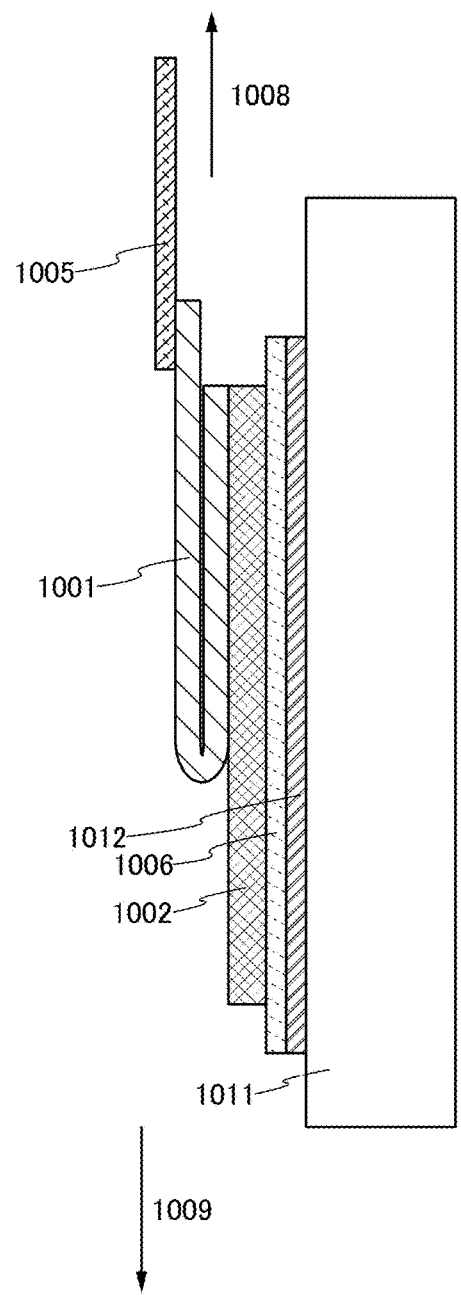

FIGS. 18A and 18B illustrate specific examples. As illustrated in FIG. 18A, the tape 1006 is attached to the active material layer 1002, and an end of the current collector 1001 is separated from the active material layer 1002. The tape 1005 is attached to the end of the separated portion of the current collector 1001. After that, the sample is fixed to a plate 1011 with the use of a tape 1010. Alternatively, the sample may be fixed to the plate 1011 with the use of a double-faced tape 1012 as illustrated in FIG. 18B. After that, the tape 1005 is pulled to perform a separation test.

Figure 19A:
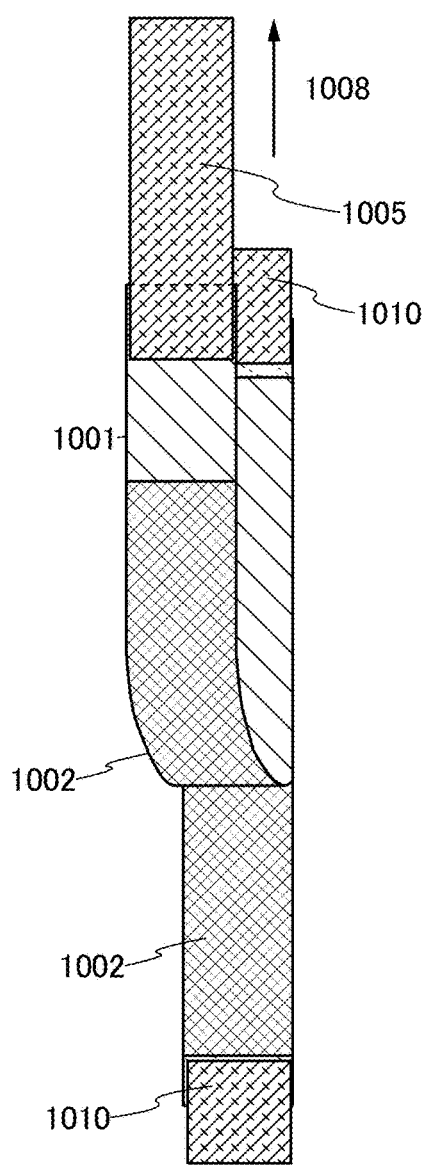
FIGS. 19A and 19B are a perspective view and a cross-sectional view illustrating an electrode separation test.
Figure 19B:
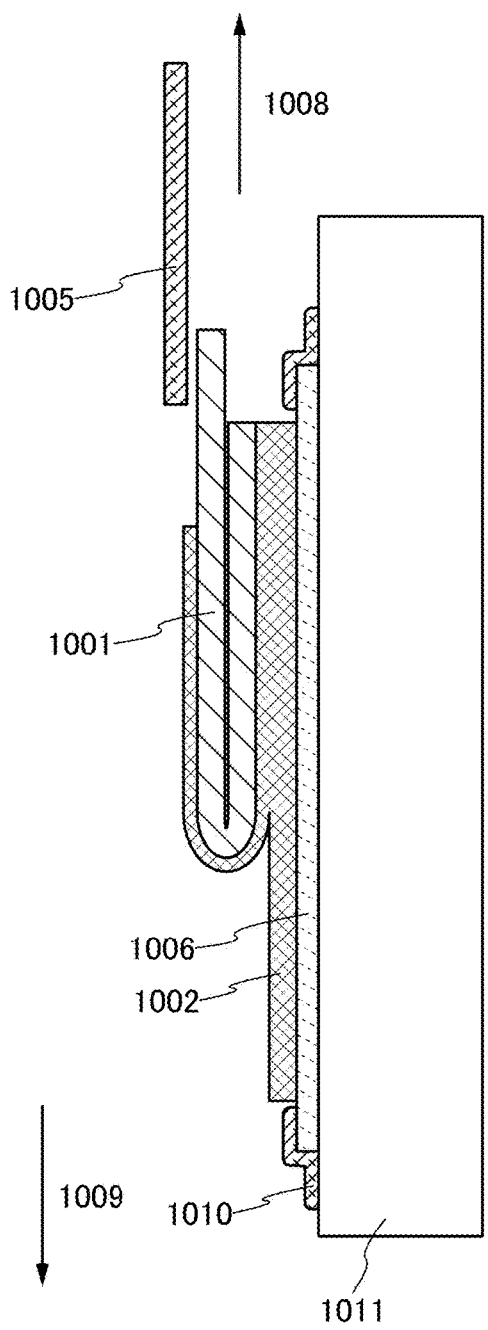

The separation illustrated in FIGS. 17A to 17C and FIGS. 18A and 18B may be caused in the active material layer as illustrated in a perspective view in FIG. 19A. FIG. 19B is a cross-sectional view corresponding to FIG. 19A.

The rate at which the current collector 1001 is separated in the separation test is preferably higher than or equal to 0.1 mm/min. and lower than or equal to 100 mm/min., for example.

Figure 61:
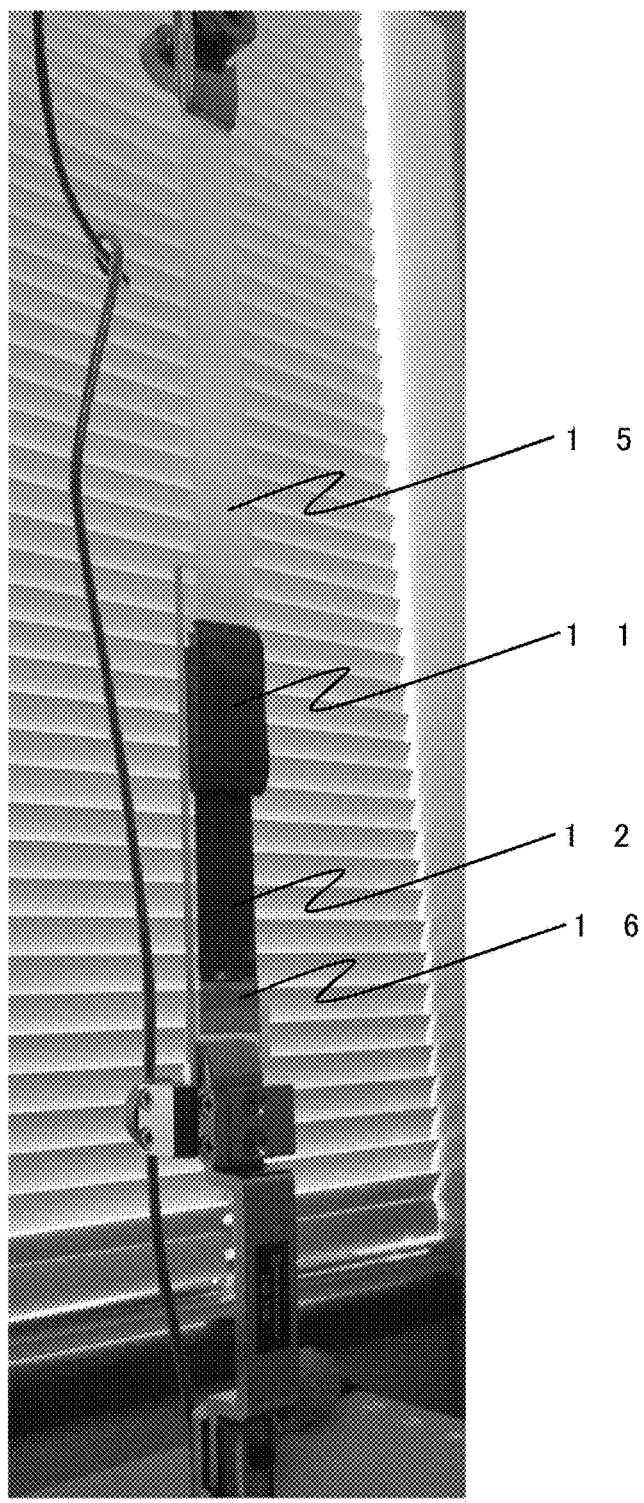
FIG. 61 is a photograph showing a separation test.

FIG. 61 is a photograph showing an example of the separation test. The tape 1005 that is attached to the end of the separated portion of the current collector 1001 is fixed with an upper jig, and the tape 1006 attached to the active material layer 1002 is fixed with a lower jig. The upper jig is pulled up at a constant rate, and the force is measured.

Figure 62:
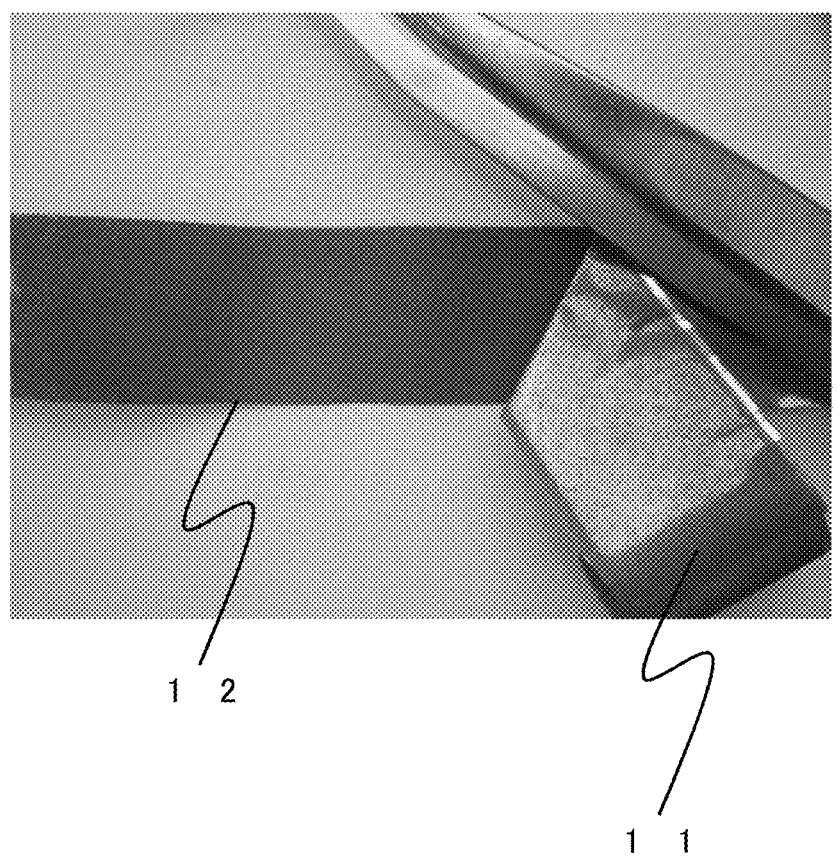
FIG. 62 is a photograph showing a current collector and an active material layer after separation.

FIG. 62 is a photograph showing an example of the sample after the separation test. The current collector 1001 is separated from the active material layer 1002.

Note that the separation strength when the current collector and the active material layer are separated from each other is preferably, for example, higher than or equal to 0.10 N. The width of the active material layer of the sample used for the separation test is, for example, greater than or equal to 10 mm and less than or equal to 30 mm. The width of the tape 1005 is preferably 60% or more and 140% or less of the width of the sample that is used for the separation test. The separation strength normalized by the width of a region of the sample that is separated (for example, the width of the separated portion of the active material layer) or the width of the tape 1005 is preferably, for example, greater than or equal to 0.05 N/cm. In the case where at least one of CMC-Na and SBR is used as a binder, the separation strength is preferably, for example, greater than or equal to 0.10 N/cm. Alternatively, in the case where PVDF is used as a binder, the separation strength is preferably greater than or equal to 0.25 N/cm, more preferably greater than or equal to 0.5 N/cm. Alternatively, in the case where polyimide is used as a binder, the separation strength is preferably greater than or equal to 0.5 N/cm, more preferably greater than or equal to 1.0 N/cm.

In the case where graphite is used as an active material and at least one of CMC-Na and SBR is used as a binder, the separation strength is preferably, for example, higher than or equal to 0.1 N. Furthermore, the separation strength is preferably higher than or equal to 0.05 N/cm, more preferably higher than or equal to 0.10 N/cm, still more preferably higher than or equal to 0.13 N/cm. Here, the specific surface area of graphite is preferably, for example, smaller than or equal to 10 $m^2/g$, more preferably smaller than or equal to 7 $m^2/g$, still more preferably larger than or equal to 0.2 $m^2/g$ and smaller than or equal to 4 $m^2/g$. Graphite preferably has a spherical shape. As graphite, spherical graphite may be used. Alternatively, for example, in the case where graphite is used as an active material and at least one of CMC-Na and SBR is used as a binder, the separation strength is, for example, lower than or equal to 5 N/cm, lower than or equal to 3 N/cm, or lower than or equal to 2 N/cm.

Alternatively, for example, in the case where an active material containing silicon is used and polyimide is used as a binder, the separation strength is preferably, for example, higher than or equal to 1.0 N. Furthermore, the separation strength is preferably higher than or equal to 0.5 N/cm, more preferably higher than or equal to 1.0 N/cm, still more preferably higher than or equal to 1.5 N/cm. Alternatively, for example, in the case where an active material containing silicon is used and polyimide is used as a binder, the separation strength is, for example, lower than or equal to 10 N/cm or lower than or equal to 5 N/cm.

A change in the thickness of the active material layer by charge and discharge operations of a storage battery is assumed to be ΔS. The separation strength is preferably higher than or equal to 1.0 N when ΔS is 5% or more and 200% or less, preferably 10% or more and 80% or less of the smallest thickness. Furthermore, the separation strength is preferably higher than or equal to 0.5 N/cm, more preferably higher than or equal to 1.0 N/cm, still more preferably higher than or equal to 1.5 N/cm. The separation strength is, for example, lower than or equal to 10 N/cm or lower than or equal to 5 N/cm. Here, as a binder, polyimide can be used, for example.

<Separation Strength after Immersion in Solution>

Figure 20:
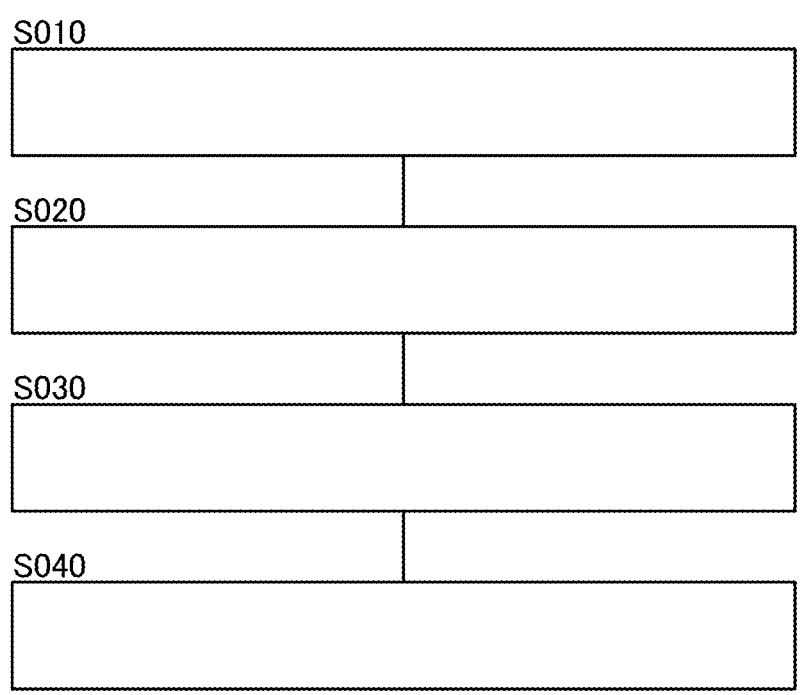
FIG. 20 is a flow chart showing a test method.

The separation strength may be measured after the electrode is immersed in a solution such as an electrolytic solution. An example of the procedure will be described with reference to FIG. 20. First, the electrode is immersed in a first solution (Step S010). Heating may be performed in Step S010. The heating temperature is, for example, higher than or equal to 40° C. and lower than or equal to 80° C. Heating time is, for example, longer than or equal to 1 hour, longer than or equal to 3 hours and shorter than or equal to 1000 hours, longer than or equal to 5 hours and shorter than or equal to 500 hours, or longer than or equal to 10 hours and shorter than or equal to 300 hours. A heating atmosphere is preferably an inert atmosphere. For example, an argon gas atmosphere is used. Furthermore, either an atmospheric pressure atmosphere or a reduced-pressure atmosphere can be used.

The first solution preferably contains a solvent and a salt that are used in an electrolytic solution of a storage battery. The use of the solvent and the salt used in the electrolytic solution of the storage battery is preferred, in which case a load when a change in the electrode during the use of the storage battery is assumed can be applied. The case where the first solution contains a first solvent and a salt will be described below.

As the first solvent, an aprotic organic solvent can be used, for example. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

A gelled high-molecular material may be used as the first solvent. Typical examples of the high-molecular material that undergoes gelation include a silicone gel, an acrylic gel, an acrylonitrile gel, a polyethylene oxide-based gel, a polypropylene oxide-based gel, a fluorine-based polymer gel, and the like.

Alternatively, one or more kinds of ionic liquids (room temperature molten salts) which have features of non-flammability and non-volatility may be used as the first solvent. An ionic liquid contains a cation and an anion. The ionic liquid of one embodiment of the present invention contains an organic cation and an anion. Examples of the organic cation used for the electrolytic solution include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolytic solution include a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

As the salt that is contained in the first solution, for example, one or more lithium salts such as $LiPF_6$, $LiClO_4$, $LiAsF_6$, $LiBF_4$, $LiAlCl_4$, LiSCN, LiBr, LiI, $Li_2SO_4$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used in an appropriate combination and in an appropriate ratio. Alternatively, a salt containing a metal such as an alkali metal other than lithium (e.g., sodium or potassium) may be used as the salt that is contained in the first solution. Alternatively, a salt containing a metal such as an alkaline earth metal (e.g., calcium, strontium, barium, beryllium, or magnesium) may be used.

Next, the electrode is immersed in a second solution in a washing step (Step S020). Next, the solvent is volatilized (Step S030). An atmosphere for volatilizing the solvent can be either a reduced-pressure atmosphere or an air atmosphere. Alternatively, heat treatment may be performed to volatilize the solvent. The heating temperature is, for example, higher than or equal to room temperature and lower than or equal to 100° C., higher than or equal to room temperature and lower than or equal to 80° C., or higher than or equal to room temperature and lower than or equal to 60° C. For example, the solvent can be volatilized at room temperature in a reduced-pressure atmosphere.

As a second solvent, for example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio. For the second solvent, the material that is used as the solvent of the electrolytic solution can be referred to.

Next, an electrode separation strength test is performed (Step S040).

The separation strength when the 180° separation test is performed on the electrode after Steps S010 to S030 are performed is preferably, for example, higher than or equal to 0.10 N. The width of the active material layer of the sample used for the separation test is, for example, greater than or equal to 10 mm and less than or equal to 30 mm. The width of the tape 1005 is preferably 60% or more and 140% or less of the width of the sample that is used for the separation test. The separation strength normalized by the width of the sample or the width of the tape 1005 is preferably, for example, greater than or equal to 0.05 N/cm. In the case where at least one of CMC-Na and SBR is used as a binder, the separation strength is preferably, for example, greater than or equal to 0.10 N/cm. Alternatively, in the case where PVDF is used as a binder, the separation strength is preferably greater than or equal to 0.25 N/cm, more preferably greater than or equal to 0.5 N/cm. Alternatively, in the case where polyimide is used as a binder, the separation strength is preferably greater than or equal to 0.5 N/cm, more preferably greater than or equal to 1.0 N/cm.

In the case where graphite is used as an active material and at least one of CMC-Na and SBR is used as a binder, the separation strength after immersion in the first solution is preferably, for example, higher than or equal to 0.10 N. Furthermore, the separation strength is preferably higher than or equal to 0.05 N/cm, more preferably higher than or equal to 0.10 N/cm, still more preferably higher than or equal to 0.13 N/cm. Here, the specific surface area of graphite is preferably, for example, smaller than or equal to 10 m$^2$/g, more preferably smaller than or equal to 7 m$^2$/g, still more preferably larger than or equal to 0.2 m$^2$/g and smaller than or equal to 4 m$^2$/g. Graphite preferably has a spherical shape. As graphite, spherical graphite may be used. Alternatively, for example, in the case where graphite is used as an active material and at least one of CMC-Na and SBR is used as a binder, the separation strength after immersion in the first solution is, for example, lower than or equal to 5 N/cm, lower than or equal to 3 N/cm, or lower than or equal to 2 N/cm.

Alternatively, for example, in the case where an active material containing silicon is used and polyimide is used as a binder, the separation strength after immersion in the first solution is preferably, for example, higher than or equal to 1.0 N. Furthermore, the separation strength is preferably higher than or equal to 0.5 N/cm, more preferably higher than or equal to 1.0 N/cm, still more preferably higher than or equal to 1.5 N/cm. Alternatively, for example, in the case where an active material containing silicon is used and polyimide is used as a binder, the separation strength is, for example, lower than or equal to 10 N/cm or lower than or equal to 5 N/cm.

A change in the thickness of the active material layer by charge and discharge operations of a storage battery is assumed to be ΔS. The separation strength after immersion in the first solution is preferably higher than or equal to 1.0 N when ΔS is 5% or more and 200% or less, preferably 10% or more and 80% or less of the smallest thickness. Furthermore, the separation strength is preferably higher than or equal to 0.5 N/cm, more preferably higher than or equal to 1.0 N/cm, still more preferably higher than or equal to 1.5 N/cm. The separation strength is, for example, lower than or equal to 10 N/cm or lower than or equal to 5 N/cm. Here, as a binder, polyimide can be used, for example.

<Change in Volume of Active Material>

Figure 21A:
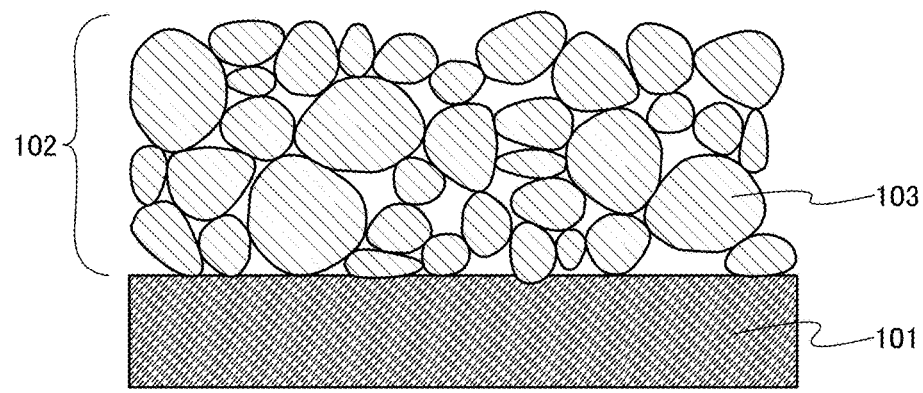
FIGS. 21A and 21B are cross-sectional views of an electrode.
Figure 21B:
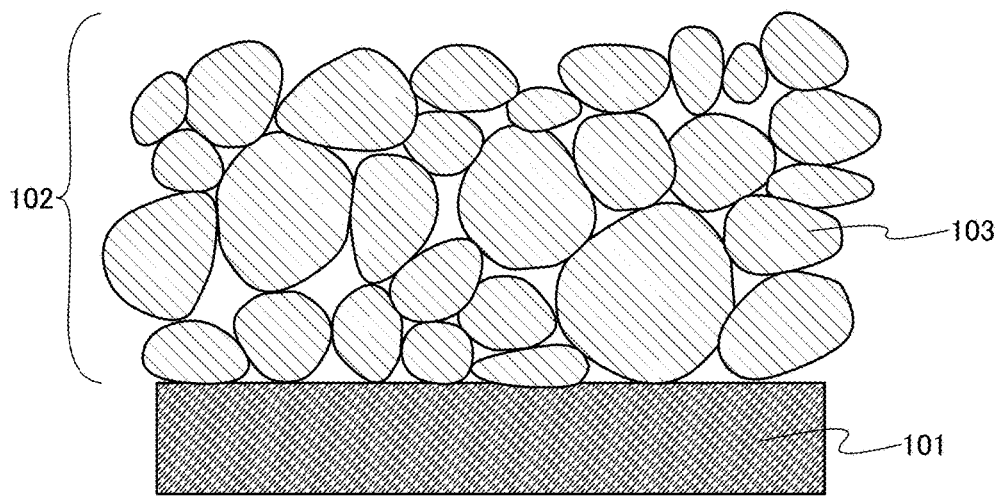

The volume of active materials is changed by charge and discharge operations of a storage battery in some cases. The change in the volume of the active materials may be calculated from a change in the area of cross sections of the active materials, for example. FIG. 21B is a schematic diagram illustrating a cross section of an electrode after a charge operation of a storage battery or after lithium reception by active materials. FIG. 21A is a schematic diagram illustrating a cross section of the electrode after discharge of the storage battery or after lithium release from the active materials.

The average value of the areas of cross sections of the active materials illustrated in FIG. 21B is represented by A1, and the average value of the areas of cross sections of the active materials illustrated in FIG. 21A is represented by A2. A change in the volume of the active materials can be expressed as the ratio of A1 to A2 (A1/A2). Alternatively, it can be expressed as a value obtained by dividing the absolute value of a difference between A1 and A2 by A2, as a rate of change in the volume of the active materials.

Here, an example of observing the state where the volume of the active materials increases by lithium reception and decreases by lithium release will be described.

A storage battery was fabricated using lithium iron phosphate as a positive electrode active material and silicon as a negative electrode active material. The composition of a negative electrode active material layer was set such that the proportion of silicon is 80 wt % with respect to the total weight of silicon, a conductive additive, and a binder. The weight per unit volume of the active materials is 13.6 mg/cm$^2$ for a positive electrode and 0.7 mg/cm$^2$ for a negative electrode. The thickness of the active material layer is 112 μm for the positive electrode and 14 μm for the negative electrode. When the capacity of the positive electrode active material is 170 mAh/g and the capacity of the negative electrode active material is 4200 mAh/g, the ratio of positive electrode capacity to negative electrode capacity is 0.79.

Figure 22:
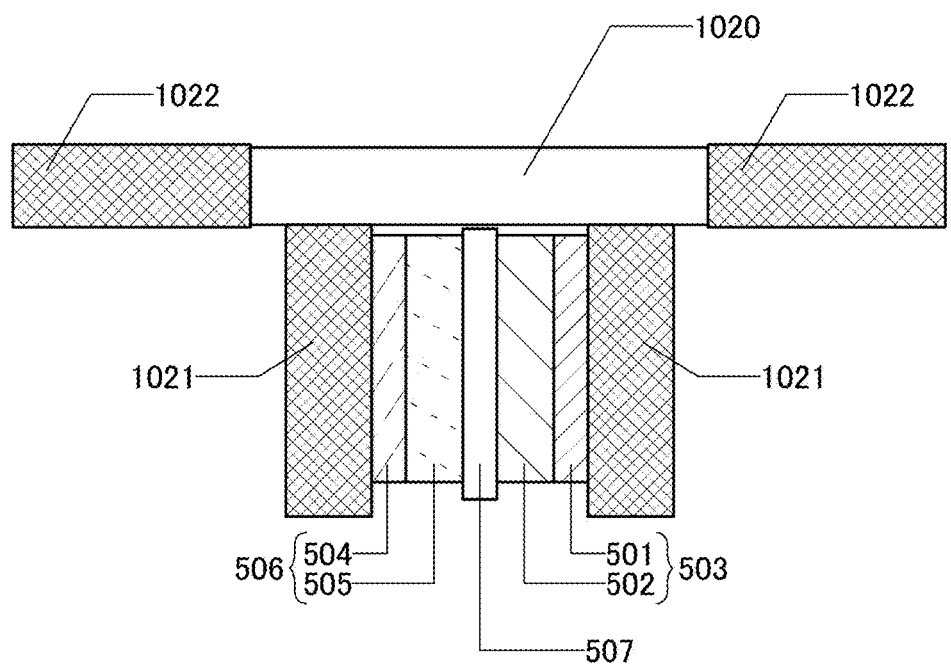
FIG. 22 is a cross-sectional view of a storage battery.

A positive electrode 503, a separator 507, and a negative electrode 506 were sandwiched by plates 1021 as illustrated in a schematic diagram in FIG. 22, and a change in the thickness of an active material layer by charge and discharge operations was observed through a window 1020 with a confocal microscope. Note that the positive electrode 503, the separator 507, and the negative electrode 506 were positioned in a space into which an electrolytic solution was injected, and the space was sealed with the window 1020, the plate 1022, and the like. Charging was performed at a constant current until an upper limit voltage of 4 V was reached, and discharging was performed at a constant current until a lower limit voltage of 2 V was reached. Discharge capacity per unit weight of the positive electrode active material is approximately 90 mAh/g.

Figure 23A:
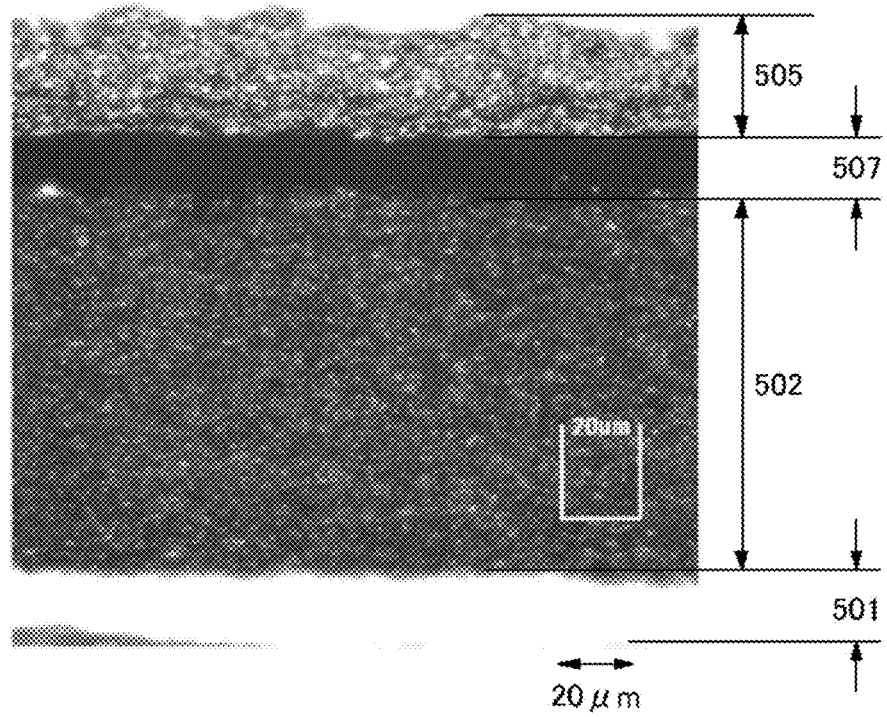
FIGS. 23A and 23B are optical micrographs showing a cross section of a storage battery.
Figure 23B:
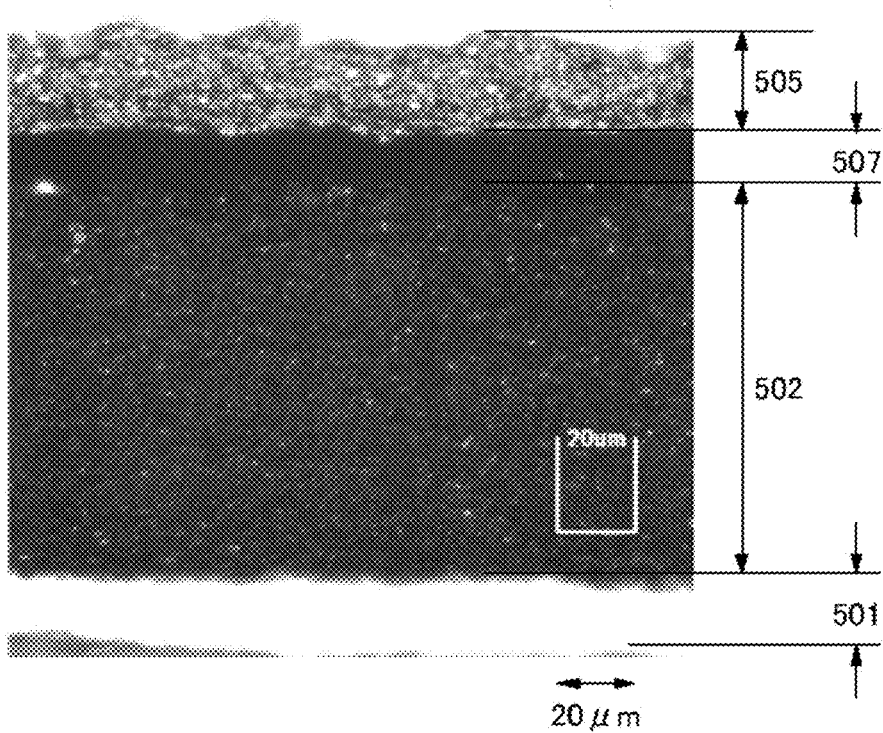

FIG. 23A shows an observation result after charging, and FIG. 23B shows an observation result after discharging. For the observation, a confocal system manufactured by Lasertec Corporation was used. In FIG. 23A, the thickness of a negative electrode active material layer 505 is approximately 33.8 μm (represented by X), and in FIG. 23B, the thickness of the negative electrode active material layer 505 is approximately 28.0 μm (represented by Y). Assuming that ΔS=(X−Y)÷Y×100 [%] is satisfied, ΔS is calculated to be 21%.

In Embodiment 1, one embodiment of the present invention has been described. Other embodiments of the present invention will be described in Embodiments 2 to 6. Note that one embodiment of the present invention is not limited to the above. That is, since various embodiments of the present invention are disclosed in Embodiment 1 to 6, one embodiment of the present invention is not limited to a specific embodiment. The example in which one embodiment of the present invention is applied to a lithium-ion secondary battery is described; however, one embodiment of the present invention is not limited thereto. Depending on circumstances or conditions, one embodiment of the present invention can be applied to a variety of secondary batteries such as a lead storage battery, a lithium-ion polymer secondary battery, a nickel-hydrogen storage battery, a nickel-cadmium storage battery, a nickel-iron storage battery, a nickel-zinc storage battery, a silver oxide-zinc storage battery, a solid-state battery, an air battery, a zinc air battery, and a lithium air battery; a primary battery; a capacitor such as an electric double layer capacitor, an ultracapacitor, a supercapacitor, and a lithium-ion capacitor; and the like. Alternatively, for example, depending on circumstances or conditions, one embodiment of the present invention is not necessarily applied to a lithium-ion secondary battery.

This embodiment can be implemented in appropriate combination with any of the structures described in the other embodiments.

Embodiment 2

Described in this embodiment will be an example of a power storage device using the electrode of one embodiment of the present invention.

Note that the power storage device in this specification and the like indicates all elements and devices that have the function of storing electric power. For example, a storage battery such as a lithium-ion secondary battery, a lithium-ion capacitor, and an electric double layer capacitor are included in the category of the power storage device.

<Thin Storage Battery>

Figure 24:
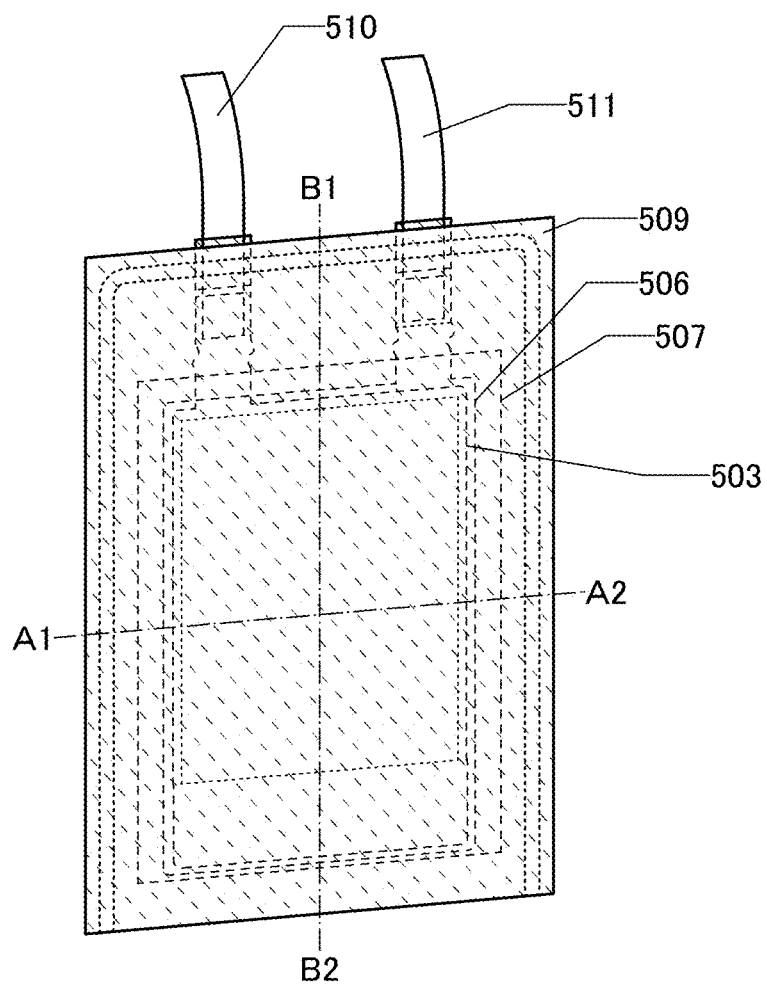
FIG. 24 illustrates a storage battery.

FIG. 24 illustrates a thin storage battery as an example of a storage device. When a flexible thin storage battery is used in an electronic device at least part of which is flexible, the storage battery can be bent as the electronic device is bent.

Figure 25A:
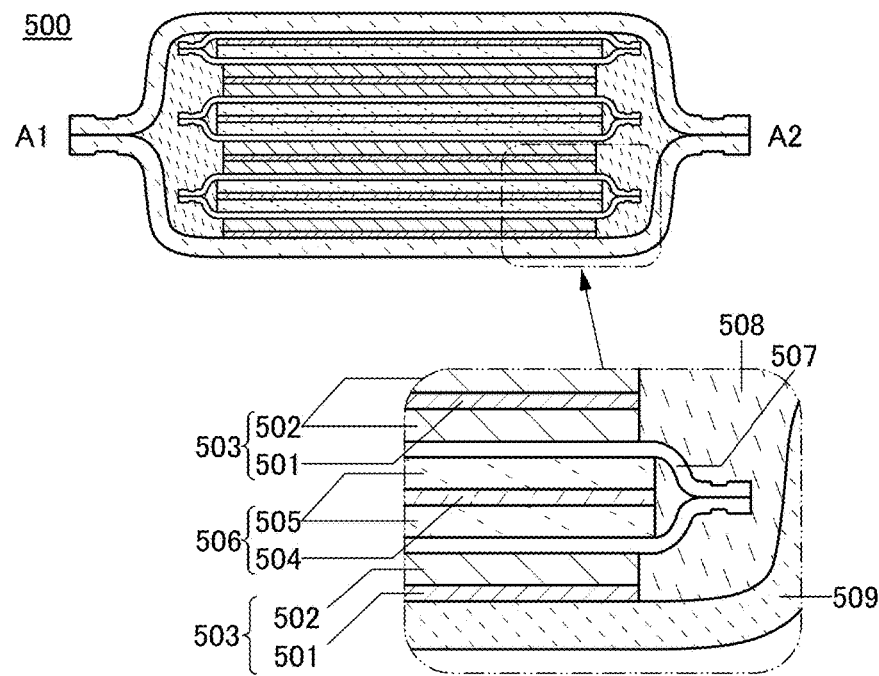
FIGS. 25A and 25B are each a cross-sectional view of a storage battery.
Figure 25B:
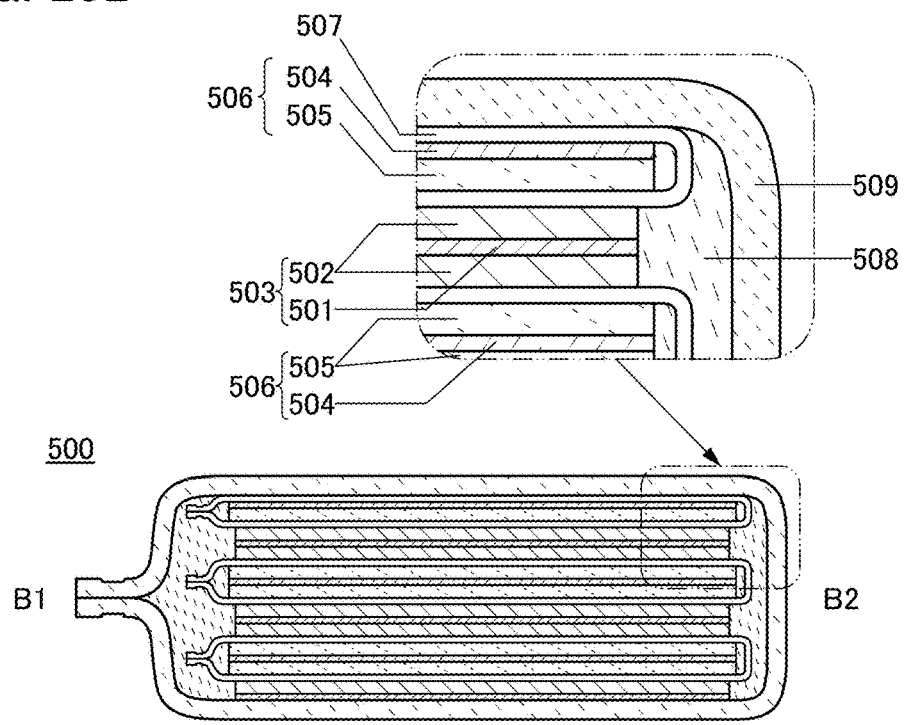

FIG. 24 is an external view of a thin storage battery 500. FIG. 25A is a cross-sectional view along dashed-dotted line A1-A2 in FIG. 24, and FIG. 25B is a cross-sectional view along dashed-dotted line B1-B2 in FIG. 24. The thin storage battery 500 includes a positive electrode 503 including a positive electrode current collector 501 and a positive electrode active material layer 502, a negative electrode 506 including a negative electrode current collector 504 and a negative electrode active material layer 505, a separator 507, an electrolytic solution 508, and an exterior body 509. The separator 507 is provided between the positive electrode 503 and the negative electrode 506 in the exterior body 509. The electrolytic solution 508 is contained in the exterior body 509.

As a solvent of the electrolytic solution 508, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

When a high-molecular material that undergoes gelation is used as a solvent of the electrolytic solution, safety against liquid leakage and the like is improved. Furthermore, a secondary battery can be thinner and more lightweight. Typical examples of the high-molecular material that undergoes gelation include a silicone gel, an acrylic gel, an acrylonitrile gel, a polyethylene oxide-based gel, a polypropylene oxide-based gel, a fluorine-based polymer gel, and the like.

Alternatively, the use of one or more kinds of ionic liquids (room temperature molten salts) which have features of non-flammability and non-volatility as a solvent of the electrolytic solution can prevent a power storage device from exploding or catching fire even when a power storage device internally shorts out or the internal temperature increases owing to overcharging or the like. An ionic liquid contains a cation and an anion. The ionic liquid of one embodiment of the present invention contains an organic cation and an anion. Examples of the organic cation used for the electrolytic solution include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolytic solution include a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

In the case of using lithium ions as carriers, as an electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)$ $(CF_3SO_2)$, and $LiN(C_2F_5SO_2)_2$ can be used, or two or more of these lithium salts can be used in an appropriate combination in an appropriate ratio.

The electrolytic solution used for a power storage device is preferably highly purified and contains a small amount of dust particles and elements other than the constituent elements of the electrolytic solution (hereinafter, also simply referred to as impurities). Specifically, the weight ratio of impurities to the electrolytic solution is less than or equal to 1%, preferably less than or equal to 0.1%, and more preferably less than or equal to 0.01%.

Furthermore, an additive agent such as vinylene carbonate, propane sultone (PS), tert-butylbenzene (TBB), fluoroethylene carbonate (FEC), or LiBOB may be added to the electrolytic solution. The concentration of such an additive agent in the whole solvent is, for example, higher than or equal to 0.1 wt % and lower than or equal to 5 wt %.

Alternatively, a gelled electrolyte obtained in such a manner that a polymer is swelled with an electrolytic solution may be used.

Examples of host polymers include a polymer having a polyalkylene oxide structure, such as polyethylene oxide (PEO); PVDF; polyacrylonitrile; and a copolymer containing any of them. For example, PVDF-HFP, which is a copolymer of PVDF and hexafluoropropylene (HFP) can be used. The formed polymer may be porous.

Instead of the electrolytic solution, a solid electrolyte including an inorganic material such as a sulfide-based inorganic material or an oxide-based inorganic material, or a solid electrolyte including a macromolecular material such as a polyethylene oxide (PEO)-based macromolecular material may alternatively be used. When the solid electrolyte is used, a separator and a spacer are not necessary. Furthermore, the battery can be entirely solidified; therefore, there is no possibility of liquid leakage and thus the safety of the battery is dramatically increased.

As the separator 507, paper; nonwoven fabric; glass fiber; ceramics; synthetic fiber containing nylon (polyamide), vinylon (polyvinyl alcohol-based fiber), polyester, acrylic, polyolefin, or polyurethane; or the like can be used.

Figure 29A:
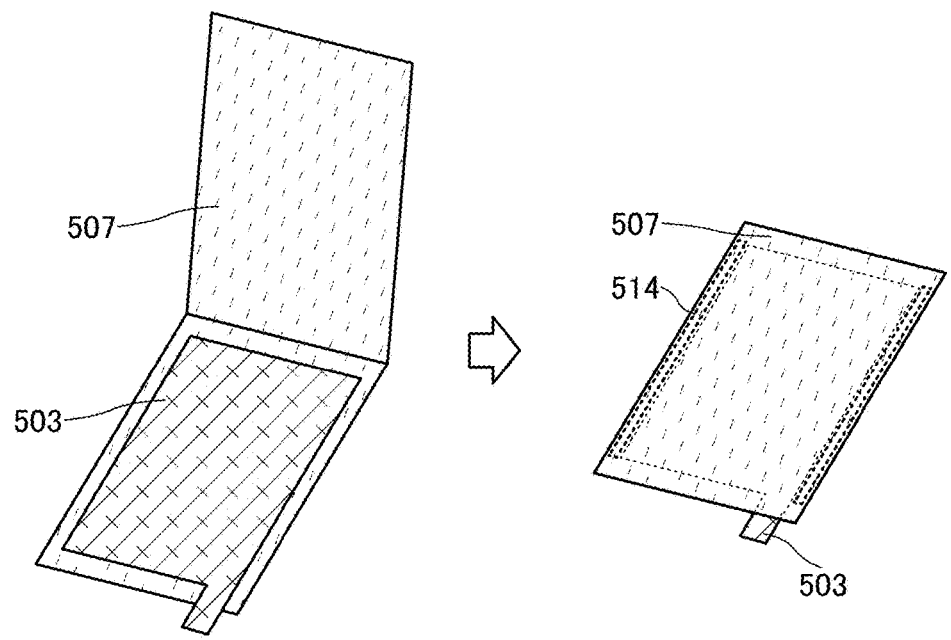
FIGS. 29A and 29B illustrate a method for fabricating a storage battery.
Figure 29B:
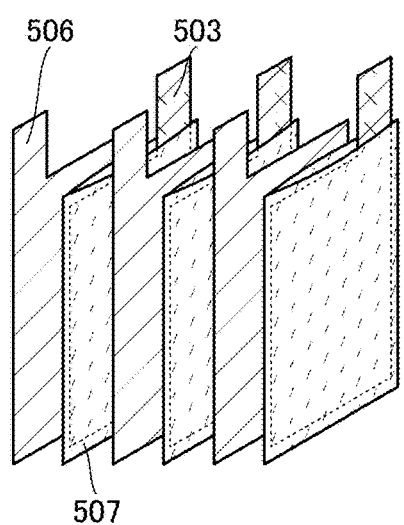

The separator 507 is preferably formed to have a bag-like shape to surround one of the positive electrode 503 and the negative electrode 506. For example, as illustrated in FIG. 29A, the separator 507 is folded in two so that the positive electrode 503 is sandwiched, and sealed with a sealing member 514 in a region outside the region overlapping with the positive electrode 503; thus, the positive electrode 503 can be reliably supported inside the separator 507. Then, as illustrated in FIG. 29B, the positive electrodes 503 surrounded by the separators 507 and the negative electrodes 506 are alternately stacked and provided in the exterior body 509, whereby the thin storage battery 500 can be formed.

As at least one of the positive electrode 503 and the negative electrode 506, the electrode of one embodiment of the present invention is preferably used. The electrode of one embodiment of the present invention may be used as each of the positive electrode 503 and the negative electrode 506.

Here, for example, the electrode described in Embodiment 1 is used as the negative electrode 506. As a binder and a negative electrode active material that are included in the negative electrode 506, the binder and the negative electrode active material that are described in Embodiment 1 can be used. Here, for example, SBR and CMC-Na are used for the binder, and graphite is used as the active material.

As a positive electrode active material that is included in the positive electrode 503, a positive electrode active material described in Embodiment 1 can be used. Here, the particles containing a lithium-manganese composite oxide that are described in Embodiment 1 are used, for example.

Next, aging after fabrication of a storage battery will be described. Aging is preferably performed after fabrication of a storage battery. The aging can be performed under the following conditions, for example. Charge is performed at a rate of 0.001 C or more and 0.2 C or less at a temperature higher than or equal to room temperature and lower than or equal to 50° C. In the case where the reaction potential of the positive electrode or the negative electrode is out of the range of the potential window of the electrolytic solution 508, the electrolytic solution is decomposed by charge and discharge operations of a storage battery in some cases. In the case where the electrolytic solution is decomposed and a gas is generated and accumulated in the cell, the electrolytic solution cannot be in contact with a surface of the electrode in some regions. That is to say, an effectual reaction area of the electrode is reduced and effectual resistance is increased.

When the resistance is extremely increased, a charging voltage is increased in accordance with the resistance of the electrode, and the negative electrode potential is lowered. Consequently, lithium is intercalated into graphite and lithium is deposited on the surface of graphite. The lithium deposition might reduce capacity. For example, if a film or the like is grown on the surface after lithium deposition, lithium deposited on the surface cannot be dissolved again. This lithium cannot contribute to capacity. In addition, when deposited lithium is physically collapsed and conduction with the electrode is lost, the lithium also cannot contribute to capacity. Therefore, the gas is preferably released before the potential of the electrode reaches the potential of lithium because of a voltage drop.

After the release of the gas, the charging state may be maintained at a temperature higher than room temperature, preferably higher than or equal to 30° C. and lower than or equal to 60° C., more preferably higher than or equal to 35° C. and lower than or equal to 50° C. for, for example, 1 hour or more and 100 hours or less. In the initial charge, an electrolytic solution decomposed on the surface forms a film on a surface of graphite. The formed coating film may thus be densified when the charging state is held at a temperature higher than room temperature after the release of the gas, for example.

Figure 30A:
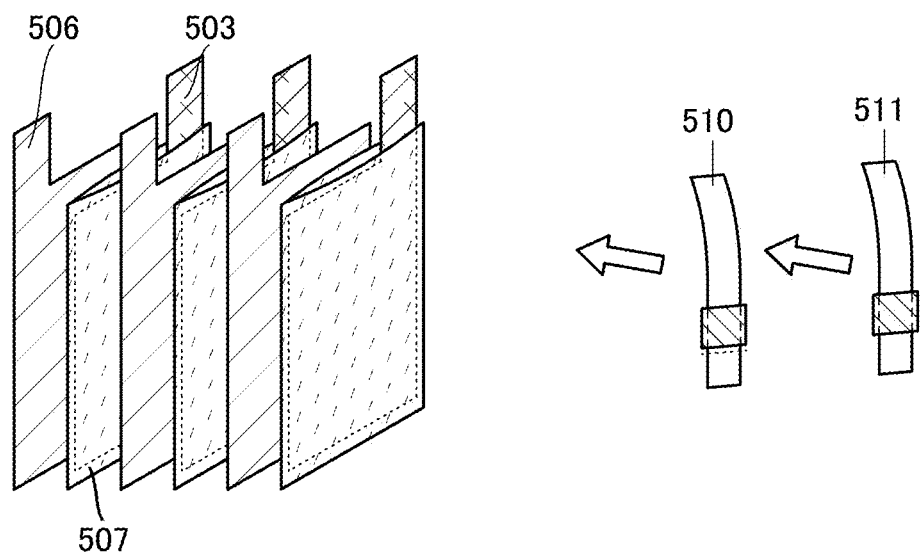
FIGS. 30A and 30B illustrate a method for fabricating a storage battery.
Figure 30B:
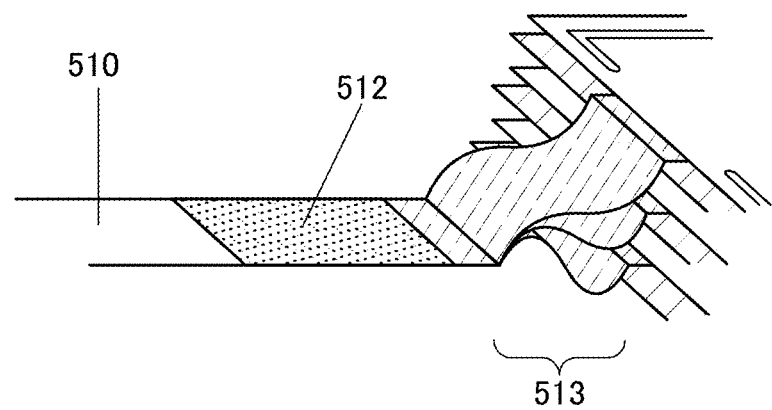

FIG. 30B illustrates an example where current collectors are welded to a lead electrode. As illustrated in FIG. 30A, the positive electrodes 503 each wrapped by the separator 507 and the negative electrodes 506 are alternately stacked. Then, the positive electrode current collectors 501 are welded to the positive electrode lead electrode 510, and the negative electrode current collectors 504 are welded to the negative electrode lead electrode 511. FIG. 30B illustrates an example in which the positive electrode current collectors 501 are welded to the positive electrode lead electrode 510. The positive electrode current collectors 501 are welded to the positive electrode lead electrode 510 in a welding region 512 by ultrasonic welding or the like. The positive electrode current collector 501 includes a bent portion 513 as illustrated in FIG. 30B, and it is therefore possible to relieve stress due to external force applied after fabrication of the thin storage battery 500. The reliability of the thin storage battery 500 can be thus increased.

In the thin storage battery 500 illustrated in FIG. 24 and FIGS. 25A and 25B, the positive electrode current collectors 501 in the positive electrode 503 and the negative electrode current collectors 504 in the negative electrode 506 are welded to the positive electrode lead electrode 510 and a negative electrode lead electrode 511, respectively, by ultrasonic welding. The positive electrode current collector 501 and the negative electrode current collector 504 can double as terminals for electrical contact with the outside. In that case, the positive electrode current collector 501 and the negative electrode current collector 504 may be arranged so that part of the positive electrode current collector 501 and part of the negative electrode current collector 504 are exposed to the outside the exterior body 509 without using lead electrodes.

Figure 31:
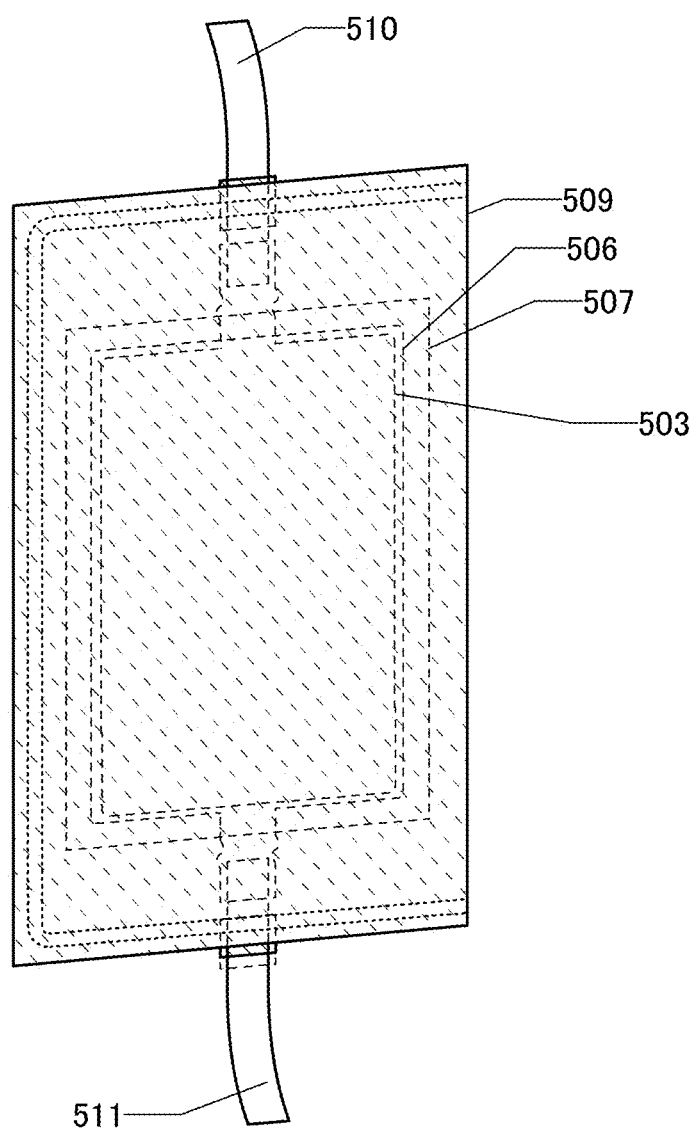
FIG. 31 illustrates a storage battery.

Although the positive electrode lead electrode 510 and the negative electrode lead electrode 511 are provided on the same side in FIG. 24, the positive electrode lead electrode 510 and the negative electrode lead electrode 511 may be provided on different sides as illustrated in FIG. 31. The lead electrodes of a storage battery of one embodiment of the present invention can be freely positioned as described above; therefore, the degree of freedom in design is high. Accordingly, a product including a storage battery of one embodiment of the present invention can have a high degree of freedom in design. Furthermore, an yield of products each including a storage battery of one embodiment of the present invention can be increased.

As the exterior body 509 in the thin storage battery 500, for example, a film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used.

Although the examples in FIGS. 25A and 25B each include five positive electrode active material layer-negative electrode active material layer pairs (the positive and negative electrode active material layers of each pair face each other), it is needless to say that the number of pairs of electrode active material layers is not limited to five, and may be more than five or less than five. In the case of using a large number of electrode active material layers, the storage battery can have a high capacity. In contrast, in the case of using a small number of electrode active material layers, the storage battery can have a small thickness and high flexibility.

In the above structure, the exterior body 509 of the secondary battery can change its form such that the smallest curvature radius is greater than or equal to 3 mm and less than or equal to 30 mm, preferably greater than or equal to 3 mm and less than or equal to 10 mm. One or two films are used as the exterior body of the storage battery. In the case where the storage battery has a layered structure, the storage battery has a cross section sandwiched by two curved surfaces of the films when it is bent.

Figure 32A:
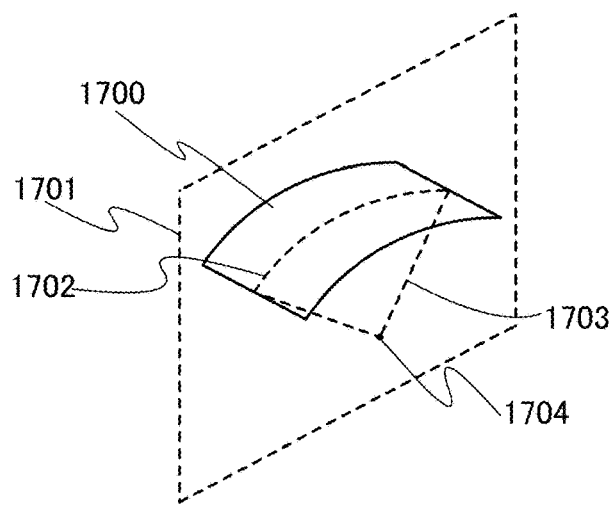
FIGS. 32A to 32C illustrate the radius of curvature of a surface.
Figure 32B:
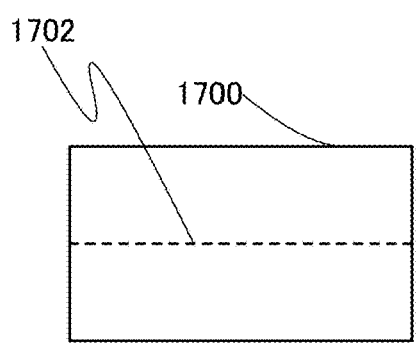
Figure 32C:
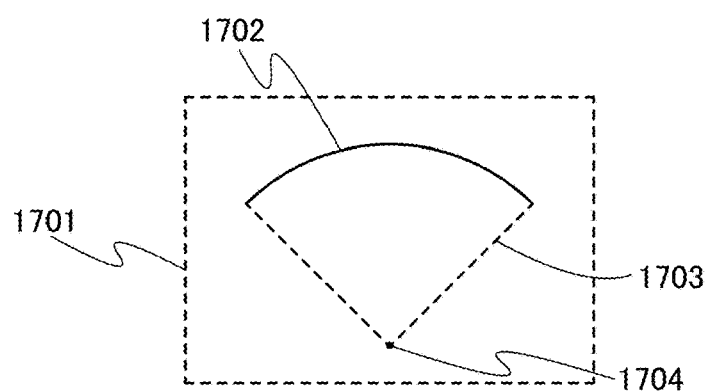

Description will be given of the radius of curvature of a surface with reference to FIGS. 32A to 32C. In FIG. 32A, on a plane 1701 along which a curved surface 1700 is cut, part of a curve 1702 of the curved surface 1700 is approximate to an arc of a circle, and the radius of the circle is referred to as a radius 1703 of curvature and the center of the circle is referred to as a center 1704 of curvature. FIG. 32B is a top view of the curved surface 1700. FIG. 32C is a cross-sectional view of the curved surface 1700 taken along the plane 1701. When a curved surface is cut by a plane, the radius of curvature of a curve in a cross section differs depending on the angle between the curved surface and the plane or on the cut position, and the smallest radius of curvature is defined as the radius of curvature of a surface in this specification and the like.

Figure 33A:
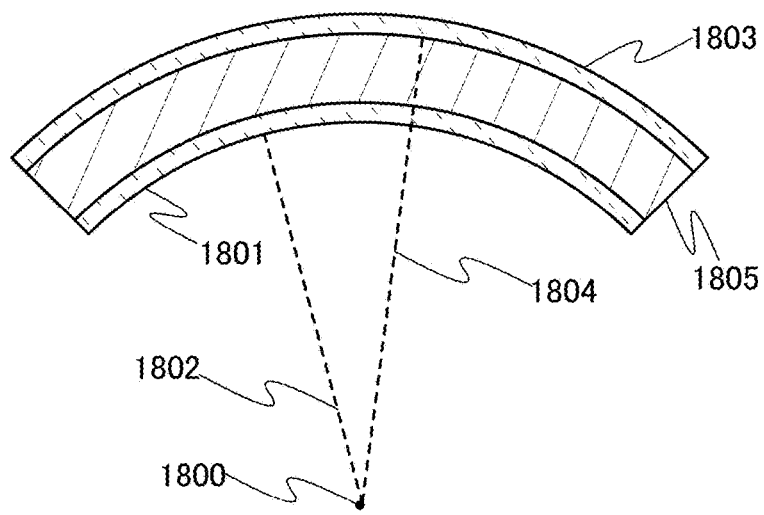
FIGS. 33A to 33D illustrate the radius of curvature of a film.
Figure 33B:
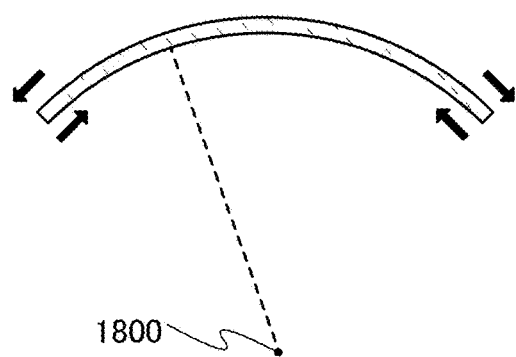

In the case of bending a secondary battery in which a component 1805 including electrodes and an electrolytic solution is sandwiched between two films as exterior bodies, a radius 1802 of curvature of a film 1801 close to a center 1800 of curvature of the secondary battery is smaller than a radius 1804 of curvature of a film 1803 far from the center 1800 of curvature (FIG. 33A). When the secondary battery is curved and has an arc-shaped cross section, compressive stress is applied to a surface of the film on the side closer to the center 1800 of curvature and tensile stress is applied to a surface of the film on the side farther from the center 1800 of curvature (FIG. 33B). However, by forming a pattern including projections or depressions on surfaces of the exterior bodies, the influence of a strain can be reduced to be acceptable even when compressive stress and tensile stress are applied. For this reason, the secondary battery can change its form such that the exterior body on the side closer to the center of curvature has the smallest curvature radius greater than or equal to 3 mm and less than or equal to 30 mm, preferably greater than or equal to 3 mm and less than or equal to 10 mm.

Figure 33C:
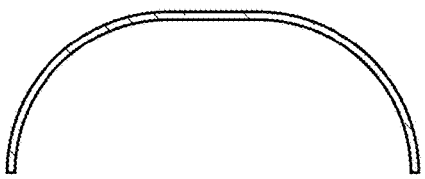
Figure 33D:
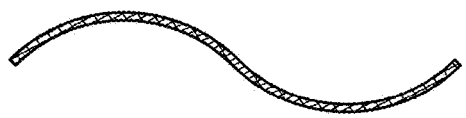

Note that the cross-sectional shape of the secondary battery is not limited to a simple arc shape, and the cross section can be partly arc-shaped; for example, a shape illustrated in FIG. 33C, a wavy shape illustrated in FIG. 33D, or an S shape can be used. When the curved surface of the secondary battery has a shape with a plurality of centers of curvature, the secondary battery can change its form such that a curved surface with the smallest radius of curvature among radii of curvature with respect to the plurality of centers of curvature, which is a surface of the exterior body on the side closer to the center of curvature, has the smallest curvature radius, for example, greater than or equal to 3 mm and less than or equal to 30 mm, preferably greater than or equal to 3 mm and less than or equal to 10 mm.

Next, a variety of examples of the stack of the positive electrode, the negative electrode, and the separator will be described.

Figure 26A:
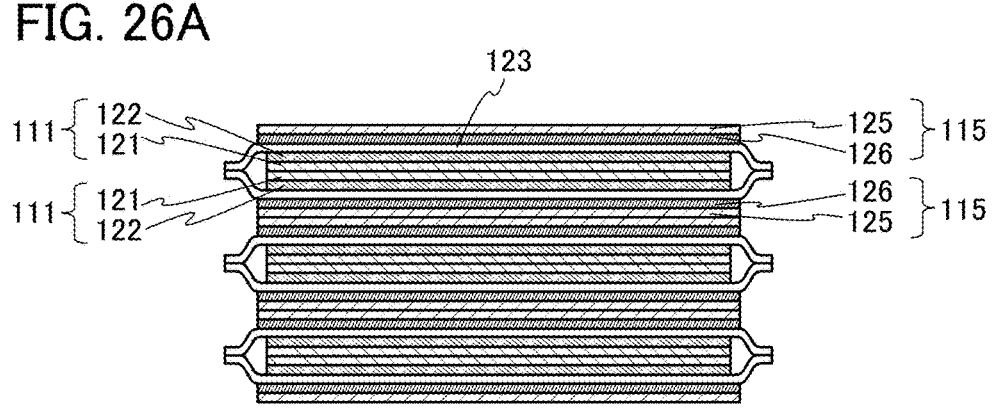
FIGS. 26A to 26C are each a part of a cross-sectional view of a storage battery.

FIG. 26A illustrates an example where six positive electrodes 111 and six negative electrodes 115 are stacked. One surface of a positive electrode current collector 121 included in a positive electrode 111 is provided with a positive electrode active material layer 122. One surface of a negative electrode current collector 125 included in a negative electrode 115 is provided with a negative electrode active material layer 126.

In the structure illustrated in FIG. 26A, the positive electrodes 111 and the negative electrodes 115 are stacked so that surfaces of the positive electrodes 111 on each of which the positive electrode active material layer 122 is not provided are in contact with each other and that surfaces of the negative electrodes 115 on each of which the negative electrode active material layer 126 is not provided are in contact with each other. When the positive electrodes 111 and the negative electrodes 115 are stacked in this manner, contact surfaces between metals can be formed; specifically, the surfaces of the positive electrodes 111 on each of which the positive electrode active material layer 122 is not provided can be in contact with each other, and the surfaces of the negative electrodes 115 on each of which the negative electrode active material layer 126 is not provided can be in contact with each other. The coefficient of friction of the contact surface between metals can be lower than that of a contact surface between the active material and the separator.

Therefore, when the thin storage battery 500 is curved, the surfaces of the positive electrodes 111 on each of which the positive electrode active material layer 122 is not provided slide on each other, and the surfaces of the negative electrodes 115 on each of which the negative electrode active material layer 126 is not provided slide on each other; thus, the stress due to the difference between the inner diameter and the outer diameter of a curved portion can be relieved. Here, the inner diameter of the curved portion refers to the radius of curvature of the inner surface of the curved portion in the exterior body of the thin storage battery 500 in the case where the thin storage battery 500 is curved, for example. Therefore, the deterioration of the thin storage battery 500 can be inhibited. Furthermore, the thin storage battery 500 can have high reliability.

Figure 26B:
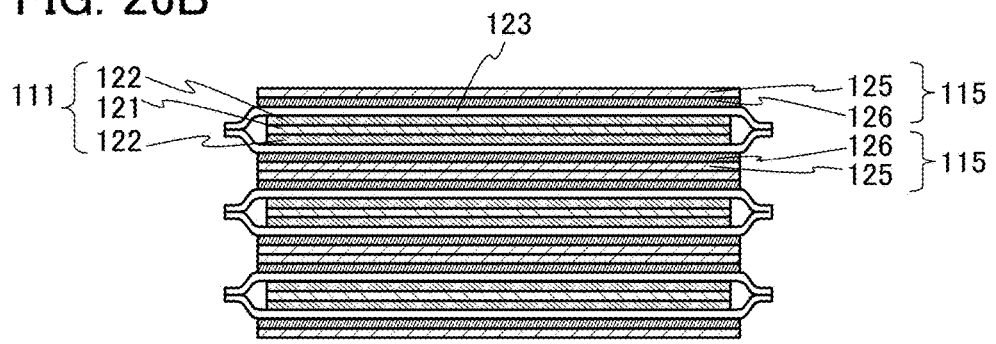

FIG. 26B illustrates an example of a stack of the positive electrodes 111 and the negative electrodes 115 which is different from that in FIG. 26A. The structure illustrated in FIG. 26B is different from that in FIG. 26A in that the positive electrode active material layers 122 are provided on both surfaces of the positive electrode current collector 121. When the positive electrode active material layers 122 are provided on both the surfaces of the positive electrode current collector 121 as illustrated in FIG. 26B, the capacity per unit volume of the thin storage battery 500 can be increased.

Figure 26C:
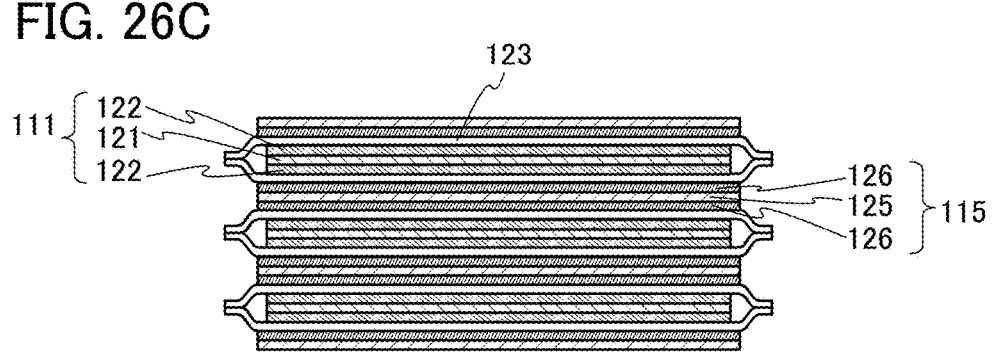

FIG. 26C illustrates an example of a stack of the positive electrodes 111 and the negative electrodes 115 which is different from that in FIG. 26B. The structure illustrated in FIG. 26C is different from that in FIG. 26B in that the negative electrode active material layers 126 are provided on both surfaces of the negative electrode current collector 125. When the negative electrode active material layers 126 are provided on both the surfaces of the negative electrode current collector 125 as illustrated in FIG. 26C, the capacity per unit volume of the thin storage battery 500 can be further increased.

Figure 27A:
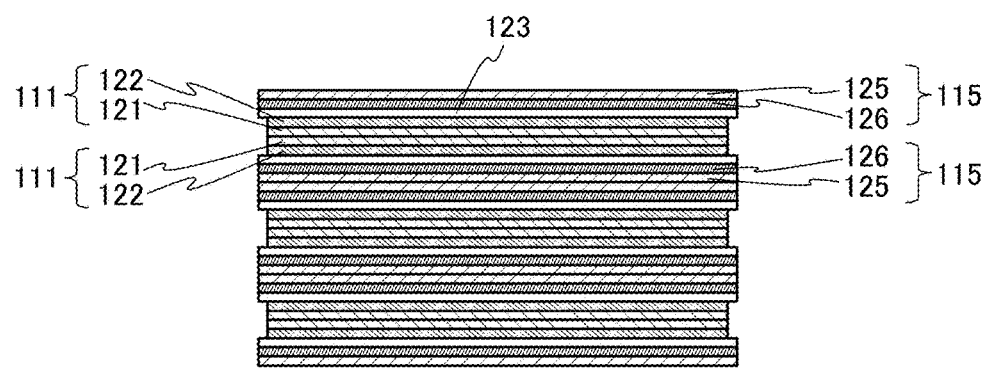
FIGS. 27A and 27B are each a part of a cross-sectional view of a storage battery.

In the structures illustrated in FIGS. 26A to 26C, the separator 123 has a bag-like shape by which the positive electrodes 111 are surrounded; however, one embodiment of the present invention is not limited thereto. FIG. 27A illustrates an example in which the separator 123 has a different structure from that in FIG. 26A. The structure illustrated in FIG. 27A is different from that in FIG. 26A in that the separator 123, which is sheet-like, is provided between every pair of the positive electrode active material layer 122 and the negative electrode active material layer 126. In the structure illustrated in FIG. 27A, six positive electrodes 111 and six negative electrodes 115 are stacked, and six separators 123 are provided.

Figure 27B:
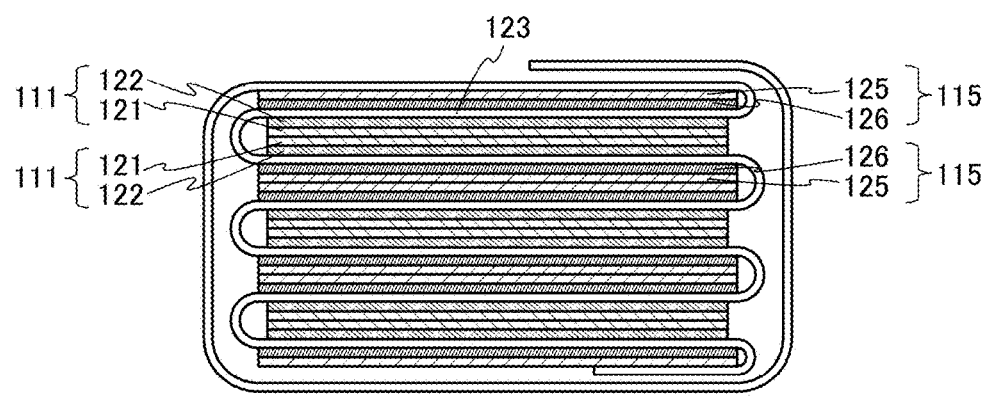

FIG. 27B illustrates an example in which the separator 123 different from that in FIG. 27A is provided. The structure illustrated in FIG. 27B is different from that in FIG. 27A in that one sheet of separator 123 is folded more than once to be interposed between every pair of the positive electrode active material layer 122 and the negative electrode active material layer 126. It can be said that the structure illustrated in FIG. 27B is a structure in which the separators 123 in the respective layers which are illustrated in FIG. 27A are extended and connected together between the layers. In the structure of FIG. 27B, six positive electrodes 111 and six negative electrodes 115 are stacked and thus the separator 123 needs to be folded at least five times. The separator 123 is not necessarily provided so as to be interposed between every pair of the positive electrode active material layer 122 and the negative electrode active material layer 126, and the plurality of positive electrodes 111 and the plurality of negative electrodes 115 may be bound together by extending the separator 123.

Figure 28A:
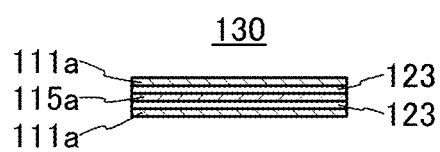
FIGS. 28A to 28C are parts of cross-sectional views of a storage battery.
Figure 28B:
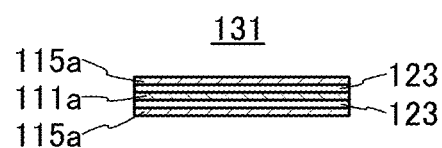
Figure 28C:
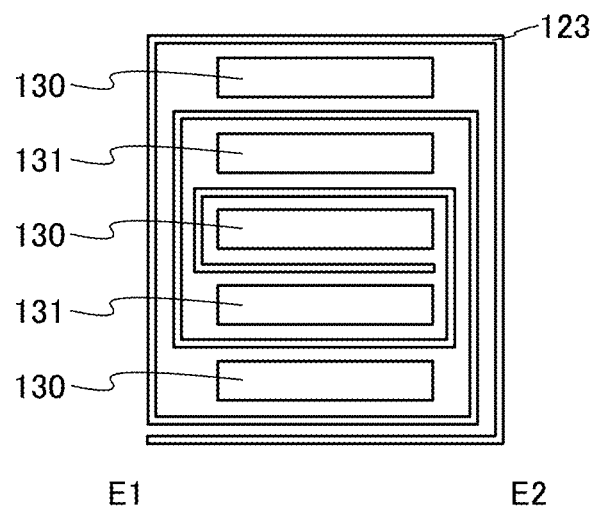

Note that the positive electrode, the negative electrode, and the separator may be stacked as illustrated in FIGS. 28A to 28C. FIG. 28A is a cross-sectional view of a first electrode assembly 130, and FIG. 28B is a cross-sectional view of a second electrode assembly 131. FIG. 28C is a cross-sectional view taken along the dashed-dotted line A1-A2 in FIG. 25A. In FIG. 28C, the first electrode assembly 130, the second electrode assembly 131, and the separator 123 are selectively illustrated for the sake of clarity.

As illustrated in FIG. 28C, the thin storage battery 500 includes a plurality of first electrode assemblies 130 and a plurality of second electrode assemblies 131.

As illustrated in FIG. 28A, in each of the first electrode assemblies 130, a positive electrode 111a including the positive electrode active material layers 122 on both surfaces of a positive electrode current collector 121, the separator 123, a negative electrode 115a including the negative electrode active material layers 126 on both surfaces of a negative electrode current collector 125, the separator 123, and the positive electrode 111a including the positive electrode active material layers 122 on both surfaces of the positive electrode current collector 121 are stacked in this order. As illustrated in FIG. 28B, in each of the second electrode assemblies 131, the negative electrode 115a including the negative electrode active material layers 126 on both surfaces of the negative electrode current collector 125, the separator 123, the positive electrode 111a including the positive electrode active material layers 122 on both surfaces of the positive electrode current collector 121, the separator 123, and the negative electrode 115a including the negative electrode active material layers 126 on both surfaces of the negative electrode current collector 125 are stacked in this order.

As illustrated in FIG. 28C, the plurality of first electrode assemblies 130 and the plurality of second electrode assemblies 131 are covered with the wound separator 123.

<Coin-Type Storage Battery>

Figure 34A:
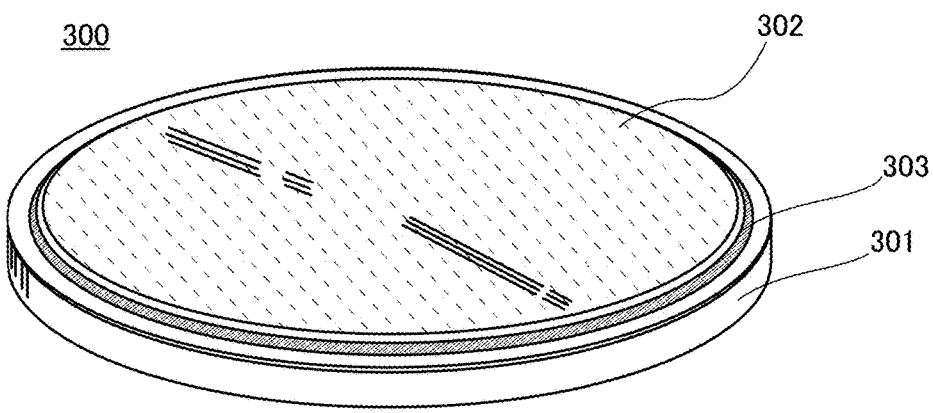
FIGS. 34A and 34B illustrate a coin-type storage battery.
Figure 34B:
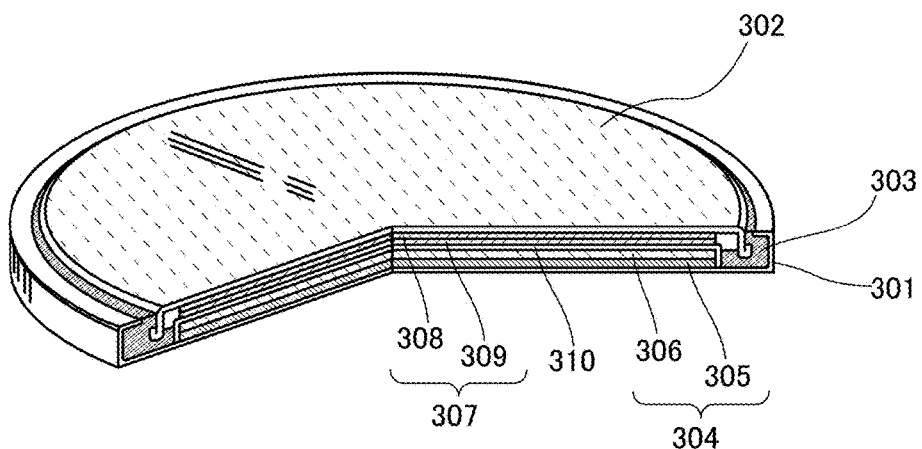

Next, an example of a coin-type storage battery will be described as an example of a power storage device with reference to FIGS. 34A and 34B. FIG. 34A is an external view of a coin-type (single-layer flat type) storage battery, and FIG. 34B is a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305.

A negative electrode 307 includes a negative electrode current collector 308 and a negative electrode active material layer 309 provided in contact with the negative electrode current collector 308.

The description of the positive electrode 503 can be referred to for the positive electrode 304. The description of the positive electrode active material layer 502 can be referred to for the positive electrode active material layer 306. The description of the negative electrode 506 can be referred to for the negative electrode 307. The description of the negative electrode active material layer 505 can be referred to for the negative electrode active material layer 309. The description of the separator 507 can be referred to for the separator 310. The description of the electrolytic solution 508 can be referred to for the electrolytic solution.

Note that only one surface of each of the positive electrode 304 and the negative electrode 307 used for the coin-type storage battery 300 is provided with an active material layer.

For the positive electrode can 301 and the negative electrode can 302, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the positive electrode can 301 and the negative electrode can 302 are preferably covered with nickel, aluminum, or the like in order to prevent corrosion due to the electrolytic solution. The positive electrode can 301 and the negative electrode can 302 are electrically connected to the positive electrode 304 and the negative electrode 307, respectively.

The negative electrode 307, the positive electrode 304, and the separator 310 are immersed in the electrolytic solution. Then, as illustrated in FIG. 34B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 can be manufactured.

<Cylindrical Storage Battery>

Figure 35A:
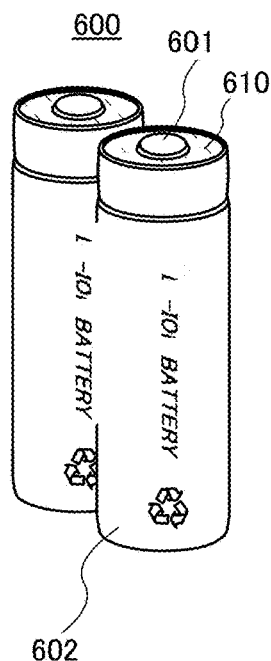
FIGS. 35A and 35B illustrate a cylindrical storage battery.

Next, an example of a cylindrical storage battery will be described as an example of a power storage device with reference to FIGS. 35A and 35B. As illustrated in FIG. 35A, a cylindrical storage battery 600 includes a positive electrode cap (battery cap) 601 on the top surface and a battery can (outer can) 602 on the side surface and bottom surface. The positive electrode cap 601 and the battery can 602 are insulated from each other by a gasket (insulating gasket) 610.

Figure 35B:
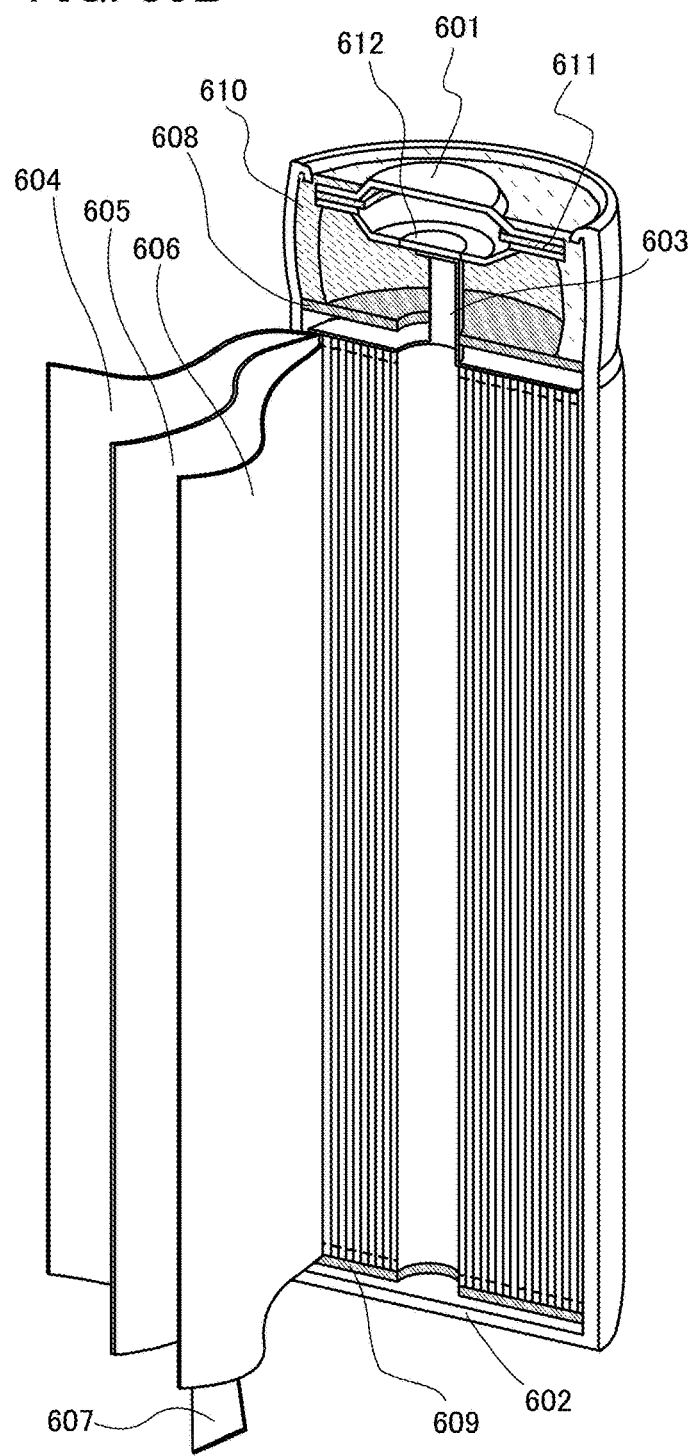

FIG. 35B is a diagram schematically illustrating a cross section of the cylindrical storage battery. Inside the battery can 602 having a hollow cylindrical shape, a battery element in which a strip-like positive electrode 604 and a strip-like negative electrode 606 are wound with a stripe-like separator 605 interposed therebetween is provided. Although not illustrated, the battery element is wound around a center pin. One end of the battery can 602 is close and the other end thereof is open. For the battery can 602, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the battery can 602 is preferably covered with nickel, aluminum, or the like in order to prevent corrosion due to the electrolytic solution. Inside the battery can 602, the battery element in which the positive electrode, the negative electrode, and the separator are wound is provided between a pair of insulating plates 608 and 609 which face each other. Furthermore, a nonaqueous electrolytic solution (not illustrated) is injected inside the battery can 602 provided with the battery element. As the nonaqueous electrolytic solution, a nonaqueous electrolytic solution that is similar to those of the coin-type storage battery can be used.

The description of the positive electrode 503 can be referred to for the positive electrode 604. The description of the negative electrode 506 can be referred to for the negative electrode 606. The description of the method for fabricating an electrode that is described in Embodiment 1 can be referred to for the positive electrode 604 and the negative electrode 606. Since the positive electrode and the negative electrode of the cylindrical storage battery are wound, active materials are preferably formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. The PTC element 611, which serves as a thermally sensitive resistor whose resistance increases as temperature rises, limits the amount of current by increasing the resistance, in order to prevent abnormal heat generation. Note that barium titanate ($BaTiO_3$)-based semiconductor ceramic can be used for the PTC element.

In the case where an electrode is wound as in the cylindrical storage battery illustrated in FIGS. 35A and 35B, a great stress is caused at the time of winding the electrode. In addition, an outward stress from an axis of winding is applied to the electrode all the time in the case where a wound body of the electrode is provided in a housing. However, the active material can be prevented from being cleaved even when such a great stress is applied to the electrode.

Note that in this embodiment, the coin-type storage battery, the cylindrical storage battery, and the thin storage battery are given as examples of the storage battery; however, any of storage batteries with a variety of shapes, such as a sealed storage battery and a square-type storage battery, can be used. Furthermore, a structure in which a plurality of positive electrodes, a plurality of negative electrodes, and a plurality of separators are stacked or wound may be employed. For example, FIGS. 36A to 36C to FIGS. 40A and 40B illustrate examples of other storage batteries.

Structural Example of Thin Storage Battery

FIGS. 36A to 36C and FIGS. 37A to 37C illustrate structural examples of thin storage batteries. A wound body 993 illustrated in FIG. 36A includes a negative electrode 994, a positive electrode 995, and a separator 996.

The wound body 993 is obtained by winding a sheet of a stack in which the negative electrode 994 overlaps with the positive electrode 995 with the separator 996 therebetween. The wound body 993 is covered with a rectangular sealed container or the like; thus, a rectangular secondary battery is fabricated.

Note that the number of stacks each including the negative electrode 994, the positive electrode 995, and the separator 996 is determined as appropriate depending on capacity and element volume which are required. The negative electrode 994 is connected to a negative electrode current collector (not illustrated) via one of a lead electrode 997 and a lead electrode 998. The positive electrode 995 is connected to a positive electrode current collector (not illustrated) via the other of the lead electrode 997 and the lead electrode 998.

Figure 36A:
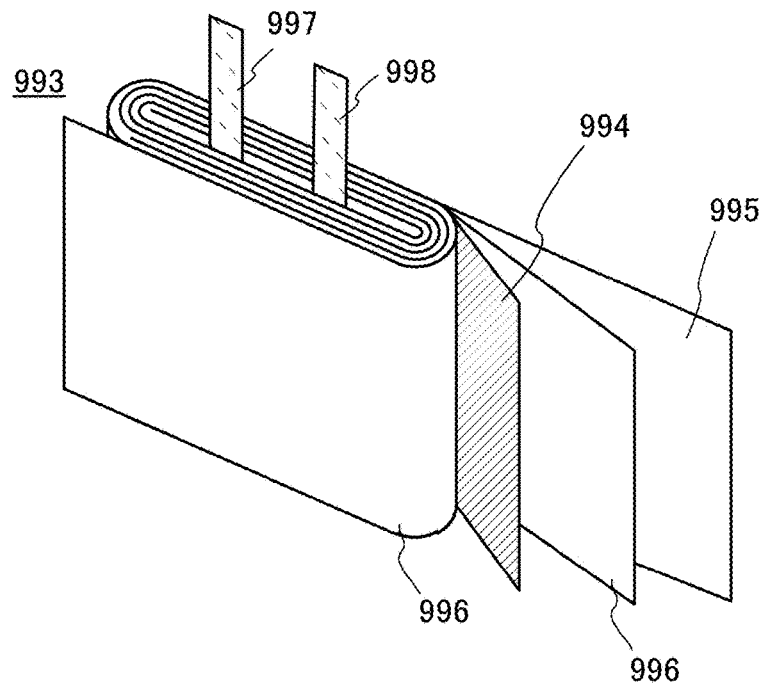
FIGS. 36A to 36C illustrate an examples of a power storage device.
Figure 36B:
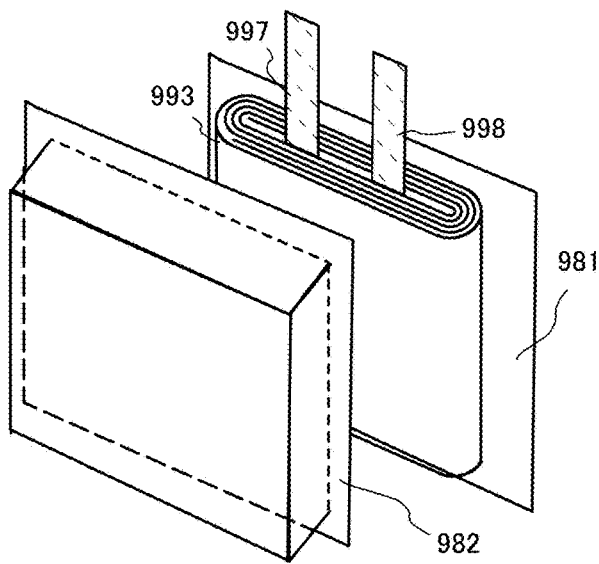
Figure 36C:
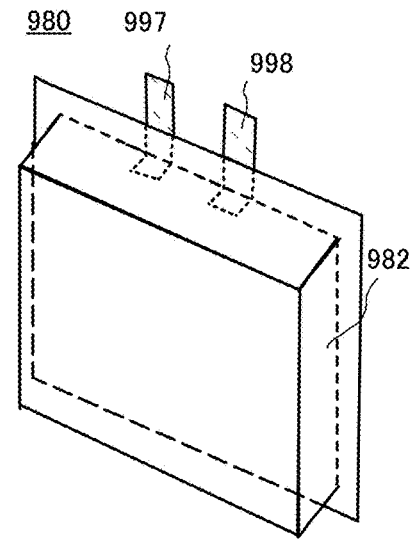

In a storage battery 990 illustrated in FIGS. 36B and 36C, the wound body 993 is packed in a space formed by bonding a film 981 and a film 982 having a depressed portion that serve as exterior bodies by thermocompression bonding or the like. The wound body 993 includes the lead electrode 997 and the lead electrode 998, and is soaked in an electrolytic solution inside a space surrounded by the film 981 and the film 982 having a depressed portion.

For the film 981 and the film 982 having a depressed portion, a metal material such as aluminum or a resin material can be used, for example. With the use of a resin material for the film 981 and the film 982 having a depressed portion, the film 981 and the film 982 having a depressed portion can be changed in their forms when external force is applied; thus, a flexible storage battery can be fabricated.

Although FIGS. 36B and 36C illustrate an example where a space is formed by two films, the wound body 993 may be placed in a space formed by bending one film.

Furthermore, in fabricating a flexible power storage device, a resin material or the like can be used for an exterior body and a sealed container of the power storage device. In that case, a resin material or the like is used for the exterior body and the sealed container. Note that in the case where a resin material is used for the exterior body and the sealed container, a conductive material is used for a portion connected to the outside.

For example, FIGS. 37B and 37C illustrate another example of a flexible thin storage battery. The wound body 993 illustrated in FIG. 37A is the same as that illustrated in FIG. 36A, and the detailed description thereof is omitted.

In the storage battery 990 illustrated in FIGS. 37B and 37C, the wound body 993 is packed in an exterior body 991. The wound body 993 includes the lead electrode 997 and the lead electrode 998, and is soaked in an electrolytic solution inside a space surrounded by the exterior body 991 and an exterior body 992. For example, a metal material such as aluminum or a resin material can be used for the exterior bodies 991 and 992. With the use of a resin material for the exterior bodies 991 and 992, the exterior bodies 991 and 992 can be changed in their forms when external force is applied; thus, a flexible thin storage battery can be fabricated.

When the electrode including the active material of one embodiment of the present invention is used in the flexible thin storage battery, the active material can be prevented from being cleaved even if a stress caused by repeated bending of the thin storage battery is applied to the electrode.

When the active material in which at least part of the cleavage plane is covered with graphene is used for an electrode as described above, a decrease in the voltage and discharge capacity of a battery can be prevented. Accordingly, the cycle performance of the battery can be improved.

Structural Example of Power Storage System

Structural examples of power storage systems will be described with reference to FIGS. 38A and 38B to FIGS. 40A and 40B. Here, a power storage system refers to, for example, a device including a power storage device.

Figure 38A:
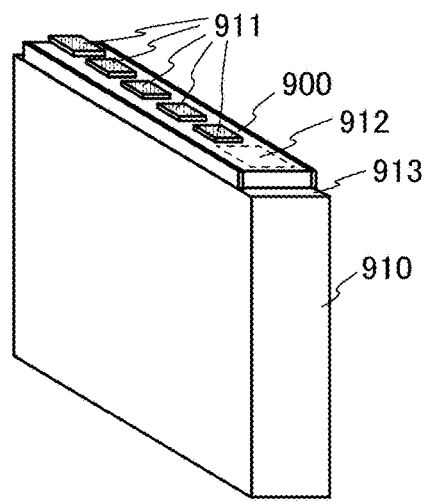
FIGS. 38A and 38B illustrate an example of a power storage device.
Figure 38B:
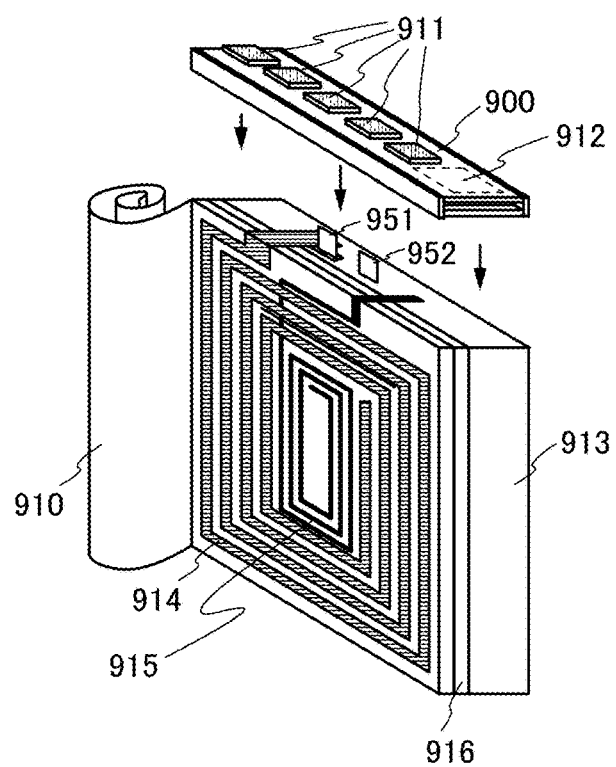

FIGS. 38A and 38B are external views of a power storage system. The power storage system includes a circuit board 900 and a storage battery 913. A label 910 is attached to the storage battery 913. As shown in FIG. 38B, the power storage system further includes a terminal 951, a terminal 952, an antenna 914, and an antenna 915.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may be provided.

The circuit 912 may be provided on the rear surface of the circuit board 900. The shape of each of the antennas 914 and 915 is not limited to a coil shape and may be a linear shape or a plate shape. Further, a planar antenna, an aperture antenna, a traveling-wave antenna, an EH antenna, a magnetic-field antenna, or a dielectric antenna may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, electric power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The power storage system includes a layer 916 between the storage battery 913 and the antennas 914 and 915. The layer 916 may have a function of blocking an electromagnetic field by the storage battery 913. As the layer 916, for example, a magnetic body can be used.

Note that the structure of the power storage system is not limited to that shown in FIGS. 38A and 38B.

For example, as shown in FIGS. 39A1 and 39A2, two opposite surfaces of the storage battery 913 in FIGS. 38A and 38B may be provided with respective antennas. FIG. 39A1 is an external view showing one side of the opposite surfaces, and FIG. 39A2 is an external view showing the other side of the opposite surfaces. For portions similar to those in FIGS. 38A and 38B, the description of the power storage system illustrated in FIGS. 38A and 38B can be referred to as appropriate.

As illustrated in FIG. 39A1, the antenna 914 is provided on one of the opposite surfaces of the storage battery 913 with the layer 916 interposed therebetween, and as illustrated in FIG. 39A2, the antenna 915 is provided on the other of the opposite surfaces of the storage battery 913 with a layer 917 interposed therebetween. The layer 917 may have a function of preventing an adverse effect on an electromagnetic field by the storage battery 913. As the layer 917, for example, a magnetic body can be used.

With the above structure, both of the antennas 914 and 915 can be increased in size.

Alternatively, as illustrated in FIGS. 39B1 and 39B2, two opposite surfaces of the storage battery 913 in FIGS. 38A and 38B may be provided with different types of antennas. FIG. 39B1 is an external view showing one side of the opposite surfaces, and FIG. 39B2 is an external view showing the other side of the opposite surfaces. For portions similar to those in FIGS. 38A and 38B, the description of the power storage system illustrated in FIGS. 38A and 38B can be referred to as appropriate.

As illustrated in FIG. 39B1, the antenna 914 is provided on one of the opposite surfaces of the storage battery 913 with the layer 916 interposed therebetween, and as illustrated in FIG. 39B2, an antenna 918 is provided on the other of the opposite surfaces of the storage battery 913 with the layer 917 interposed therebetween. The antenna 918 has a function of communicating data with an external device, for example. An antenna with a shape that can be applied to the antennas 914 and 915, for example, can be used as the antenna 918. As a system for communication using the antenna 918 between the power storage system and another device, a response method that can be used between the power storage system and another device, such as NFC, can be employed.

Figure 40A:
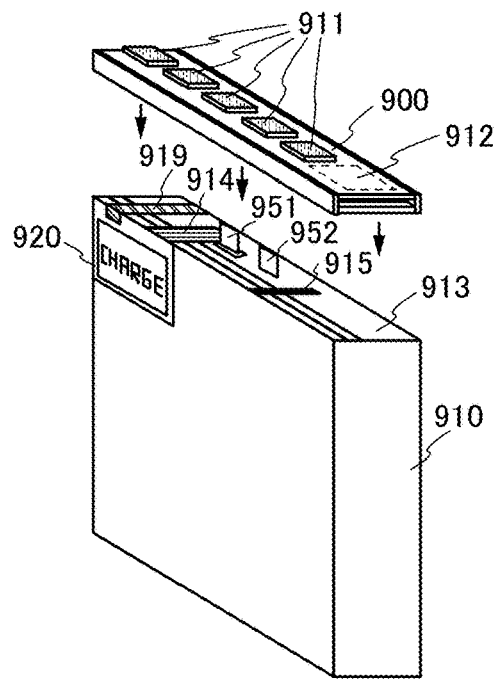
FIGS. 40A and 40B illustrate examples of power storage devices.

Alternatively, as illustrated in FIG. 40A, the storage battery 913 in FIGS. 38A and 38B may be provided with a display device 920. The display device 920 is electrically connected to the terminal 911 via a terminal 919. It is possible that the label 910 is not provided in a portion where the display device 920 is provided. For portions similar to those in FIGS. 38A and 38B, the description of the power storage system illustrated in FIGS. 38A and 38B can be referred to as appropriate.

The display device 920 can display, for example, an image showing whether charge is being carried out, an image showing the amount of stored power, or the like. As the display device 920, electronic paper, a liquid crystal display device, an electroluminescent (EL) display device, or the like can be used. For example, the use of electronic paper can reduce power consumption of the display device 920.

Figure 40B:
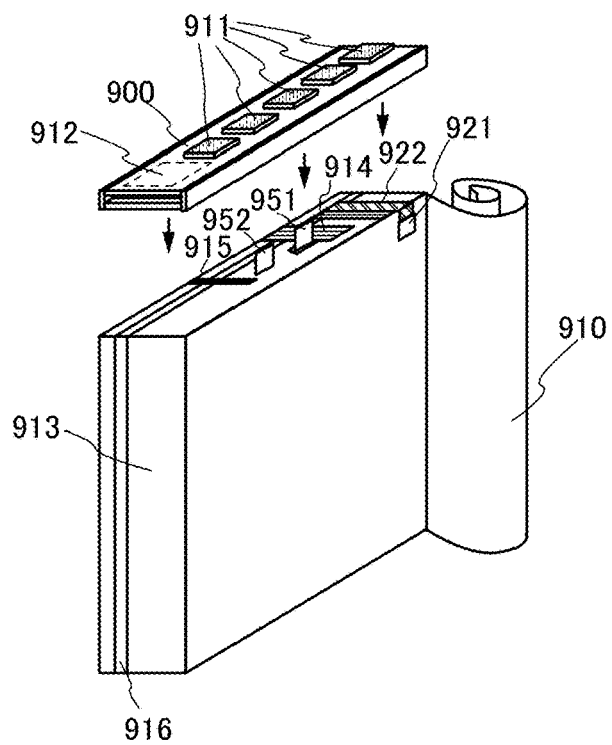

Alternatively, as illustrated in FIG. 40B, the storage battery 913 illustrated in FIGS. 38A and 38B may be provided with a sensor 921. The sensor 921 is electrically connected to the terminal 911 via a terminal 922. For portions similar to those in FIGS. 38A and 38B, the description of the power storage system illustrated in FIGS. 38A and 38B can be referred to as appropriate.

As the sensor 921, a sensor that has a function of measuring, for example, force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays can be used. With the sensor 921, for example, data on an environment (e.g., temperature) where the power storage system is placed can be determined and stored in a memory inside the circuit 912.

The electrode of one embodiment of the present invention is used in the storage battery and the power storage system that are described in this embodiment. The capacity of the storage battery and the power storage system can thus be high. Furthermore, energy density can be high. Moreover, reliability can be high, and life can be long.

This embodiment can be implemented in appropriate combination with any of the other embodiments.

Embodiment 3

In this embodiment, an example of an electronic device including a flexible power storage device will be described.

FIGS. 41A to 41G illustrate examples of electronic devices including the flexible power storage devices described in Embodiment 2. Examples of electronic devices each including a flexible power storage device include television devices (also referred to as televisions or television receivers), monitors of computers or the like, cameras such as digital cameras and digital video cameras, digital photo frames, mobile phones (also referred to as mobile phones or mobile phone devices), portable game machines, portable information terminals, audio reproducing devices, and large game machines such as pachinko machines.

In addition, a flexible power storage device can be incorporated along a curved inside/outside wall surface of a house or a building or a curved interior/exterior surface of a car.

Figure 41A:
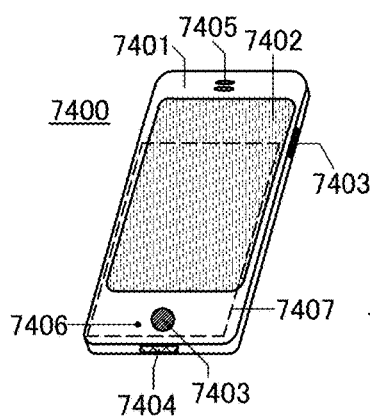
FIGS. 41A to 41G illustrate examples of electronic devices.

FIG. 41A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a power storage device 7407.

Figure 41B:
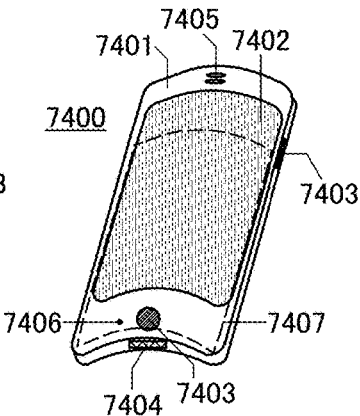
Figure 41C:
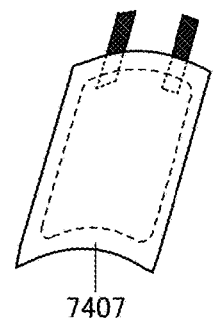

FIG. 41B illustrates the mobile phone 7400 that is bent. When the whole mobile phone 7400 is bent by the external force, the power storage device 7407 included in the mobile phone 7400 is also bent. FIG. 41C illustrates the bent power storage device 7407. The power storage device 7407 is a thin storage battery. The power storage device 7407 is fixed in a state of being bent. Note that the power storage device 7407 includes a lead electrode 7408 electrically connected to a current collector 7409. The current collector 7409 is, for example, copper foil, and partly alloyed with gallium; thus, adhesion between the current collector 7409 and an active material layer in contact with the current collector 7409 is improved and the power storage device 7407 can have high reliability even in a state of being bent.

Figure 41D:
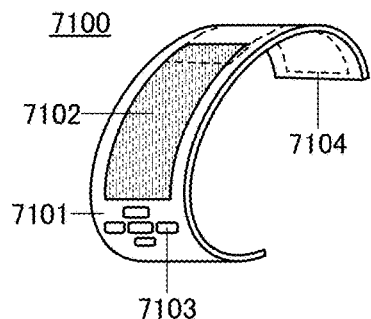
Figure 41E:
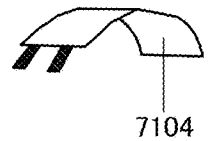

FIG. 41D illustrates an example of a bangle display device. A portable display device 7100 includes a housing 7101, a display portion 7102, an operation button 7103, and a power storage device 7104. FIG. 41E illustrates the bent power storage device 7104. When the display device is worn on a user's arm while the power storage device 7104 is bent, the housing changes its form and the curvature of a part or the whole of the power storage device 7104 is changed. Note that the radius of curvature of a curve at a point refers to the radius of the circular arc that best approximates the curve at that point. The reciprocal of the radius of curvature is curvature. Specifically, a part or the whole of the housing or the main surface of the power storage device 7104 is changed in the range of radius of curvature from 40 mm to 150 mm inclusive. When the radius of curvature at the main surface of the power storage device 7104 is greater than or equal to 40 mm and less than or equal to 150 mm, the reliability can be kept high.

Figure 41F:
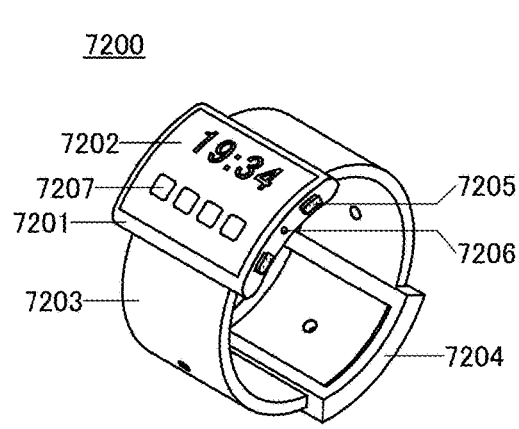

FIG. 41F illustrates an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, power on/off, on/off of wireless communication, setting and cancellation of a silent mode, and setting and cancellation of a power saving mode can be performed. For example, the functions of the operation button 7205 can be set freely by setting the operation system incorporated in the portable information terminal 7200.

The portable information terminal 7200 can employ near field communication that is a communication method based on an existing communication standard. In that case, for example, mutual communication between the portable information terminal 7200 and a headset capable of wireless communication can be performed, and thus hands-free calling is possible.

Moreover, the portable information terminal 7200 includes the input output terminal 7206, and data can be directly transmitted to and received from another information terminal via a connector. In addition, charging via the input output terminal 7206 is possible. Note that the charging operation may be performed by wireless power feeding without using the input output terminal 7206.

The display portion 7202 of the portable information terminal 7200 is provided with a power storage device including the electrode of one embodiment of the present invention. For example, the power storage device 7104 illustrated in FIG. 41E that is in the state of being curved can be provided in the housing 7201. Alternatively, the power storage device 7104 illustrated in FIG. 41E can be provided in the band 7203 such that it can be curved.

A portable information terminal 7200 preferably includes a sensor. As the sensor, for example a human body sensor such as a fingerprint sensor, a pulse sensor, or a temperature sensor, a touch sensor, a pressure sensitive sensor, an acceleration sensor, or the like is preferably mounted.

Figure 41G:
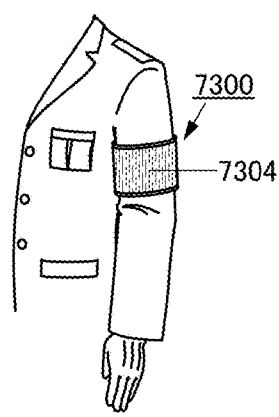

FIG. 41G illustrates an example of an armband display device. A display device 7300 includes a display portion 7304 and the power storage device of one embodiment of the present invention. The display device 7300 can include a touch sensor in the display portion 7304 and can serve as a portable information terminal.

The display surface of the display portion 7304 is bent, and images can be displayed on the bent display surface. A display state of the display device 7300 can be changed by, for example, near field communication, which is a communication method based on an existing communication standard.

The display device 7300 includes an input output terminal, and data can be directly transmitted to and received from another information terminal via a connector. In addition, charging via the input output terminal is possible. Note that the charging operation may be performed by wireless power feeding without using the input output terminal.

This embodiment can be implemented in appropriate combination with any of the other embodiments.

Embodiment 4

In this embodiment, examples of electronic devices that can include power storage devices will be described.

Figure 42A:
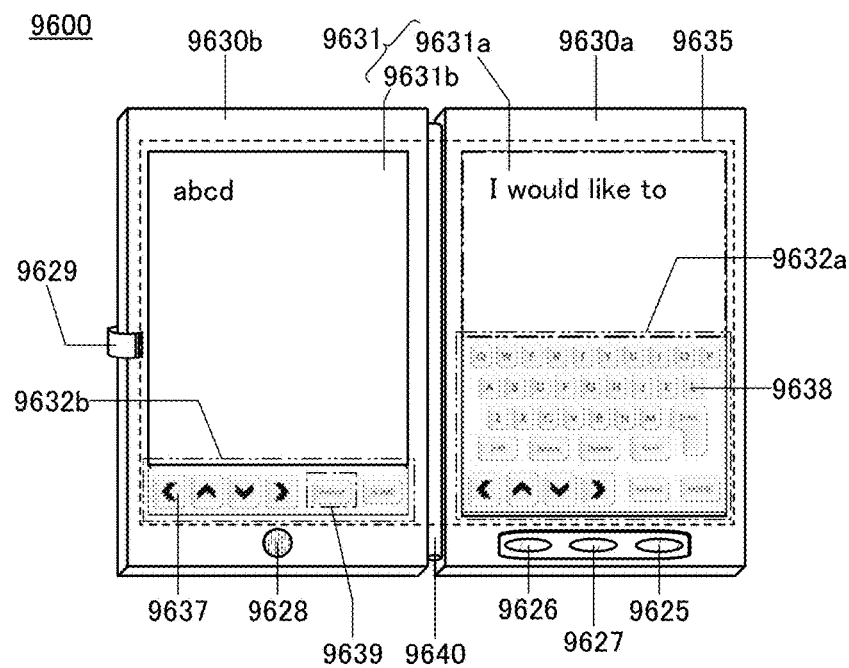
FIGS. 42A to 42C illustrate an example of an electronic device.
Figure 42B:
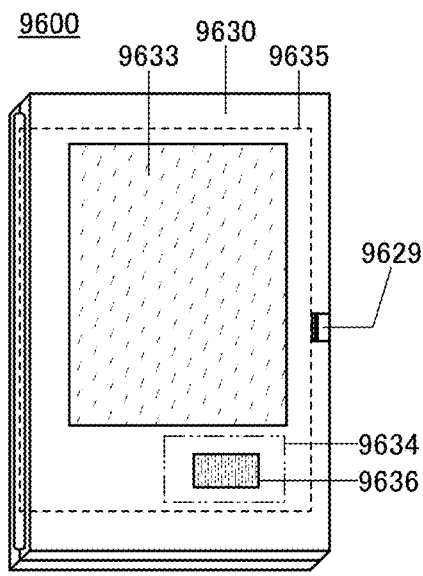

FIGS. 42A and 42B illustrate an example of a tablet terminal that can be folded in half. A tablet terminal 9600 illustrated in FIGS. 42A and 42B includes a housing 9630*a*, a housing 9630*b*, a movable portion 9640 connecting the housings 9630*a* and 9630*b*, a display portion 9631 including a display portion 9631*a* and a display portion 9631*b*, a display mode changing switch 9626, a power switch 9627, a power saving mode changing switch 9625, a fastener 9629, and an operation switch 9628. FIG. 42A illustrates the tablet terminal 9600 that is opened, and FIG. 42B illustrates the tablet terminal 9600 that is closed.

The tablet terminal 9600 includes a power storage unit 9635 inside the housings 9630*a* and 9630*b*. The power storage unit 9635 is provided across the housings 9630*a* and 9630*b*, passing through the movable portion 9640.

Part of the display portion 9631*a* can be a touch panel region 9632*a*, and data can be input by touching operation keys 9638 that are displayed. Note that FIG. 42A shows, as an example, that half of the area of the display portion 9631*a* has only a display function and the other half of the area has a touch panel function. However, the structure of the display portion 9631*a* is not limited to this, and all the area of the display portion 9631*a* may have a touch panel function. For example, all the area of the display portion 9631*a* can display a keyboard and serve as a touch panel while the display portion 9631*b* can be used as a display screen.

As in the display portion 9631*a*, part of the display portion 9631*b* can be a touch panel region 9632*b*. When a keyboard display switching button 9639 displayed on the touch panel is touched with a finger, a stylus, or the like, a keyboard can be displayed on the display portion 9631*b*.

Touch input can be performed in the touch panel region 9632*a* and the touch panel region 9632*b* at the same time.

The display mode changing switch 9626 allows switching between a landscape mode and a portrait mode, color display and black-and-white display, and the like. The power saving mode changing switch 9625 can control display luminance in accordance with the amount of external light in use of the tablet terminal 9600, which is measured with an optical sensor incorporated in the tablet terminal 9600. In addition to the optical sensor, other detecting devices such as sensors for determining inclination, such as a gyroscope or an acceleration sensor, may be incorporated in the tablet terminal.

Although the display portion 9631*a* and the display portion 9631*b* have the same area in FIG. 42A, one embodiment of the present invention is not limited to this example. The display portion 9631*a* and the display portion 9631*b* may have different areas or different display quality. For example, one of the display portions 9631*a* and 9631*b* may display higher definition images than the other.

The tablet terminal is closed in FIG. 42B. The tablet terminal includes the housing 9630, a solar cell 9633, and a charge and discharge control circuit 9634 including a DCDC converter 9636. The power storage unit of one embodiment of the present invention is used as the power storage unit 9635.

The tablet terminal 9600 can be folded such that the housings 9630*a* and 9630*b* overlap with each other when not in use. Thus, the display portions 9631*a* and 9631*b* can be protected, which increases the durability of the tablet terminal 9600. In addition, the power storage unit 9635 of one embodiment of the present invention has flexibility and can be repeatedly bent without a significant decrease in charge and discharge capacity. Thus, a highly reliable tablet terminal can be provided.

The tablet terminal illustrated in FIGS. 42A and 42B can also have a function of displaying various kinds of data (e.g., a still image, a moving image, and a text image), a function of displaying a calendar, a date, or the time on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processing portion, and the like. Note that the solar cell 9633 can be provided on one or both surfaces of the housing 9630 and the power storage unit 9635 can be charged efficiently. The use of a lithium-ion battery as the power storage unit 9635 brings an advantage such as reduction in size.

Figure 42C:
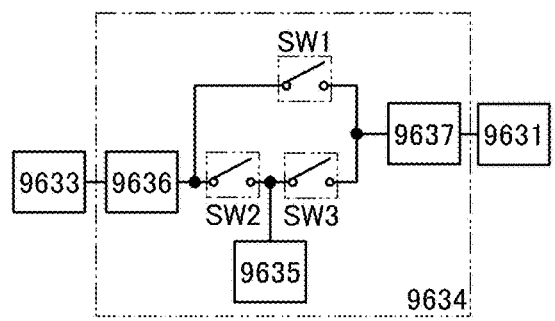

The structure and operation of the charge and discharge control circuit 9634 illustrated in FIG. 42B will be described with reference to a block diagram in FIG. 42C. The solar cell 9633, the power storage unit 9635, the DCDC converter 9636, a converter 9637, switches SW1 to SW3, and the display portion 9631 are illustrated in FIG. 42C, and the power storage unit 9635, the DCDC converter 9636, the converter 9637, and the switches SW1 to SW3 correspond to the charge and discharge control circuit 9634 in FIG. 42B.

First, an example of operation when electric power is generated by the solar cell 9633 using external light will be described. The voltage of electric power generated by the solar cell is raised or lowered by the DCDC converter 9636 to a voltage for charging the power storage unit 9635. When the display portion 9631 is operated with the electric power from the solar cell 9633, the switch SW1 is turned on and the voltage of the electric power is raised or lowered by the converter 9637 to a voltage needed for operating the display portion 9631. When display on the display portion 9631 is not performed, the switch SW1 is turned off and the switch SW2 is turned on, so that the power storage unit 9635 can be charged.

Note that the solar cell 9633 is described as an example of a power generation means; however, one embodiment of the present invention is not limited to this example. The power storage unit 9635 may be charged using another power generation means such as a piezoelectric element or a thermoelectric conversion element (Peltier element). For example, the power storage unit 9635 may be charged with a non-contact power transmission module capable of performing charging by transmitting and receiving electric power wirelessly (without contact), or any of the other charge means used in combination.

Figure 43:
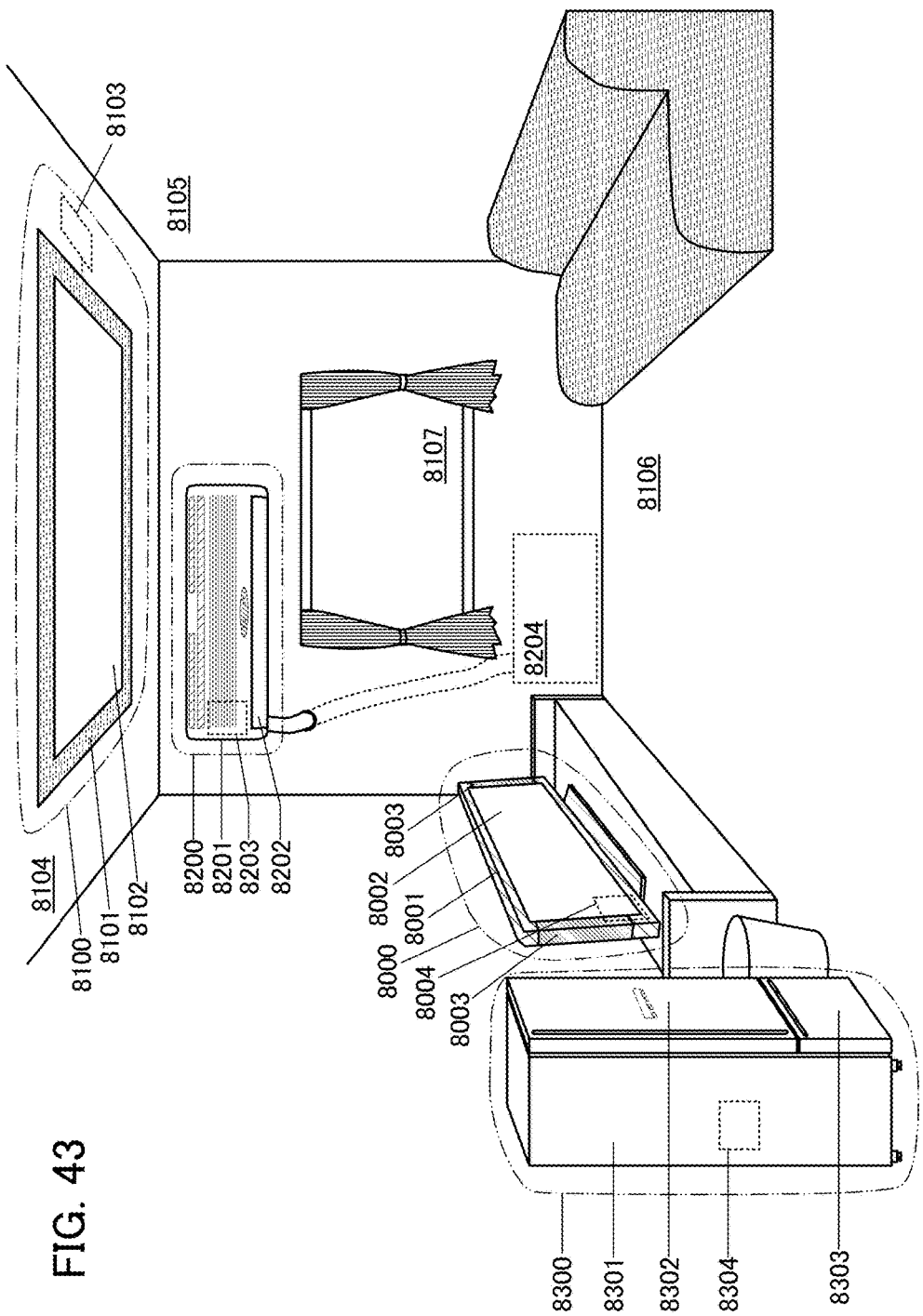
FIG. 43 illustrates examples of electronic devices.

FIG. 43 illustrates other examples of electronic devices. In FIG. 43, a display device 8000 is an example of an electronic device including a power storage device 8004 of one embodiment of the present invention. Specifically, the display device 8000 corresponds to a display device for TV broadcast reception and includes a housing 8001, a display portion 8002, speaker portions 8003, and the power storage device 8004. The power storage device 8004 of one embodiment of the present invention is provided in the housing 8001. The display device 8000 can receive electric power from a commercial power supply. Alternatively, the display device 8000 can use electric power stored in the power storage device 8004. Thus, the display device 8000 can be operated with the use of the power storage device 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 43, an installation lighting device 8100 is an example of an electronic device including a power storage device 8103 of one embodiment of the present invention. Specifically, the lighting device 8100 includes a housing 8101, a light source 8102, and the power storage device 8103. Although FIG. 43 illustrates the case where the power storage device 8103 is provided in a ceiling 8104 on which the housing 8101 and the light source 8102 are installed, the power storage device 8103 may be provided in the housing 8101. The lighting device 8100 can receive electric power from a commercial power supply. Alternatively, the lighting device 8100 can use electric power stored in the power storage device 8103. Thus, the lighting device 8100 can be operated with the use of power storage device 8103 of one embodiment of the present invention as an uninterruptible power supply even when electric power cannot be supplied from a commercial power supply due to power failure or the like.

Note that although the installation lighting device 8100 provided in the ceiling 8104 is illustrated in FIG. 43 as an example, the power storage device of one embodiment of the present invention can be used in an installation lighting device provided in, for example, a wall 8105, a floor 8106, a window 8107, or the like other than the ceiling 8104. Alternatively, the power storage device of one embodiment of the present invention can be used in a tabletop lighting device or the like.

As the light source 8102, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 43, an air conditioner including an indoor unit 8200 and an outdoor unit 8204 is an example of an electronic device including a power storage device 8203 of one embodiment of the present invention. Specifically, the indoor unit 8200 includes a housing 8201, an air outlet 8202, and the power storage device 8203. Although FIG. 43 illustrates the case where the power storage device 8203 is provided in the indoor unit 8200, the power storage device 8203 may be provided in the outdoor unit 8204. Alternatively, the power storage devices 8203 may be provided in both the indoor unit 8200 and the outdoor unit 8204. The air conditioner can receive electric power from a commercial power supply. Alternatively, the air conditioner can use electric power stored in the power storage device 8203. Particularly in the case where the power storage devices 8203 are provided in both the indoor unit 8200 and the outdoor unit 8204, the air conditioner can be operated with the use of the power storage device 8203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 43 as an example, the power storage device of one embodiment of the present invention can be used in an air conditioner in which the functions of an indoor unit and an outdoor unit are integrated in one housing.

In FIG. 43, an electric refrigerator-freezer 8300 is an example of an electronic device including a power storage device 8304 of one embodiment of the present invention. Specifically, the electric refrigerator-freezer 8300 includes a housing 8301, a door for a refrigerator 8302, a door for a freezer 8303, and the power storage device 8304. The power storage device 8304 is provided in the housing 8301 in FIG. 43. The electric refrigerator-freezer 8300 can receive electric power from a commercial power supply. Alternatively, the electric refrigerator-freezer 8300 can use electric power stored in the power storage device 8304. Thus, the electric refrigerator-freezer 8300 can be operated with the use of the power storage device 8304 of one embodiment of the present invention as an uninterruptible power supply even when electric power cannot be supplied from a commercial power supply due to power failure or the like.

Note that among the electronic devices described above, a high-frequency heating apparatus such as a microwave oven and an electronic device such as an electric rice cooker require high power in a short time. The tripping of a breaker of a commercial power supply in use of an electronic device can be prevented by using the power storage device of one embodiment of the present invention as an auxiliary power supply for supplying electric power which cannot be supplied enough by a commercial power supply.

In addition, in a time period when electronic devices are not used, particularly when the proportion of the amount of electric power which is actually used to the total amount of electric power which can be supplied from a commercial power supply source (such a proportion referred to as a usage rate of electric power) is low, electric power can be stored in the power storage device, whereby the usage rate of electric power can be reduced in a time period when the electronic devices are used. For example, in the case of the electric refrigerator-freezer 8300, electric power can be stored in the power storage device 8304 in night time when the temperature is low and the door for a refrigerator 8302 and the door for a freezer 8303 are not often opened or closed. On the other hand, in daytime when the temperature is high and the door for a refrigerator 8302 and the door for a freezer 8303 are frequently opened and closed, the power storage device 8304 is used as an auxiliary power supply; thus, the usage rate of electric power in daytime can be reduced.

This embodiment can be implemented in combination with any of the other embodiments as appropriate.

Embodiment 5

In this embodiment, examples of vehicles using power storage devices will be described.

The use of power storage devices in vehicles enables production of next-generation clean energy vehicles such as hybrid electric vehicles (HEVs), electric vehicles (EVs), and plug-in hybrid electric vehicles (PHEVs).

Figure 44A:
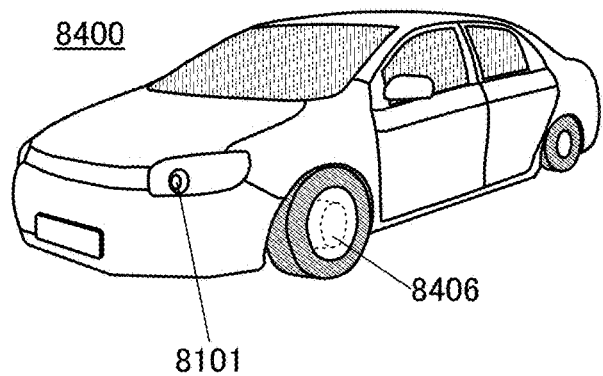
FIGS. 44A and 44B illustrate examples of electronic devices.
Figure 44B:
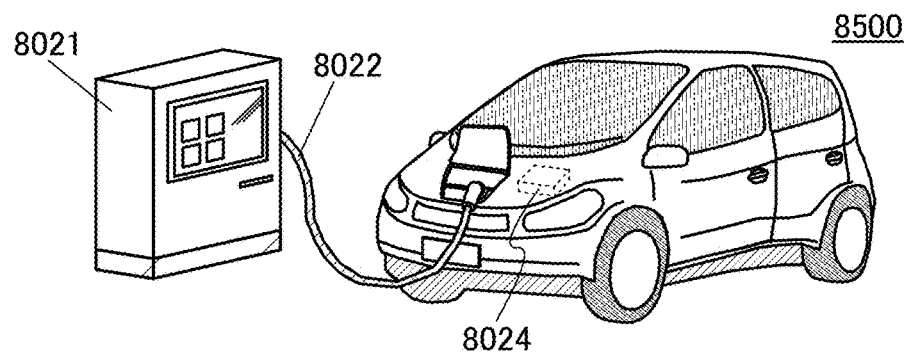

FIGS. 44A and 44B each illustrate an example of a vehicle using one embodiment of the present invention. An automobile 8400 illustrated in FIG. 44A is an electric vehicle that runs on the power of an electric motor. Alternatively, the automobile 8400 is a hybrid electric vehicle capable of driving appropriately using either an electric motor or an engine. One embodiment of the present invention can provide a high-mileage vehicle. The automobile 8400 includes the power storage device. The power storage device is used not only for driving the electric motor 8406, but also for supplying electric power to a light-emitting device such as a headlight 8401 or a room light (not illustrated).

The power storage device can also supply electric power to a display device of a speedometer, a tachometer, or the like included in the automobile 8400. Furthermore, the power storage device can supply electric power to a semiconductor device included in the automobile 8400, such as a navigation system.

FIG. 44B illustrates an automobile 8500 including the power storage device. The automobile 8500 can be charged when the power storage device is supplied with electric power through external charging equipment by a plug-in system, a contactless power feeding system, or the like. In FIG. 44B, a power storage device 8024 included in the automobile 8500 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The ground-based charging apparatus 8021 may be a charging station provided in a commerce facility or a power source in a house. For example, with the use of a plug-in technique, the power storage device 8024 included in the automobile 8500 can be charged by being supplied with electric power from outside. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between vehicles. Furthermore, a solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, the power storage device can have improved cycle characteristics and reliability. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the driving distance. Furthermore, the power storage device included in the vehicle can be used as a power source for supplying electric power to products other than the vehicle. In such a case, the use of a commercial power source can be avoided at peak time of electric power demand.

This embodiment can be implemented in appropriate combination with any of the other embodiments.

Embodiment 6

A battery management unit (BMU) that can be used in combination with battery cells each including the materials described in the above embodiment and transistors that are suitable for a circuit included in the battery management unit will be described with reference to FIG. 45 to FIG. 51. In this embodiment, in particular, a battery management unit of a power storage device including battery cells connected in series will be described.

When the plurality of battery cells connected in series are repeatedly charged and discharged, there occur variations in charge and discharge characteristics among the battery cells, which causes variations in capacity (output voltage) among the battery cells. The discharge capacity of all the plurality of battery cells connected in series depends on the capacity of the battery cell that is low. The variations in capacity among the battery cells reduce the discharge capacity of all the battery cells. Furthermore, when charge is performed based on the capacity of the battery cell that is low, the battery cells might be undercharged. In contrast, when charge is performed based on the capacity of the battery cell that is high, the battery cells might be overcharged.

Thus, the battery management unit of the power storage device including the battery cells connected in series has a function of reducing variations in capacity among the battery cells, which cause an undercharge and an overcharge. Examples of a circuit configuration for reducing variations in capacity among battery cells include a resistive type, a capacitive type, and an inductive type, and a circuit configuration that can reduce variations in capacity among battery cells using transistors with a low off-state current will be explained here as an example.

A transistor including an oxide semiconductor in its channel formation region (an OS transistor) is preferably used as the transistor with a low off-state current. When an OS transistor with a low off-state current is used in the circuit of the battery management unit of the power storage device, the amount of charge that leaks from a battery can be reduced, and reduction in capacity with the lapse of time can be suppressed.

As the oxide semiconductor used in the channel formation region, an In-M-Zn oxide (M is Ga, Sn, Y, Zr, La, Ce, or Nd) is used. In the case where the atomic ratio of the metal elements of a target for forming an oxide semiconductor film is In:M:Zn=$x_1$:$y_1$:$z_1$, $x_1/y_1$ is preferably greater than or equal to ⅓ and less than or equal to 6, more preferably greater than or equal to 1 and less than or equal to 6, and $z_1/y_1$ is preferably greater than or equal to ⅓ and less than or equal to 6, more preferably greater than or equal to 1 and less than or equal to 6. Note that when $z_1/y_1$ is greater than or equal to 1 and less than or equal to 6, a CAAC-OS film as the oxide semiconductor film is easily formed.

Here, the details of the CAAC-OS film will be described.

A CAAC-OS film is one of oxide semiconductor films having a plurality of c-axis aligned crystal parts.

In a combined analysis image (also referred to as a high-resolution TEM image) of a bright-field image and a diffraction pattern of a CAAC-OS film, which is obtained using a transmission electron microscope (TEM), a plurality of crystal parts can be observed. However, in the high-resolution TEM image, a boundary between crystal parts, that is, a grain boundary is not clearly observed. Thus, in the CAAC-OS film, a reduction in electron mobility due to the grain boundary is less likely to occur.

According to the high-resolution cross-sectional TEM image of the CAAC-OS film observed in the direction substantially parallel to the sample surface, metal atoms are arranged in a layered manner in the crystal parts. Each metal atom layer reflects unevenness of a surface over which the CAAC-OS film is formed (hereinafter, a surface over which the CAAC-OS film is formed is referred to as a formation surface) or the top surface of the CAAC-OS film, and is arranged parallel to the formation surface or the top surface of the CAAC-OS film.

On the other hand, according to the plan high-resolution TEM image of the CAAC-OS film observed in the direction substantially perpendicular to the sample surface, metal atoms are arranged in a triangular or hexagonal arrangement in the crystal parts. However, there is no regularity of arrangement of metal atoms between different crystal parts.

For example, when the structure of a CAAC-OS including an $InGaZnO_4$ crystal is analyzed by an out-of-plane method using an X-ray diffraction (XRD) apparatus, a peak may appear at a diffraction angle (2θ) of around 31°. This peak is derived from the (009) plane of the $InGaZnO_4$ crystal, which indicates that crystals in the CAAC-OS film have c-axis alignment, and that the c-axes are aligned in the direction substantially perpendicular to the formation surface or the top surface of the CAAC-OS film.

Note that in analysis of the CAAC-OS film by an out-of-plane method, another peak may appear when 2θ is around 36°, in addition to the peak at 2θ of around 31°. The peak at 2θ of around 36° indicates that a crystal having no c-axis alignment is included in part of the CAAC-OS film. It is preferable that in the CAAC-OS film, a peak appear when 2θ is around 31° and that a peak not appear when 2θ is around 36°.

The CAAC-OS film is an oxide semiconductor film with low impurity concentration. The impurity is an element other than the main components of the oxide semiconductor film, such as hydrogen, carbon, silicon, or a transition metal element. In particular, an element (specifically, silicon or the like) having higher strength of bonding to oxygen than a metal element included in an oxide semiconductor film extracts oxygen from the oxide semiconductor film, which results in disorder of the atomic arrangement and reduced crystallinity of the oxide semiconductor film. Furthermore, a heavy metal such as iron or nickel, argon, carbon dioxide, or the like has a large atomic radius (molecular radius), and thus disturbs the atomic arrangement of the oxide semiconductor film and causes a decrease in crystallinity when it is contained in the oxide semiconductor film. Note that the impurity contained in the oxide semiconductor might serve as a carrier trap or a carrier generation source.

The CAAC-OS film is an oxide semiconductor having a low density of defect states. In some cases, oxygen vacancies in the oxide semiconductor film serve as carrier traps or serve as carrier generation sources when hydrogen is captured therein, for example.

The state in which impurity concentration is low and density of defect states is low (the number of oxygen vacancies is small) is referred to as a "highly purified intrinsic" or "substantially intrinsic" state. A highly purified intrinsic or substantially intrinsic oxide semiconductor has few carrier generation sources, and thus can have a low carrier density. Therefore, a transistor including the oxide semiconductor film rarely has negative threshold voltage (is rarely normally on). The highly purified intrinsic or substantially intrinsic oxide semiconductor film has few carrier traps. Accordingly, the transistor including the oxide semiconductor film has little variation in electrical characteristics and high reliability. Charge trapped by the carrier traps in the oxide semiconductor film takes a long time to be released and might behave like fixed charge. Thus, the transistor including the oxide semiconductor film having high impurity concentration and a high density of defect states has unstable electrical characteristics in some cases.

With the use of the CAAC-OS film in a transistor, variation in the electrical characteristics of the transistor due to irradiation with visible light or ultraviolet light is small.

Since the OS transistor has a wider band gap than a transistor including silicon in its channel formation region (a Si transistor), dielectric breakdown is unlikely to occur when a high voltage is applied. Although a voltage of several hundreds of volts is generated when battery cells are connected in series, the above-described OS transistor is suitable for a circuit of a battery management unit which is used for such battery cells in the power storage device.

Figure 45:
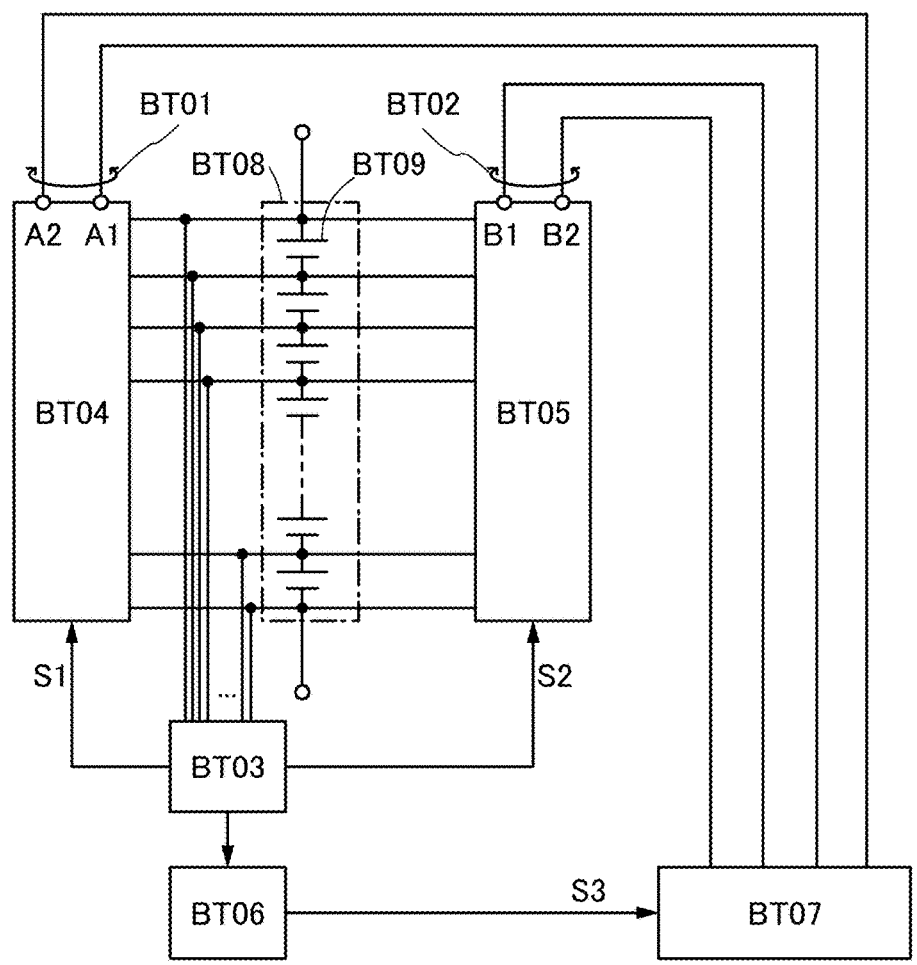
FIG. 45 is a block diagram illustrating one embodiment of the present invention.

FIG. 45 is an example of a block diagram of the power storage device. A power storage device BT00 illustrated in FIG. 45 includes a terminal pair BT01, a terminal pair BT02, a switching control circuit BT03, a switching circuit BT04, a switching circuit BT05, a voltage transformation control circuit BT06, a voltage transformer circuit BT07, and a battery portion BT08 including a plurality of battery cells BT09 connected in series.

In the power storage device BT00 illustrated in FIG. 45, a portion including the terminal pair BT01, the terminal pair BT02, the switching control circuit BT03, the switching circuit BT04, the switching circuit BT05, the voltage transformation control circuit BT06, and the voltage transformer circuit BT07 can be referred to as a battery management unit.

The switching control circuit BT03 controls operations of the switching circuits BT04 and BT05. Specifically, the switching control circuit BT03 selects battery cells to be discharged (a discharge battery cell group) and battery cells to be charged (a charge battery cell group) in accordance with voltage measured for every battery cell BT09.

Furthermore, the switching control circuit BT03 outputs a control signal S1 and a control signal S2 on the basis of the selected discharge battery cell group and the selected charge battery cell group. The control signal S1 is output to the switching circuit BT04. The control signal S1 controls the switching circuit BT04 so that the terminal pair BT01 and the discharge battery cell group are connected. In addition, the control signal S2 is output to the switching circuit BT05.

The control signal S2 controls the switching circuit BT05 so that the terminal pair BT02 and the charge battery cell group are connected.

The switching control circuit BT03 generates the control signal S1 and the control signal S2 on the basis of the connection relation of the switching circuit BT04, the switching circuit BT05, and the voltage transformer circuit BT07 so that terminals having the same polarity of the terminal pair BT01 and the discharge battery cell group are connected with each other, or terminals having the same polarity of the terminal pair BT02 and the charge battery cell group are connected with each other.

The operations of the switching control circuit BT03 will be described in detail.

First, the switching control circuit BT03 measures the voltage of each of the plurality of battery cells BT09. Then, the switching control circuit BT03 determines that the battery cell BT09 having a voltage higher than a predetermined threshold value is a high-voltage battery cell (high-voltage cell) and that the battery cell BT09 having a voltage lower than the predetermined threshold value is a low-voltage battery cell (low-voltage cell), for example.

As a method to determine whether a battery cell is a high-voltage cell or a low-voltage cell, any of various methods can be employed. For example, the switching control circuit BT03 may determine whether each battery cell BT09 is a high-voltage cell or a low-voltage cell on the basis of the voltage of the battery cell BT09 having the highest voltage or the lowest voltage among the plurality of battery cells BT09. In this case, the switching control circuit BT03 can determine whether each battery cell BT09 is a high-voltage cell or a low-voltage cell by, for example, determining whether or not the ratio of the voltage of each battery cell BT09 to the reference voltage is the predetermined value or more. Then, the switching control circuit BT03 determines a charge battery cell group and a discharge battery cell group on the basis of the determination result.

Note that high-voltage cells and low-voltage cells are mixed in various states in the plurality of battery cells BT09. For example, the switching control circuit BT03 selects a portion having the largest number of high-voltage cells connected in series as the discharge battery cell group of mixed high-voltage cells and low-voltage cells. Furthermore, the switching control circuit BT03 selects a portion having the largest number of low-voltage cells connected in series as the charge battery cell group. In addition, the switching control circuit BT03 may preferentially select the battery cells BT09 which are almost overcharged or over-discharged as the discharge battery cell group or the charge battery cell group.

Figure 46A:
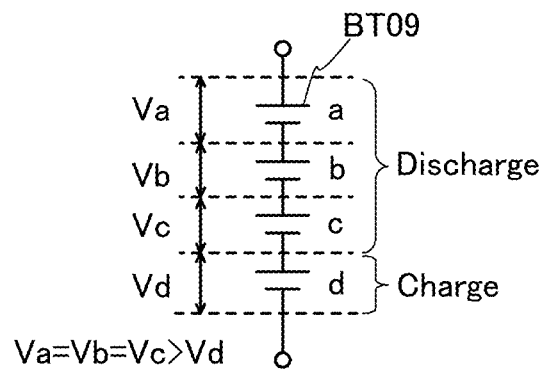
FIGS. 46A to 46C are schematic views each illustrating one embodiment of the present invention.
Figure 46B:
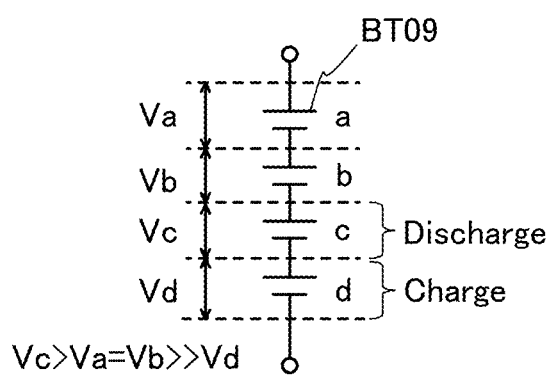
Figure 46C:
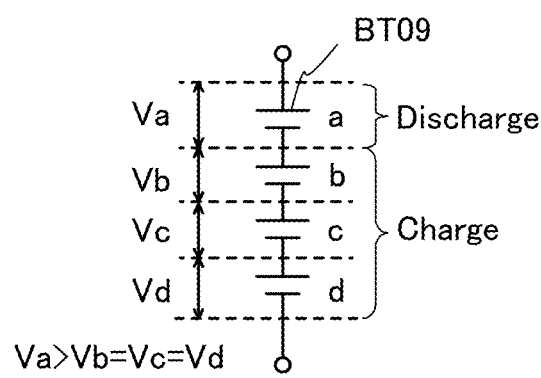

Here, operation examples of the switching control circuit BT03 in this embodiment will be described with reference to FIGS. 46A to 46C. FIGS. 46A to 46C illustrate the operation examples of the switching control circuit BT03. Note that FIGS. 46A to 46C each illustrate the case where four battery cells BT09 are connected in series as an example for convenience of explanation.

FIG. 46A shows the case where the relation of voltages Va, Vb, Vc, and Vd is Va=Vb=Vc>Vd where the voltages Va, Vb, Vc, and Vd are the voltages of a battery cell a, a battery cell b, a battery cell c, and a battery cell d, respectively. That is, a series of three high-voltage cells a to c and one low-voltage cell d are connected in series. In this case, the switching control circuit BT03 selects the series of three high-voltage cells a to c as the discharge battery cell group. In addition, the switching control circuit BT03 selects the low-voltage cell d as the charge battery cell group.

Next, FIG. 46B shows the case where the relation of the voltages is Vc>Va=Vb>>Vd. That is, a series of two low-voltage cells a and b, one high-voltage cell c, and one low-voltage cell d which is almost over-discharged are connected in series. In this case, the switching control circuit BT03 selects the high-voltage cell c as the discharge battery cell group. Since the low-voltage cell d is almost over-discharged, the switching control circuit BT03 preferentially selects the low-voltage cell d as the charge battery cell group instead of the series of two low-voltage cells a and b.

Lastly, FIG. 46C shows the case where the relation of the voltages is Va>Vb=Vc=Vd. That is, one high-voltage cell a and a series of three low-voltage cells b to d are connected in series. In this case, the switching control circuit BT03 selects the high-voltage cell a as the discharge battery cell group. In addition, the switching control circuit BT03 selects the series of three low-voltage cells b to d as the charge battery cell group.

On the basis of the determination result shown in the examples of FIGS. 46A to 46C, the switching control circuit BT03 outputs the control signal S1 and the control signal S2 to the switching circuit BT04 and the switching circuit BT05, respectively. Information showing the discharge battery cell group, which is the connection destination of the switching circuit BT04, is set in the control signal S1. Information showing the charge battery cell group, which is the connection destination of the switching circuit BT05 is set in the control signal S2.

The above is the detailed description of the operations of the switching control circuit BT03.

The switching circuit BT04 sets the connection destination of the terminal pair BT01 at the discharge battery cell group selected by the switching control circuit BT03, in response to the control signal S1 output from the switching control circuit BT03.

The terminal pair BT01 includes a pair of terminals A1 and A2. The switching circuit BT04 connects one of the pair of terminals A1 and A2 to a positive electrode terminal of the battery cell BT09 positioned on the most upstream side (on the high potential side) of the discharge battery cell group, and the other to a negative electrode terminal of the battery cell BT09 positioned on the most downstream side (on the low potential side) of the discharge battery cell group. Note that the switching circuit BT04 can recognize the position of the discharge battery cell group on the basis of the information set in the control signal S1.

The switching circuit BT05 sets the connection destination of the terminal pair BT02 at the charge battery cell group selected by the switching control circuit BT03, in response to the control signal S2 output from the switching control circuit BT03.

The terminal pair BT02 includes a pair of terminals B1 and B2. The switching circuit BT05 sets the connection destination of the terminal pair BT02 by connecting one of the pair of terminals B1 and B2 to a positive electrode terminal of the battery cell BT09 positioned on the most upstream side (on the high potential side) of the charge battery cell group, and the other to a negative electrode terminal of the battery cell BT09 positioned on the most downstream side (on the low potential side) of the charge battery cell group. Note that the switching circuit BT05 can recognize the position of the charge battery cell group on the basis of the information set in the control signal S2.

Figure 47:
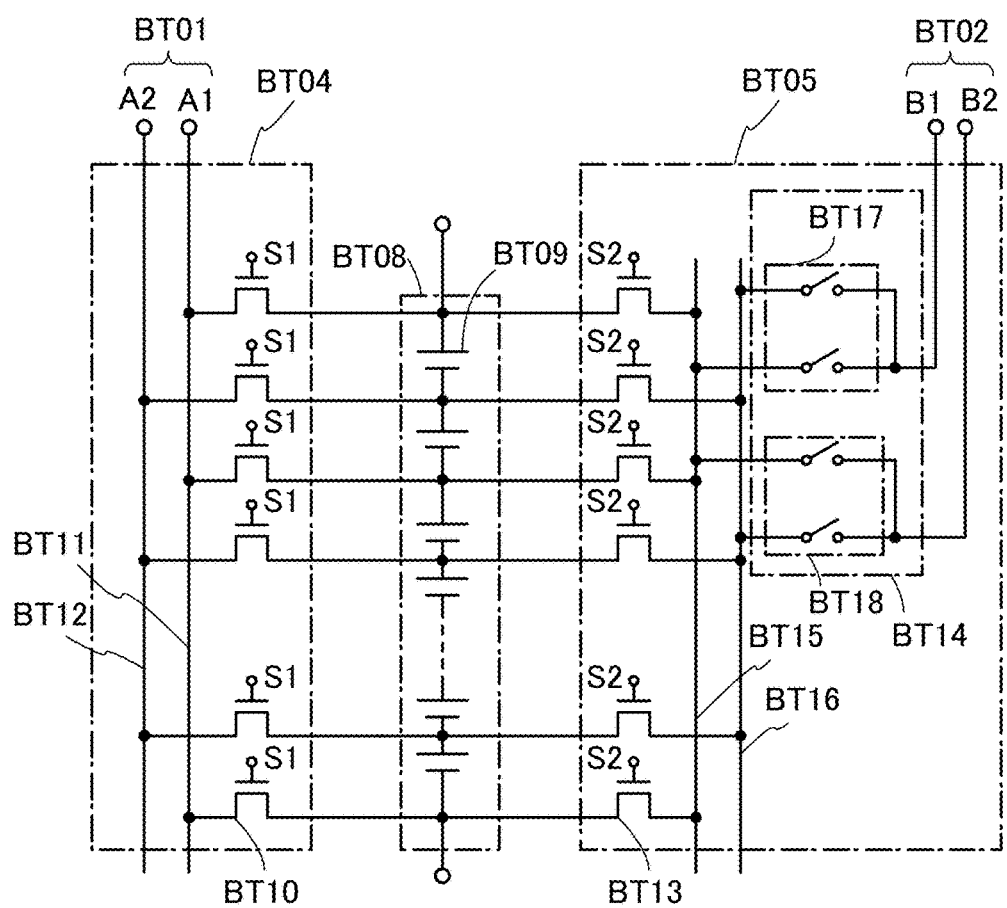
FIG. 47 is a circuit diagram illustrating one embodiment of the present invention.
Figure 48:
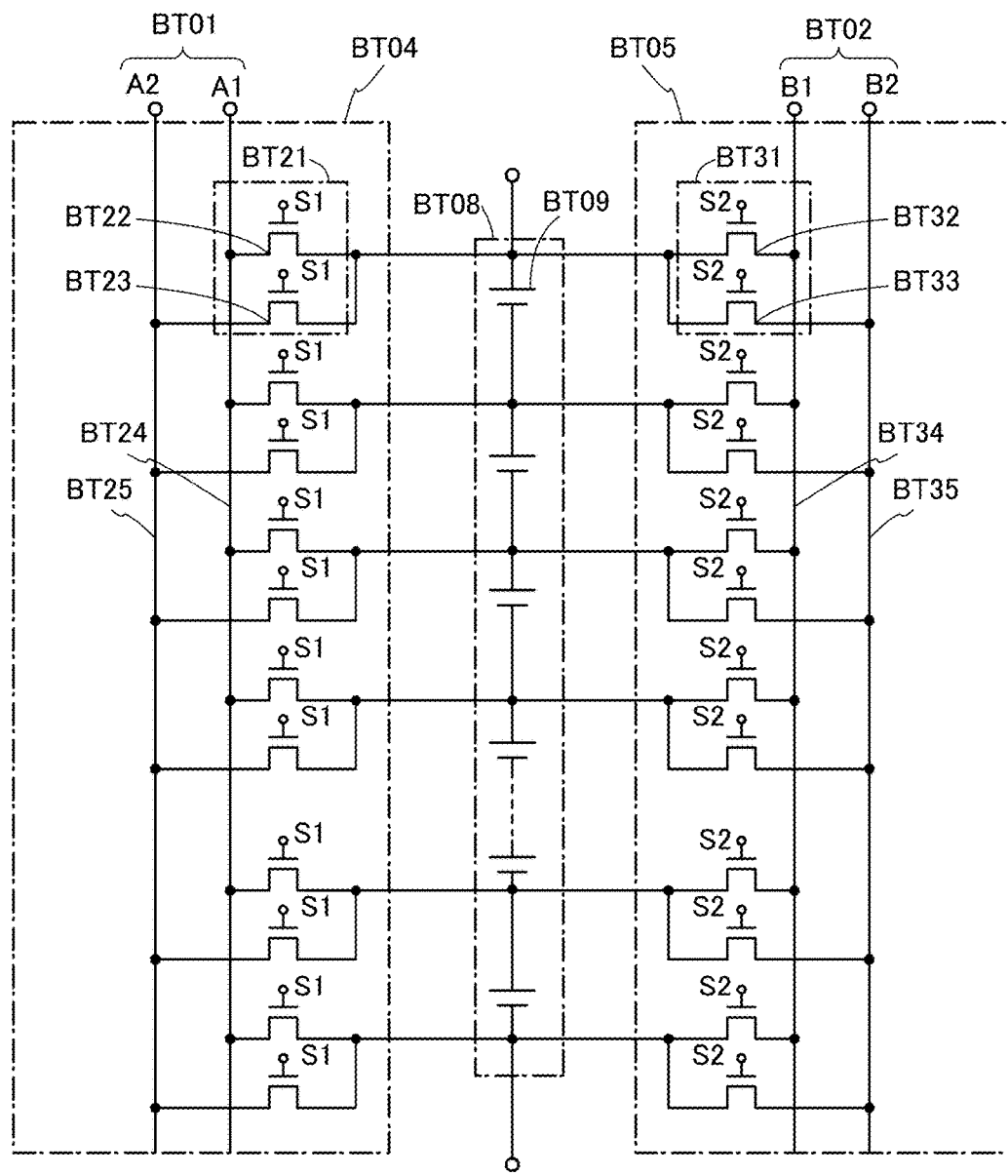
FIG. 48 is a circuit diagram illustrating one embodiment of the present invention.

FIG. 47 and FIG. 48 are circuit diagrams showing configuration examples of the switching circuits BT04 and BT05.

In FIG. 47, the switching circuit BT04 includes a plurality of transistors BT10, a bus BT11, and a bus BT12. The bus BT11 is connected to the terminal A1. The bus BT12 is connected to the terminal A2. Sources or drains of the plurality of transistors BT10 are connected alternately to the bus BT11 and the bus BT12. The sources or drains which are not connected to the bus BT11 and the bus BT12 of the plurality of transistors BT10 are each connected between two adjacent battery cells BT09.

The source or drain of the transistor BT10 on the most upstream side of the plurality of transistors BT10 is connected to the positive electrode terminal of the battery cell BT09 on the most upstream side of the battery portion BT08. The source or drain of the transistor BT10 on the most downstream side of the plurality of transistors BT10 is connected to the negative electrode terminal of the battery cell BT09 on the most downstream side of the battery portion BT08.

The switching circuit BT04 connects the discharge battery cell group to the terminal pair BT01 by bringing one of the plurality of transistors BT10 which are connected to the bus BT11 and one of the plurality of transistors BT10 which are connected to the bus BT12 into an on state in response to the control signal Si supplied to gates of the plurality of transistors BT10. Accordingly, the positive electrode terminal of the battery cell BT09 on the most upstream side of the discharge battery cell group is connected to one of the pair of terminals A1 and A2. In addition, the negative electrode terminal of the battery cell BT09 on the most downstream side of the discharge battery cell group is connected to the other of the pair of terminals A1 and A2 (i.e., a terminal which is not connected to the positive electrode terminal).

An OS transistor is preferably used as the transistor BT10. Since the off-state current of the OS transistor is low, the amount of charge that leaks from the battery cell which does not belong to the discharge battery cell group can be reduced, and reduction in capacity with the lapse of time can be suppressed. In addition, dielectric breakdown is unlikely to occur in the OS transistor when a high voltage is applied. Therefore, the battery cell BT09 and the terminal pair BT01, which are connected to the transistor BT10 in an off state, can be insulated from each other even when the output voltage of the discharge battery cell group is high.

In FIG. 47, the switching circuit BT05 includes a plurality of transistors BT13, a current control switch BT14, a bus BT15, and a bus BT16. The bus BT15 and the bus BT16 are provided between the plurality of transistors BT13 and the current control switch BT14. Sources or drains of the plurality of transistors BT13 are connected alternately to the bus BT15 and the bus BT16. The sources or drains which are not connected to the bus BT15 and the bus BT16 of the plurality of transistors BT13 are each connected between two adjacent battery cells BT09.

The source or drain of the transistor BT13 on the most upstream side of the plurality of transistors BT13 is connected to the positive electrode terminal of the battery cell BT09 on the most upstream side of the battery portion BT08. The source or a drain of the transistor BT13 on the most downstream side of the plurality of transistors BT13 is connected to the negative electrode terminal of the battery cell BT09 on the most downstream side of the battery portion BT08.

An OS transistor is preferably used as the transistors BT13 like the transistors BT10. Since the off-state current of the OS transistor is low, the amount of charge that leaks from the battery cells which do not belong to the charge battery cell group can be reduced, and reduction in capacity with the lapse of time can be suppressed. In addition, dielectric breakdown is unlikely to occur in the OS transistor when a high voltage is applied. Therefore, the battery cell BT09 and the terminal pair BT02, which are connected to the transistor BT13 in an off state, can be insulated from each other even when a voltage for charging the charge battery cell group is high.

The current control switch BT14 includes a switch pair BT17 and a switch pair BT18. Terminals on one end of the switch pair BT17 are connected to the terminal B1. Terminals on the other end of the switch pair BT17 branch off from two switches. One switch is connected to the bus BT15, and the other switch is connected to the bus BT16. Terminals on one end of the switch pair BT18 are connected to the terminal B2. Terminals on the other end of the switch pair BT18 extend from two switches. One switch is connected to the bus BT15, and the other switch is connected to the bus BT16.

OS transistors are preferably used for the switches included in the switch pair BT17 and the switch pair BT18 like the transistors BT10 and BT13.

The switching circuit BT05 connects the charge battery cell group and the terminal pair BT02 by controlling the combination of on and off states of the transistors BT13 and the current control switch BT14 in response to the control signal S2.

For example, the switching circuit BT05 connects the charge battery cell group and the terminal pair BT02 in the following manner.

The switching circuit BT05 brings a transistor BT13 connected to the positive electrode terminal of the battery cell BT09 on the most upstream side of the charge battery cell group into an on state in response to the control signal S2 supplied to gates of the plurality of transistors BT13. In addition, the switching circuit BT05 brings a transistor BT13 connected to the negative electrode terminal of the battery cell BT09 on the most downstream side of the charge battery cell group into an on state in response to the control signal S2 supplied to the gates of the plurality of transistors BT13.

The polarities of voltages applied to the terminal pair BT02 can vary in accordance with the configurations of the voltage transformer circuit BT07 and the discharge battery cell group connected to the terminal pair BT01. In order to supply a current in the direction for charging the charge battery cell group, terminals with the same polarity of the terminal pair BT02 and the charge battery cell group are required to be connected to each other. In view of this, the current control switch BT14 is controlled by the control signal S2 so that the connection destination of the switch pair BT17 and that of the switch pair BT18 are changed in accordance with the polarities of the voltages applied to the terminal pair BT02.

The state where voltages are applied to the terminal pair BT02 so as to make the terminal B1 a positive electrode and the terminal B2 a negative electrode will be described as an example. Here, in the case where the battery cell BT09 positioned on the most downstream side of the battery portion BT08 is in the charge battery cell group, the switch pair BT17 is controlled to be connected to the positive electrode terminal of the battery cell BT09 in response to the control signal S2. That is, the switch of the switch pair BT17 connected to the bus BT16 is turned on, and the switch of the switch pair BT17 connected to the bus BT15 is turned off. In contrast, the switch pair BT18 is controlled to be connected to the negative electrode terminal of the battery cell BT09 positioned on the most downstream side of the battery portion BT08 in response to the control signal S2. That is, the switch of the switch pair BT18 connected to the bus BT15 is turned on, and the switch of the switch pair BT18 connected to the bus BT16 is turned off. In this manner, terminals with the same polarity of the terminal pair BT02 and the charge battery cell group are connected to each other. In addition, the current which flows from the terminal pair BT02 is controlled to be supplied in a direction so as to charge the charge battery cell group.

In addition, instead of the switching circuit BT05, the switching circuit BT04 may include the current control switch BT14.

FIG. 48 is a circuit diagram illustrating configuration examples of the switching circuit BT04 and the switching circuit BT05 which are different from those of FIG. 47.

In FIG. 48, the switching circuit BT04 includes a plurality of transistor pairs BT21, a bus BT24, and a bus BT25. The bus BT24 is connected to the terminal A1. The bus BT25 is connected to the terminal A2. Terminals on one end of each of the plurality of transistor pairs BT21 branch off from a transistor BT22 and a transistor BT23. Sources or drains of the transistors BT22 are connected to the bus BT24. Sources or drains of the transistors BT23 are connected to the bus BT25. In addition, terminals on the other end of each of the plurality of transistor pairs BT21 are connected between two adjacent battery cells BT09. The terminals on the other end of the transistor pair BT21 on the most upstream side of the plurality of transistor pairs BT21 are connected to the positive electrode terminal of the battery cell BT09 on the most upstream side of the battery portion BT08. The terminals on the other end of the transistor pair BT21 on the most downstream side of the plurality of transistor pairs BT21 are connected to a negative electrode terminal of the battery cell BT09 on the most downstream side of the battery portion BT08.

The switching circuit BT04 switches the connection destination of the transistor pair BT21 to one of the terminal A1 and the terminal A2 by turning on or off the transistors BT22 and BT23 in response to the control signal S1. Specifically, when the transistor BT22 is turned on, the transistor BT23 is turned off, so that the connection destination of the transistor pair BT21 is the terminal A1. On the other hand, when the transistor BT23 is turned on, the transistor BT22 is turned off, so that the connection destination of the transistor pair BT21 is the terminal A2. Which of the transistors BT22 and BT23 is turned on is determined by the control signal S1.

Two transistor pairs BT21 are used to connect the terminal pair BT01 and the discharge battery cell group. Specifically, the connection destinations of the two transistor pairs BT21 are determined on the basis of the control signal S1, and the discharge battery cell group and the terminal pair BT01 are connected. The connection destinations of the two transistor pairs BT21 are controlled by the control signal S1 so that one of the connection destinations is the terminal A1 and the other is the terminal A2.

The switching circuit BT05 includes a plurality of transistor pairs BT31, a bus BT34, and a bus BT35. The bus BT34 is connected to the terminal B1. The bus BT35 is connected to the terminal B2. Terminals on one end of each of the plurality of transistor pairs BT31 branch off from a transistor BT32 and a transistor BT33. One terminal extending from the transistor BT32 is connected to the bus BT34. The other terminal extending from the transistor BT33 is connected to the bus BT35. Terminals on the other end of each of the plurality of transistor pairs BT31 are connected between two adjacent battery cells BT09. The terminal on the other end of the transistor pair BT31 on the most upstream side of the plurality of transistor pairs BT31 is connected to the positive electrode terminal of the battery cell BT09 on the most upstream side of the battery portion BT08. The terminal on the other end of the transistor pair BT31 on the most downstream side of the plurality of transistor pairs BT31 is connected to the negative electrode terminal of the battery cell BT09 on the most downstream side of the battery portion BT08.

The switching circuit BT05 switches the connection destination of the transistor pair BT31 to one of the terminal B1 and the terminal B2 by turning on or off the transistors BT32 and BT33 in response to the control signal S2. Specifically, when the transistor BT32 is turned on, the transistor BT33 is turned off, so that the connection destination of the transistor pair BT31 is the terminal B1. On the other hand, when the transistor BT33 is turned on, the transistor BT32 is turned off, so that the connection destination of the transistor pair BT31 is the terminal B2. Which of the transistors BT32 and BT33 is turned on is determined by the control signal S2.

Two transistor pairs BT31 are used to connect the terminal pair BT02 and the charge battery cell group. Specifically, the connection destinations of the two transistor pairs BT31 are determined on the basis of the control signal S2, and the charge battery cell group and the terminal pair BT02 are connected. The connection destinations of the two transistor pairs BT31 are controlled by the control signal S2 so that one of the connection destinations is the terminal B1 and the other is the terminal B2.

The connection destinations of the two transistor pairs BT31 are determined by the polarities of the voltages applied to the terminal pair BT02. Specifically, in the case where voltages which make the terminal B1 a positive electrode and the terminal B2 a negative electrode are applied to the terminal pair BT02, the transistor pair BT31 on the upstream side is controlled by the control signal S2 so that the transistor BT32 is turned on and the transistor BT33 is turned off. In contrast, the transistor pair BT31 on the downstream side is controlled by the control signal S2 so that the transistor BT33 is turned on and the transistor BT32 is turned off. In the case where voltages which make the terminal B1 a negative electrode and the terminal B2 a positive electrode are applied to the terminal pair BT02, the transistor pair BT31 on the upstream side is controlled by the control signal S2 so that the transistor BT33 is turned on and the transistor BT32 is turned off. In contrast, the transistor pair BT31 on the downstream side is controlled by the control signal S2 so that the transistor BT32 is turned on and the transistor BT33 is turned off. In this manner, terminals with the same polarity of the terminal pair BT02 and the charge battery cell group are connected to each other. In addition, the current which flows from the terminal pair BT02 is controlled to be supplied in the direction for charging the charge battery cell group.

The voltage transformation control circuit BT06 controls the operation of the voltage transformer circuit BT07. The voltage transformation control circuit BT06 generates a voltage transformation signal S3 for controlling the operation of the voltage transformer circuit BT07 on the basis of the number of the battery cells BT09 included in the discharge battery cell group and the number of the battery cells BT09 included in the charge battery cell group and outputs the voltage transformation signal S3 to the voltage transformer circuit BT07.

In the case where the number of the battery cells BT09 included in the discharge battery cell group is larger than that included in the charge battery cell group, it is necessary to prevent a charging voltage which is too high from being applied to the charge battery cell group. Thus, the voltage transformation control circuit BT06 outputs the voltage transformation signal S3 for controlling the voltage transformer circuit BT07 so that a discharging voltage (Vdis) is lowered within a range where the charge battery cell group can be charged.

In the case where the number of the battery cells BT09 included in the discharge battery cell group is less than or equal to that included in the charge battery cell group, a charging voltage necessary for charging the charge battery cell group needs to be ensured. Therefore, the voltage transformation control circuit BT06 outputs the voltage transformation signal S3 for controlling the voltage transformer circuit BT07 so that the discharging voltage (Vdis) is raised within a range where a charging voltage which is too high is not applied to the charge battery cell group.

The voltage value of the charging voltage which is too high is determined in the light of product specifications and the like of the battery cell BT09 used in the battery portion BT08. The voltage which is raised or lowered by the voltage transformer circuit BT07 is applied as a charging voltage (Vcha) to the terminal pair BT02.

Figure 49A:
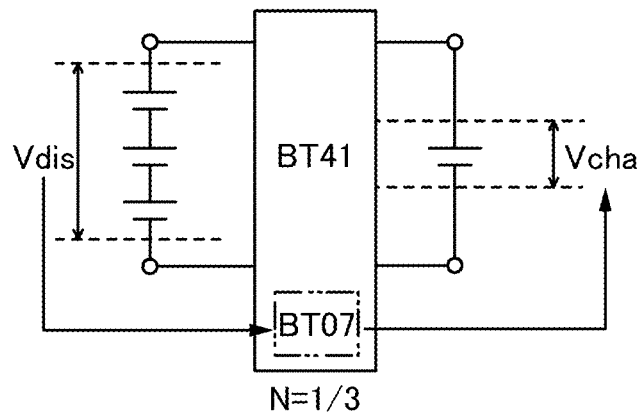
FIGS. 49A to 49C are schematic views each illustrating one embodiment of the present invention.
Figure 49B:
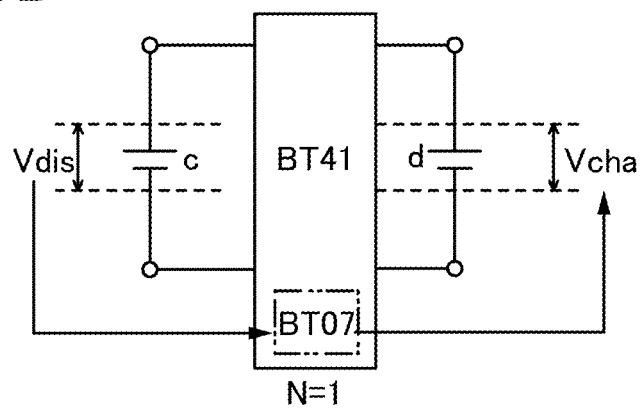
Figure 49C:
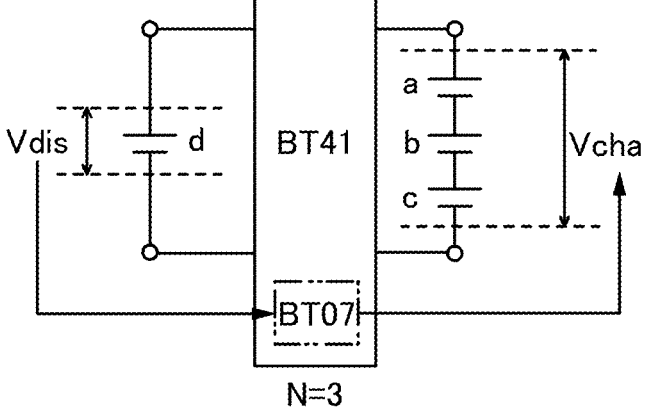

Here, operation examples of the voltage transformation control circuit BT06 in this embodiment will be described with reference to FIGS. 49A to 49C. FIGS. 49A to 49C are conceptual diagrams for explaining the operation examples of the voltage transformation control circuits BT06 for the discharge battery cell groups and the charge battery cell groups described in FIGS. 46A to 46C. FIGS. 49A to 49C each illustrate a battery control unit BT41. The battery control unit BT41 includes the terminal pair BT01, the terminal pair BT02, the switching control circuit BT03, the switching circuit BT04, the switching circuit BT05, the voltage transformation control circuit BT06, and the voltage transformer circuit BT07.

In an example illustrated in FIG. 49A, the series of three high-voltage cells a to c and one low-voltage cell d are connected in series as described in FIG. 46A. In this case, as described using FIG. 46A, the switching control circuit BT03 determines the high-voltage cells a to c as the discharge battery cell group, and determines the low-voltage cell d as the charge battery cell group. The voltage transformation control circuit BT06 calculates a conversion ratio N for converting the discharging voltage (Vdis) into the charging voltage (Vcha) based on the ratio of the number of the battery cells BT09 included in the charge battery cell group to the number of the battery cells BT09 included in the discharge battery cell group.

In the case where the number of the battery cells BT09 included in the discharge battery cell group is larger than that included in the charge battery cell group, when a discharging voltage is applied to the terminal pair BT02 without transforming the voltage, an overvoltage may be applied to the battery cells BT09 included in the charge battery cell group through the terminal pair BT02. Thus, in the case of FIG. 49A, it is necessary that a charging voltage (Vcha) applied to the terminal pair BT02 be lower than the discharging voltage. In addition, in order to charge the charge battery cell group, it is necessary that the charging voltage be higher than the total voltage of the battery cells BT09 included in the charge battery cell group. Thus, the voltage transformation control circuit BT06 sets the conversion ratio N for raising or lowering voltage larger than the ratio of the number of the battery cells BT09 included in the charge battery cell group to the number of the battery cells BT09 included in the discharge battery cell group.

Thus, the voltage transformation control circuit BT06 preferably sets the conversion ratio N for raising or lowering voltage larger than the ratio of the number of the battery cells BT09 included in the charge battery cell group to the number of the battery cells BT09 included in the discharge battery cell group by about 1% to 10%. Here, the charging voltage is made higher than the voltage of the charge battery cell group, but the charging voltage is equal to the voltage of the charge battery cell group in reality. Note that the voltage transformation control circuit BT06 feeds a current for charging the charge battery cell group in accordance with the conversion ratio N for raising or lowering voltage in order to make the voltage of the charge battery cell group equal to the charging voltage. The value of the current is set by the voltage transformation control circuit BT06.

In the example illustrated in FIG. 49A, since the number of the battery cells BT09 included in the discharge battery cell group is three and the number of the battery cells BT09 included in the charge battery cell group is one, the voltage transformation control circuit BT06 calculates a value which is slightly larger than $1/3$ as the conversion ratio N for raising or lowering voltage. Then, the voltage transformation control circuit BT06 outputs the voltage transformation signal S3, which lowers the discharging voltage in accordance with the conversion ratio N for raising or lowering voltage and converts the voltage into a charging voltage, to the voltage transformer circuit BT07. The voltage transformer circuit BT07 applies the charging voltage which is obtained by transformation in response to the voltage transformation signal S3 to the terminal pair BT02. Then, the battery cells BT09 included in the charge battery cell group are charged with the charging voltage applied to the terminal pair BT02.

In each of examples illustrated in FIGS. 49B and 49C, the conversion ratio N for raising or lowering voltage is calculated in a manner similar to that of FIG. 49A. In each of the examples illustrated in FIGS. 49B and 49C, since the number of the battery cells BT09 included in the discharge battery cell group is less than or equal to the number of the battery cells BT09 included in the charge battery cell group, the conversion ratio N for raising or lowering voltage is 1 or more. Therefore, in this case, the voltage transformation control circuit BT06 outputs the voltage transformation signal S3 for raising the discharging voltage and converting the voltage into the charging voltage.

The voltage transformer circuit BT07 converts the discharging voltage applied to the terminal pair BT01 into a charging voltage in response to the voltage transformation signal S3. The voltage transformer circuit BT07 applies the charging voltage to the terminal pair BT02. Here, the voltage transformer circuit BT07 electrically insulates the terminal pair BT01 from the terminal pair BT02. Accordingly, the voltage transformer circuit BT07 prevents a short circuit due to a difference between the absolute voltage of the negative electrode terminal of the battery cell BT09 on the most downstream side of the discharge battery cell group and the absolute voltage of the negative electrode terminal of the battery cell BT09 on the most downstream side of the charge battery cell group. Furthermore, the voltage transformer circuit BT07 converts the discharging voltage, which is the total voltage of the discharge battery cell group, into the charging voltage in response to the voltage transformation signal S3 as described above.

An insulated direct current (DC)-DC converter or the like can be used in the voltage transformer circuit BT07. In that case, the voltage transformation control circuit BT06 controls the charging voltage converted by the voltage transformer circuit BT07 by outputting a signal for controlling the on/off ratio (the duty ratio) of the insulated DC-DC converter as the voltage transformation signal S3.

Examples of the insulated DC-DC converter include a flyback converter, a forward converter, a ringing choke converter (RCC), a push-pull converter, a half-bridge converter, and a full-bridge converter, and a suitable converter is selected in accordance with the value of the intended output voltage.

Figure 50:
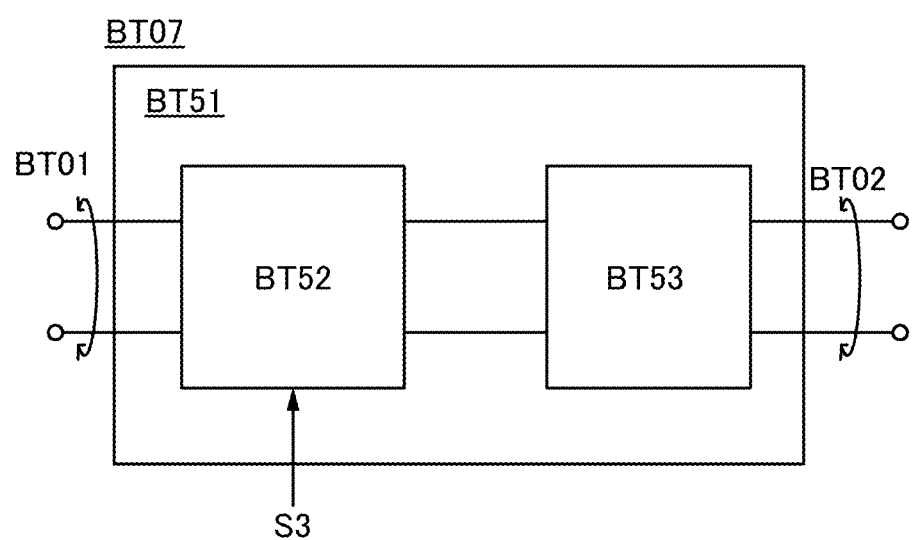
FIG. 50 is a block diagram illustrating one embodiment of the present invention.

The configuration of the voltage transformer circuit BT07 including the insulated DC-DC converter is illustrated in FIG. 50. An insulated DC-DC converter BT51 includes a switch portion BT52 and a transformer BT53. The switch portion BT52 is a switch for switching on/off of the insulated DC-DC converter, and a metal oxide semiconductor field-effect transistor (MOSFET), a bipolar transistor, or the like is used as the switch portion BT52. The switch portion BT52 periodically turns on and off the insulated DC-DC converter BT51 in response to the voltage transformation signal S3 for controlling the on/off ratio which is output from the voltage transformation control circuit BT06. The switch portion BT52 can have any of various structures in accordance with the type of the insulated DC-DC converter which is used. The transformer BT53 converts the discharging voltage applied from the terminal pair BT01 into the charging voltage. In detail, the transformer BT53 operates in conjunction with the on/off state of the switch portion BT52 and converts the discharging voltage into the charging voltage in accordance with the on/off ratio. As the time during which the switch portion BT52 is on becomes longer in its switching period, the charging voltage is increased. On the other hand, as the time during which the switch portion BT52 is on becomes shorter in its switching period, the charging voltage is decreased. In the case where the insulated DC-DC converter is used, the terminal pair BT01 and the terminal pair BT02 can be insulated from each other inside the transformer BT53.

Figure 51:
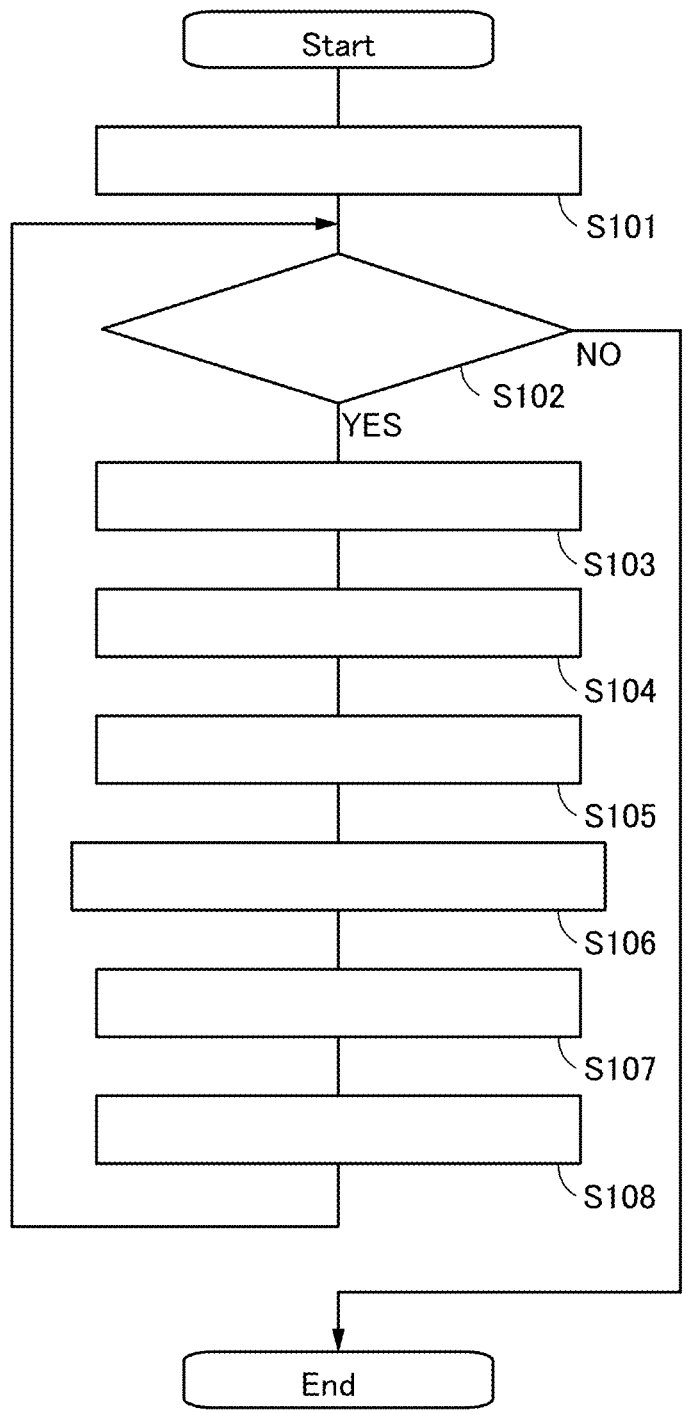
FIG. 51 is a flow chart showing one embodiment of the present invention.

A flow of operations of the power storage device BT00 in this embodiment will be described with reference to FIG. 51. FIG. 51 is a flow chart showing the flow of the operations of the power storage device BT00.

First, the power storage device BT00 obtains a voltage measured for each of the plurality of battery cells BT09 (step S101). Then, the power storage device BT00 determines whether or not the condition for starting the operation of reducing variations in voltage of the plurality of battery cells BT09 is satisfied (step S102). For example, the condition that the difference between the maximum value and the minimum value of the voltage measured for each of the plurality of battery cells BT09 is higher than or equal to the predetermined threshold value can be used. In the case where the condition is not satisfied (step S102: NO), the power storage device BT00 does not perform the following operation because voltages of the battery cells BT09 are well balanced. In contrast, in the case where the condition is satisfied (step S102: YES), the power storage device BT00 performs the operation of reducing variations in the voltage of the battery cells BT09. In this operation, the power storage device BT00 determines whether each battery cell BT09 is a high voltage cell or a low voltage cell on the basis of the measured voltage of each cell (step S103). Then, the power storage device BT00 determines a discharge battery cell group and a charge battery cell group on the basis of the determination result (step S104). In addition, the power storage device BT00 generates the control signal S1 for setting the connection destination of the terminal pair BT01 to the determined discharge battery cell group, and the control signal S2 for setting the connection destination of the terminal pair BT02 to the determined charge battery cell group (step S105). The power storage device BT00 outputs the generated control signals S1 and S2 to the switching circuit BT04 and the switching circuit BT05, respectively. Then, the switching circuit BT04 connects the terminal pair BT01 and the discharge battery cell group, and the switching circuit BT05 connects the terminal pair BT02 and the discharge battery cell group (step S106). The power storage device BT00 generates the voltage transformation signal S3 based on the number of the battery cells BT09 included in the discharge battery cell group and the number of the battery cells BT09 included in the charge battery cell group (step S107). Then, the power storage device BT00 converts, in response to the voltage transformation signal S3, the discharging voltage applied to the terminal pair BT01 into a charging voltage and applies the charging voltage to the terminal pair BT02 (step S108). In this way, charge of the discharge battery cell group is transferred to the charge battery cell group.

Although the plurality of steps are shown in order in the flow chart of FIG. 51, the order of performing the steps is not limited to the order.

According to the above embodiment, when charge is transferred from the discharge battery cell group to the charge battery cell group, a structure where charge from the discharge battery cell group is temporarily stored, and the stored charge is sent to the charge battery cell group is unnecessary, unlike in the a capacitive type circuit. Accordingly, the charge transfer efficiency per unit time can be increased. In addition, the switching circuit BT04 and the switching circuit BT05 determine which battery cell in the discharge battery cell group and the charge battery cell group to be connected to the voltage transformer circuit.

Furthermore, the voltage transformer circuit BT07 converts the discharging voltage applied to the terminal pair BT01 into the charging voltage based on the number of the battery cells BT09 included in the discharge battery cell group and the number of the battery cells BT09 included in the charge battery cell group, and applies the charging voltage to the terminal pair BT02. Thus, charge can be transferred without any problems regardless of how the battery cells BT09 are selected as the discharge battery cell group and the charge battery cell group.

Furthermore, the use of OS transistors as the transistor BT10 and the transistor BT13 can reduce the amount of charge that leaks from the battery cells BT09 not belonging to the charge battery cell group or the discharge battery cell group. Accordingly, a decrease in capacity of the battery cells BT09 which do not contribute to charging or discharging can be suppressed. In addition, the variations in characteristics of the OS transistor due to heat are smaller than those of an Si transistor. Accordingly, even when the temperature of the battery cells BT09 is increased, an operation such as turning on or off the transistors in response to the control signals Si and S2 can be performed normally.

This embodiment can be implemented in combination with any of the other embodiments as appropriate.

Example 1

In this example, separation strength tests for the electrodes of embodiments of the present invention will be described.

<Fabrication of Electrode>

Figure 14:
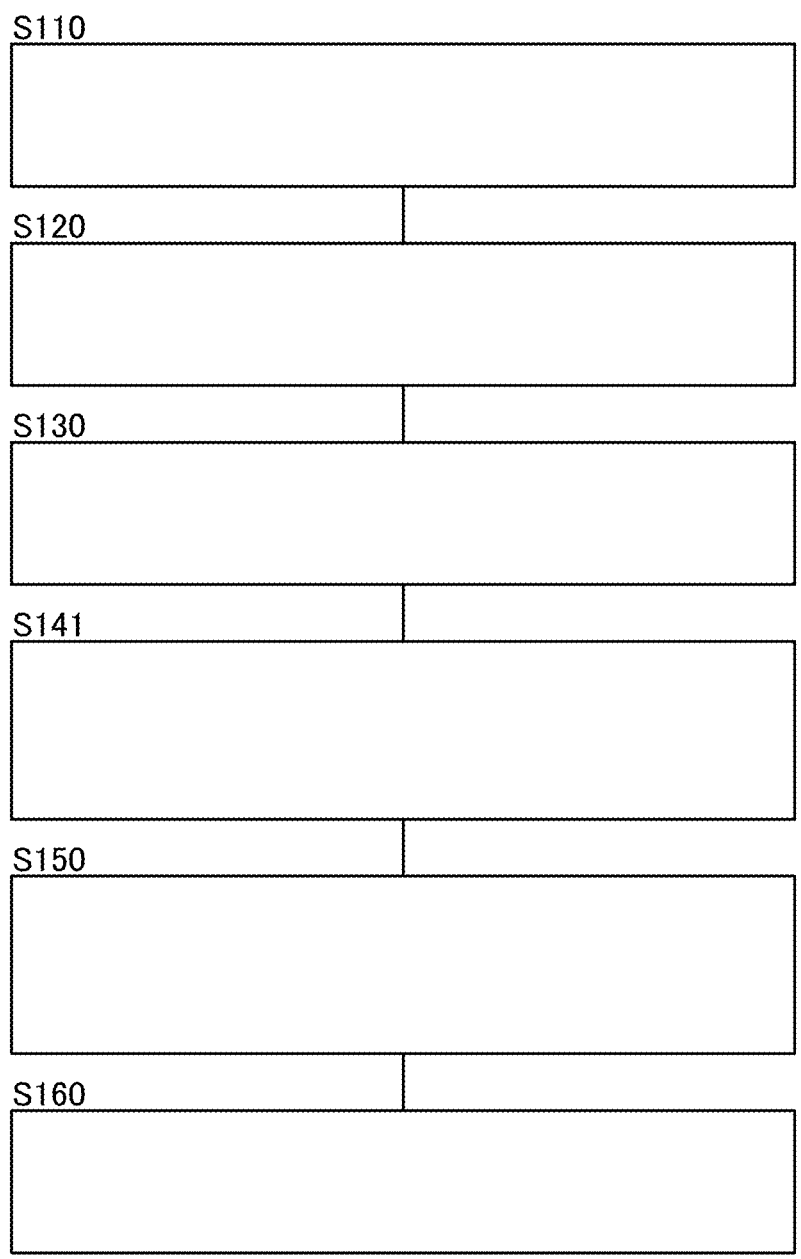
FIG. 14 is a flow chart showing a method for fabricating an electrode.

Slurries used for electrode application were formed based on the flow chart shown in FIG. 14. MCMB graphite having a specific surface area of 1.5 m²/g was used as an active material. As a conductive additive, vapor grown carbon fiber (VGCF) (registered trademark)-H (manufactured by SHOWA DENKO K.K., the fiber diameter: 150 nm, the specific surface area: 13 m²/g) was used. For a binder, CMC-Na and SBR were used. The polymerization degree of CMC-Na that was used was 600 to 800, and the viscosity of a 1 wt % of CMC-Na aqueous solution was in the range from 300 mPa·s to 500 mPa·s inclusive.

First, steps for forming the slurries will be described in detail. The composition of the slurries was set such that the weight ratio of the active material to VGCF (registered trademark)-H, CMC-Na, and SBR was 96:1:1:2 [wt %].

The slurries were formed according to Steps S110 to S160 in FIG. 14. Time for kneading in Step S120 is 40 minutes. Time for mixing in Step S150 is 20 minutes.

Here, conditions for forming the slurries, such as the amount of water to be added in Steps S120 to S150 in FIG. 14, were adjusted to form slurries with four types of solid content proportion shown in Table 1. Here, the solid content proportion refers to the proportion of the weight of materials other than the solvent to the total weight of the slurry. The viscosities of the four types of slurries were measured.

TABLE 1

|  | Solid content proportion [weight %] | Viscosity [Pa · s] |
| --- | --- | --- |
| Condition A | 65.1 | 0.78 |
| Condition B | 64.2 | 1.19 |
| Condition C | 64.0 | 1.36 |
| Condition D | 63.3 | 1.87 |

For the measurement of the viscosities, a rotating viscometer TVE-35H was used. Table 1 lists viscosities at a rotation rate of 100 rpm.

Next, the slurries of Conditions A to D in Table 1 were used for application to fabricate Electrodes A to D.

First, the formed slurry was applied to one surface of a current collector. For the application of the slurry, a continuous coater was used. As the current collector, copper with a thickness of 18 μm was used. The coating speed was set to 0.75 m/min. Then, first heat treatment and second heat treatment followed. In the first heat treatment, exposure to a hot air (the air) at 50° C. was performed for 2 minutes, and in the second heat treatment, exposure to a hot air (the air) at 70° C. was performed for 2 minutes.

Through the above steps, Electrodes A to D were obtained. The width and the length of the current collector are 20 cm and 25 cm, respectively. An active material layer was formed to have a region with a width of 12 cm and a length of 25 cm. The loading is approximately 8 mg/cm² for Electrode A, Electrode C, and Electrode D, and approximately 11 mg/cm² for Electrode B. Note that loading means the weight of an active material per unit area included in an electrode.

<Separation Test>

Next, two regions with a width of 2.5 cm and a length of 20 cm were cut out from each of Electrodes A to D, and separation tests were performed under the conditions described in Embodiment 1. Here, the active material layer is formed to have a region with a length of approximately 12 cm. For example, Electrodes A-1 and A-2 are electrodes stamped out from Electrode A. Electrodes B-1 and B-2 are electrodes stamped out from Electrode B. Electrodes C-1 and C-2 are electrodes stamped out from Electrode C. Electrodes D-1 and D-2 are electrodes stamped out from Electrode D.

The separation tests were performed with reference to FIGS. 17A to 17C and FIGS. 18A and 18B.

The separation tests were performed with reference to the cross-sectional view in FIG. 18A. First, a Kapton (registered trademark) adhesive tape was attached as the tape 1006 to the active material layer 1002. Then, the current collector 1001 was separated from the active material layer 1002. Then, the tape 1005 was attached to the end of the separated portion of the current collector. After that, the tape was folded at an angle of 180°. The width of the tape 1005 is 1.9 cm. Next, a sample was fixed to the plate 1011 using a Scotch (registered trademark) tape as the tape 1010.

The tape 1006 attached to one surface of the active material layer 1002 was fixed to the plate, the tape 1005 was pulled at a rate of 20 mm/min. to separate the current collector 1001 from the active material layer 1002, and the force at the time was measured. A resin was used as a material of the plate. In that case, the direction in which the tape 1005 was pulled (the direction shown by the arrow 1008) is 180° from the direction in which the current collector was provided (the direction shown by the arrow 1009). The force was measured using EZ graph (produced by SHIMADZU CORPORATION).

Figure 52:
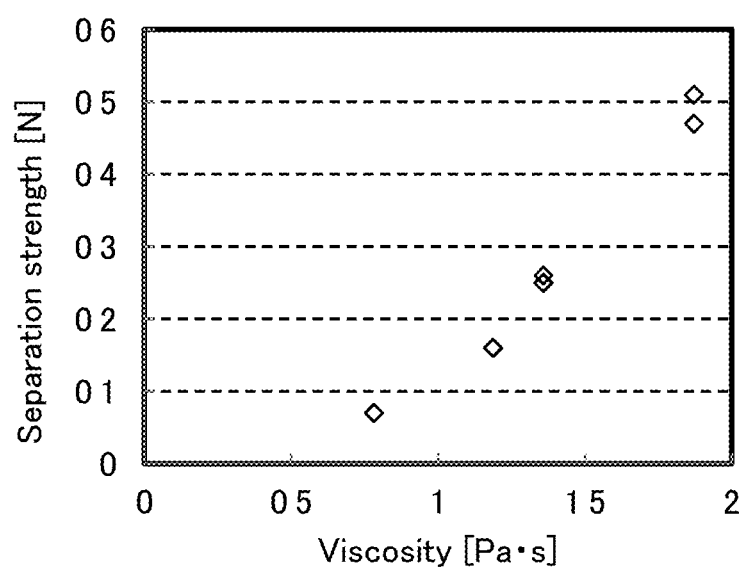
FIG. 52 is a graph showing the relation between viscosity and separation strength.

Table 2 lists the separation strengths of Electrodes A-1 to D-2. In the plot of FIG. 52, the horizontal axis represents the viscosity of slurry, and the vertical axis represents the obtained separation strength. The higher the viscosity, the higher the separation strength. When the viscosity is 1.19 Pa·s, the separation strength is 0.16 N, and the separation strength normalized by the width of the tape is 0.084 N/cm. When the viscosity is 1.87 Pa·s, the separation strength is approximately 0.5 N, and the separation strength normalized by the width of the tape is 0.26 N/cm.

TABLE 2

|  | Seperation strength [N] |
| --- | --- |
| Electrode A-1 | 0.07 |
| Electrode A-2 | 0.07 |
| Electrode B-1 | 0.16 |
| Electrode B-2 | 0.16 |
| Electrode C-1 | 0.25 |
| Electrode C-2 | 0.26 |
| Electrode D-1 | 0.47 |
| Electrode D-2 | 0.51 |

<Fabrication of Half Cells>

Several portions were stamped out from each of Electrodes A to D, and half cells were fabricated using the stamped-out electrodes. Table 3 lists the loadings of the slurries in the electrodes.

TABLE 3

| Electrode | Loading [mg/cm²] | Charge and discharge efficiency [%] | Measurement temperature [° C.] |
| --- | --- | --- | --- |
| Electrode A-3 | 7.4 | 97.0% | 25 |
| Electrode A-4 | 8.0 | 97.2% | 25 |
| Electrode B-3 | 10.6 | 97.2% | 25 |
| Electrode C-3 | 7.9 | 97.3% | 25 |
| Electrode C-4 | 7.8 | 97.5% | 25 |
| Electrode D-3 | 8.5 | 97.3% | 25 |

TABLE 3-continued

| Electrode | Loading [mg/cm²] | Charge and discharge efficiency [%] | Measurement temperature [° C.] |
|---|---|---|---|
| Electrode D-4 | 8.4 | 97.5% | 25 |
| Electrode A-5 | 7.9 | 95.9% | 60 |
| Electrode A-6 | 8.0 | 96.0% | 60 |
| Electrode A-7 | 7.9 | 95.8% | 60 |
| Electrode A-8 | 7.6 | 95.9% | 60 |
| Electrode B-4 | 10.5 | 96.5% | 60 |
| Electrode B-5 | 10.7 | 96.4% | 60 |
| Electrode B-6 | 10.6 | 96.4% | 60 |
| Electrode B-7 | 10.8 | 96.5% | 60 |
| Electrode C-5 | 7.7 | 96.4% | 60 |
| Electrode C-6 | 7.7 | 96.5% | 60 |
| Electrode C-7 | 7.8 | 96.3% | 60 |
| Electrode C-8 | 7.8 | 96.4% | 60 |
| Electrode D-5 | 8.5 | 96.8% | 60 |
| Electrode D-6 | 8.4 | 96.6% | 60 |
| Electrode D-7 | 8.4 | 96.6% | 60 |
| Electrode D-8 | 8.4 | 96.6% | 60 |

<Half Cell Characteristics>

Lithium metal was combined with each of Electrodes A to D to form a half cell. The characteristics were measured with the use of a CR2032 coin-type storage battery (with a diameter of 20 mm and a height of 3.2 mm). For a separator, a stack of polypropylene and GF/C, which is a glass fiber filter produced by Whatman Ltd., was used. An electrolytic solution was formed in such a manner that lithium hexafluorophosphate (LiPF$_6$) was dissolved at a concentration of 1 mol/L in a solution in which ethylene carbonate (EC) and diethyl carbonate (DEC) were mixed at a volume ratio of 3:7. A positive electrode can and a negative electrode can were formed of stainless steel (SUS).

Next, the fabricated half cells were discharged and then charged. The measurement temperatures are 25° C. and 60° C. The measurement temperatures of the half cells are shown in Table 3. The discharging (Li insertion) was performed in the following manner: constant current discharging was performed at a rate of 0.1 C until a lower limit of 0.01 V was reached, and then, constant voltage discharging was performed at a voltage of 0.01 V until a lower limit of a current value corresponding to 0.01 C was reached. As the charging (Li deintercalation), constant current charging was performed at a rate of 0.1 C until an upper limit of 1 V was reached.

Figure 53A:
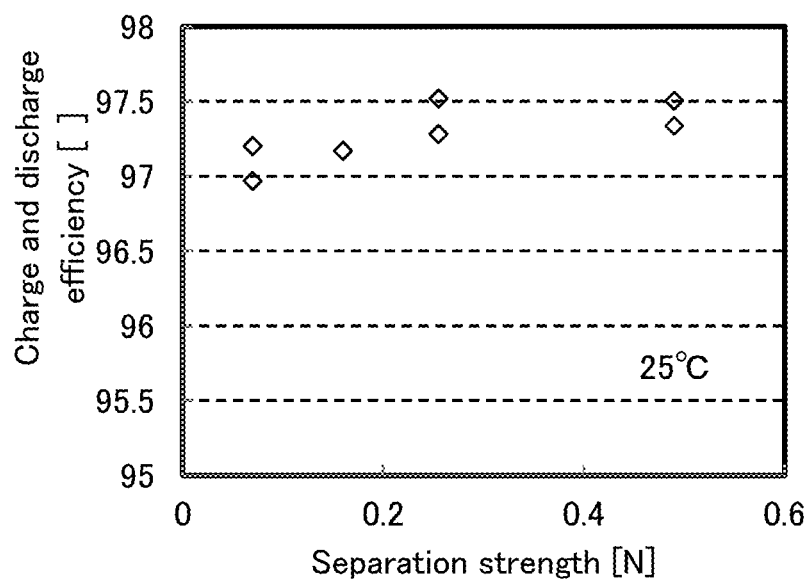
FIGS. 53A and 53B are graphs each showing the relation between separation strength and charge and discharge efficiency.
Figure 53B:
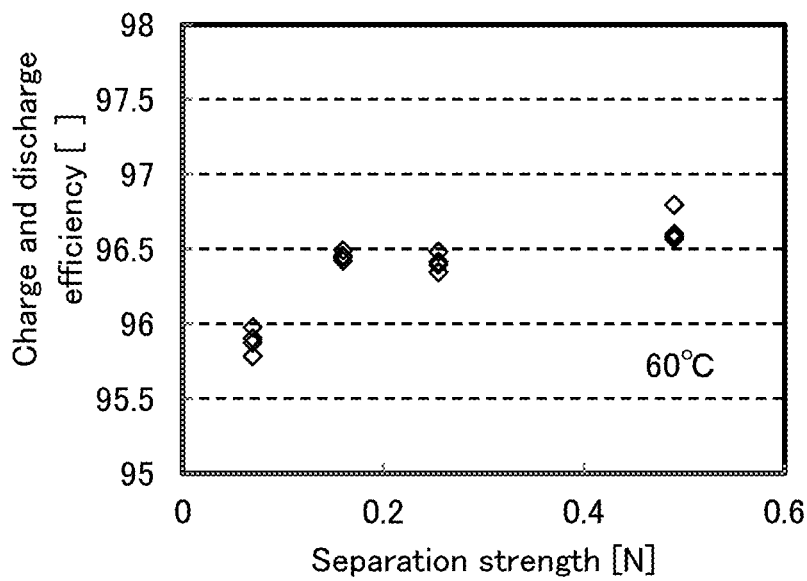

Table 3 lists charge and discharge efficiencies when the electrodes were used. The charge and discharge efficiency shown in Table 3 means the amount of charge (Li deintercalation) with respect to the amount of discharge (Li intercalation). The obtained charge capacity (the capacity at the time of Li deintercalation) is higher than or equal to 310 mAh/g and lower than or equal to 340 mAh/g. The plot in FIG. 53A shows the relation between electrode separation strength and charge and discharge efficiency at 25° C., and FIG. 53B shows the relation between electrode separation strength and charge and discharge efficiency at 60° C. Note that the separation strength on the horizontal axis is the average of the separation strengths of two electrodes that are shown in Table 2.

When the electrode with high separation strength was used, charge and discharge efficiency was high. For example, the average of the charge and discharge efficiencies of Electrodes A-5 to A-8 is 95.9%, whereas that of Electrodes D-5 to D-8 is 96.65%.

Example 2

ICP-MS

In this example, 12 charge and discharge cycles were performed on the half cells using Electrodes A-5, A-6, D-5, and D-6 among the half cells fabricated in Example 1, and the electrodes were analyzed by ICP-MS analysis.

Charging and discharging were performed at 60° C. The first and second charge and discharge cycles were performed as follows: discharging (Li intercalation) was performed in such a manner that constant current discharging was performed at 0.1 C until a lower limit of 0.01 V was reached and then constant voltage discharging was performed at 0.01 V until a lower limit of a current value corresponding to 0.01 C was reached, and after that, constant current charging was performed as charging (Li deintercalation) at 0.1 C until an upper limit of 1 V was reached. The third to twelfth charge and discharge cycles were performed as follows: constant current discharging was performed as discharging (Li intercalation) at 0.2 C, and then constant current charging was performed as charging (Li deintercalation) at 0.2 C until an upper limit of 1 V was reached.

Figure 54A:
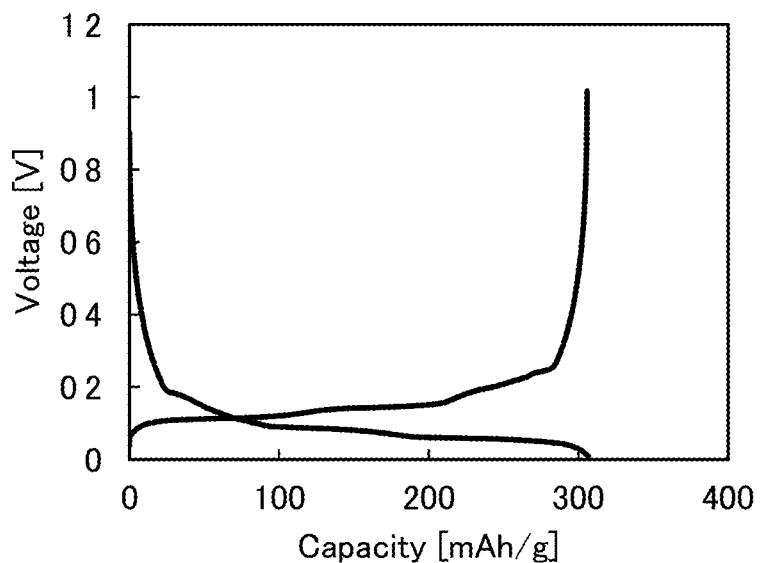
FIGS. 54A and 54B are graphs each showing charge and discharge curves of a half cell.
Figure 54B:
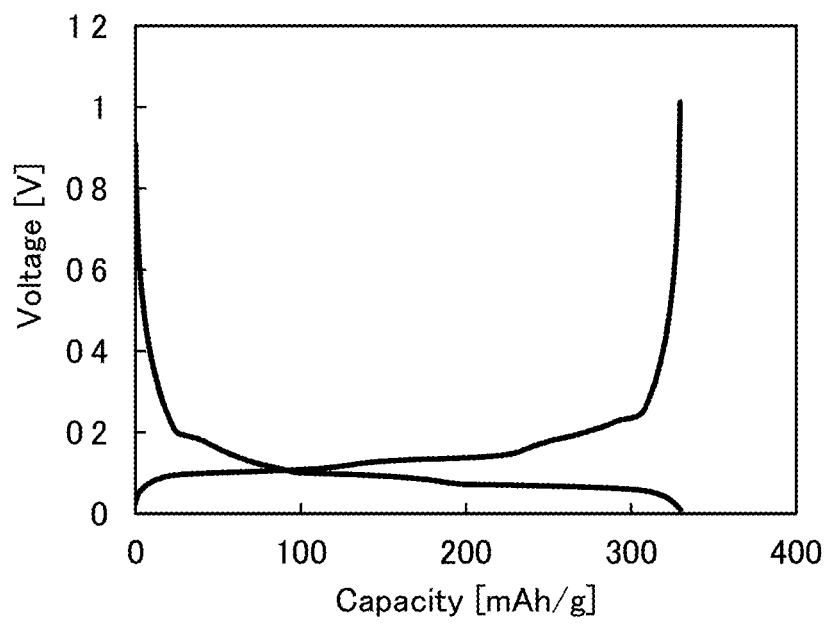

FIGS. 54A and 54B show the results of the twelfth charge and discharge cycle. FIG. 54A shows the results of Electrode A-5, and FIG. 54B shows the results of Electrode D-5.

Next, the half cells were disassembled. The disassembly was performed in an argon atmosphere. Then, washing was performed as follows: washing with acetonitrile was performed once, washing with DMC was performed three times, and after that, the half cells were immersed in DMC and kept for approximately 10 hours.

After that, the active material layer was separated from the current collector with tweezers. The separated active material layer was immersed in an acid solution and then subjected to treatment with microwaves.

ICP-MS analysis was performed on the acid solution in which the active material layer was immersed. The measurement results are shown in Table 4. Note that sample weight shown in Table 4 refers to the weight of the active material layer. Lithium weight with respect to sample weight is 0.0033 and 0.0040 for Electrode A-5 and Electrode A-6, respectively, whereas that is less than or equal to 0.0025 for Electrodes D-5 and D-6 with higher separation strength.

TABLE 4

| Electrode | Sample weight [mg] | Lithium weight [μg] | Lithium weight ÷ sample weight |
|---|---|---|---|
| Electrode A-5 | 4 | 13.0 | 0.0033 |
| Electrode A-6 | 3 | 12.0 | 0.0040 |
| Electrode D-5 | 4 | 10.0 | 0.0025 |
| Electrode D-6 | 3 | 6.7 | 0.0022 |

Example 3

In this example, electrode strength was measured after the electrode fabricated in Example 1 was immersed in an electrolytic solution.

<Immersion of Electrode in Electrolytic Solution>

Two regions with a width of 2.5 cm and a length of 20 cm were stamped out from each of Electrode A and Electrode C. The stamped-out electrodes are referred to as Electrodes A-9, A-10, C-9, and C-10.

Next, a bag formed with an aluminum sheet covered with a resin was prepared. Each of the stamped-out electrodes and Electrolytic Solution B were put in the prepared bag in an argon atmosphere. Then, the bag was sealed in the argon atmosphere. The electrode put in the bag was kept at 60° C. for 96 hours.

Electrolytic Solution B was formed by dissolving 1.2 mol/L of $LiPF_6$ in a solvent in which EC, DEC, and EMC were mixed such that the weight ratio of EC to DEC and EMC was 3:6:1, and adding 0.5 wt % of propanesultone (PS) and 0.5 wt % of VC thereto.

The bag was opened in a glove box filled with argon, and Electrode B was taken out and washed with Solution C. As Solution C, dimethyl carbonate (DMC) was used.

After that, the solvent was volatilized at room temperature and further volatilized under a reduced pressure, in the glove box.

<Separation Test>

Next, a 180° separation test was performed on each of the electrodes. For the test, the conditions described in Example 1 were employed. Table 5 lists the separation strengths of the electrodes. The separation strengths of the electrodes after being immersed in the electrolytic solution are not significantly lower than those of the electrodes that were not immersed in the electrolytic solution as described in Example 1, which is a favorable result. For example, the separation strengths (and the separation strengths normalized by the width of the tape) of Electrodes C-1 and C-2 are 0.25 N (0.13 N/cm) and 0.26 N (0.14 N/cm), respectively, whereas those of Electrodes C-9 and C-10 are both 0.29 N (0.15 N/cm).

TABLE 5

|  | Separation strength [N] |
|---|---|
| Electrode A-9 | 0.06 |
| Electrode A-10 | 0.07 |
| Electrode C-9 | 0.29 |
| Electrode C-10 | 0.29 |

<Composition of Electrode>

Here, the strengths of electrodes with different ratios of the active material to VGCF (registered trademark)-H, CMC-Na, and SBR will be described.

Electrode E and Electrode F with the compositions shown in Table 6 were fabricated. The loading of Electrode E is approximately 9 mg/cm², and that of Electrode F is approximately 6 mg/cm².

TABLE 6

|  | Compounding ratio [weight %] |
|---|---|
| Electrode E | Active Material:VGCF-H:CMC-Na:SBR = 96:1:1:2 |
| Electrode F | Active Material:VGCF-H:CMC-Na:SBR = 94:1:3:2 |

Three regions with a width of 2.5 cm and a length of 20 cm were stamped out from each of Electrode E and Electrode F, and separation tests were performed. Here, an active material layer is formed to have a region with a length of approximately 12 cm.

In the separation tests, a separated portion of a current collector was pulled in the direction of slightly less than 180° (here, approximately 175°), and the force was measured. The obtained separation strengths are shown in Table 7.

TABLE 7

|  | Separation strength [N] |
|---|---|
| Electrode E-1 | 0.20 |
| Electrode E-2 | 0.13 |
| Electrode E-3 | 0.13 |
| Electrode F-1 | 0.60 |
| Electrode F-2 | 0.60 |
| Electrode F-3 | 0.67 |

<Separation Strength after Immersion in Electrolytic Solution>

Next, several regions with a width of 2.5 cm and a length of 20 cm were stamped out from each of Electrode E and Electrode F, and were immersed in a solvent. The electrodes were immersed at 60° C. for approximately 200 hours. As the electrolytic solution, Electrolytic Solution B was used.

The separation strengths of the electrodes after immersion were measured. In separation tests, a separated portion of a current collector was pulled in the direction of slightly less than 175° (here, approximately 175°), and the force was measured. The obtained separation strengths are shown in Table 8.

TABLE 8

|  | Separation strength [N] |
|---|---|
| Electrode E-4 | 0.10 |
| Electrode E-5 | 0.12 |

Here, the separation strength of Electrode F was not able to be measured because the active material layer was separated after the electrode was immersed in the electrolytic solution. The separation strength of Electrode E slightly decreased after the electrode was immersed in the electrolytic solution.

The proportion of CMC-Na in Electrode F is higher than that in Electrode E. Presumably, for example, CMC-Na immersed in the electrolytic solution contains a solution and expands, which weakens the bond between the active material layer and the current collector. Alternatively, CMC-Na immersed in the electrolytic solution might change in quality.

The separation strength of Electrode F before immersion in the electrolytic solution was higher than that of Electrode E, but noticeably decreased after immersion in the electrolytic solution.

Example 4

In this example, separation strength tests for the electrodes of embodiments of the present invention will be described.

<Fabrication of Electrode>

Figure 15:
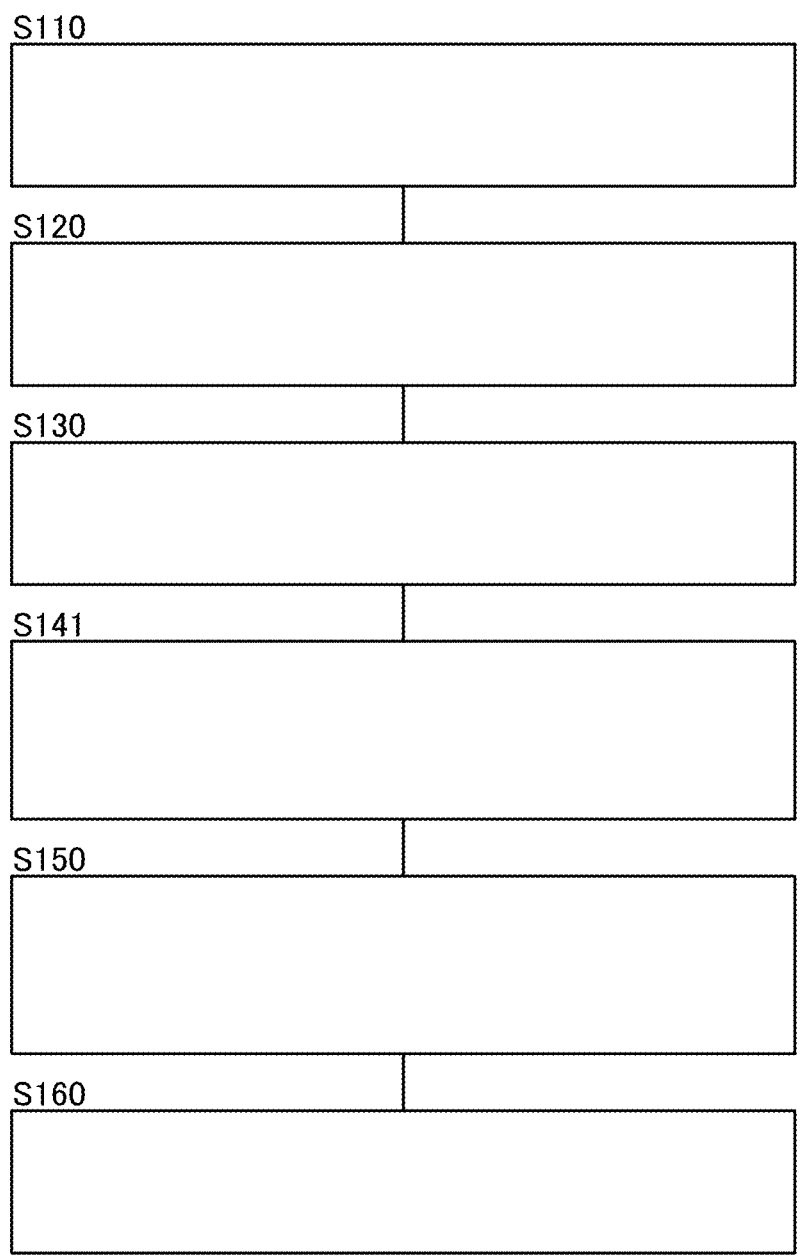
FIG. 15 is a flow chart showing a method for fabricating an electrode.

Slurries used for electrode application were formed based on the flow chart shown in FIG. 15. As the active material, SiO covered with carbon was used. In addition, acetylene black (AB) was used as the conductive additive. As the binder, polyimide was used.

The specific surface area of a SiO particle is 2.1 m²/g. According to analyzation of the particle size distribution using a particle size analyzer, the average of particle sizes is 4.8 μm. Furthermore, the atomic ratio of silicon to oxygen (Si/O) analyzed by TEM-EDX analysis is 0.885.

The steps for forming the slurry will be described. For formation of the slurry, SiO, AB, a precursor of polyimide, and NMP were used. The weight ratio of SiO to AB and polyimide was set to 80:5:15. As the precursor of polyimide, an NMP solution with a concentration of 13.7 wt % was used.

The slurries were formed according to Steps S110 to S160 in FIG. 15. Time for kneading in Step S120 is 40 minutes.

Slurries of Conditions G to I were prepared. Table 9 lists the viscosities of the slurries of Conditions G to I. For the measurement of the viscosities, a rotating viscometer TVE-35H was used. Table 9 lists viscosities at a rotation rate of 100 rpm. Note that the solid content proportion in the slurry is 39% for Condition G, 42% for Condition H, and 40% for Condition I.

TABLE 9

|  | Viscosity [Pa · s] |
|---|---|
| Condition G | 0.97 |
| Condition H | 1.47 |
| Condition I | 0.90 |

Next, the slurries of Conditions G to I shown in Table 9 were used for application to fabricate Electrodes G to K. The slurries used for the electrodes and conditions for heat treatment in a drying furnace used for volatilization of solvents in the slurries are shown in Table 10. Step 1 and Step 2 shown in the heat treatment conditions were successively performed in this order.

TABLE 10

| | Slurry | Condition in drying furnace |
|---|---|---|
| Electrode G | Condition G | Step1: 70° C. 3 min. |
| | | Step2: 90° C. 3 min. |
| Electrode H | Condition H | Step1: 70° C. 5 min. |
| | | Step2: 90° C. 5 min. |
| Electrode I | Condition I | Step1: 40° C. 10 min. |
| | | Step2: 40° C. 10 min. |
| Electrode J | Condition J | Step1: 40° C. 10 min. |
| | | Step2: 40° C. 10 min. |
| Electrode K | Condition K | Step1: 70° C. 10 min. |
| | | Step2: 70° C. 10 min. |

First, the formed slurry was applied to one surface of the current collector. For the application of the slurry, a continuous coater was used. As the current collector, 10-μm-thick stainless steel (YUS190) was used. Subsequently, heat treatment was performed in an air atmosphere using the conditions of the drying furnace that are shown in Table 10.

Through the above steps, Electrodes G to K were obtained. The width and the length of the current collector are 20 cm and 25 cm, respectively. An active material layer was formed to have a region with a width of 12 cm and a length of 25 cm. The loadings of Electrodes G to K are approximately greater than or equal to 2 mg/cm$^2$ and less than or equal to 3 mg/cm$^2$.

<Separation Test>

Next, separation tests were performed on Electrodes G to K. For the separation test, the conditions described in Example 1 were employed. The width of the tape 1005 is 1.9 cm. Note that as illustrated in an example in FIG. 18B, the double-faced tape 1012 was provided between the tape 1006 and the plate 1011, and the tape 1006 was fixed to the plate. Table 11 lists the obtained separation strengths. For example, Electrodes G-1 and G-2 are electrodes stamped out from Electrode G. Electrodes H-1 and H-2 are electrodes stamped out from Electrode H. Electrodes I-1 and I-2 are electrodes stamped out from Electrode I. Electrodes J-1 is an electrode stamped out from Electrode J. Electrodes K-1 and K-2 are electrodes stamped out from Electrode K.

TABLE 11

| | Separation strength [N] |
|---|---|
| Electrode G-1 | 2.45 |
| Electrode G-2 | 2.37 |
| Electrode H-1 | 3.41 |
| Electrode H-2 | 4.10 |
| Electrode I-1 | 6.05 |
| Electrode I-2 | 6.94 |
| Electrode J-1 | 6.96 |
| Electrode K-1 | 3.92 |
| Electrode K-2 | 6.26 |

The separation strengths of Electrodes H-1 and H-2 using slurry with higher viscosity than that of Electrodes G-1 and G-2 are higher than the separation strengths of Electrodes G-1 and G-2, and are specifically 3.41 N (the separation strength normalized by the width of the tape is 1.79 N/cm) and 4.10 N (2.2 N/cm), respectively. The separation strengths of Electrodes I-1 to K-2 fabricated employing a lower heat treatment temperature of a drying furnace than that employed in fabricating Electrodes G-1 and G-2 are higher than the separation strengths of Electrodes G-1 and G-2, and are, for example, 6.05 N (3.2 N/cm) and 6.94 N (3.5 N/cm), respectively.

Next, Electrode G or Electrode I as a negative electrode, a positive electrode, a separator, and an electrolytic solution were prepared to fabricate Storage Batteries G-1, G-2, G-3, G-4, I-1, I-2, I-3, and I-4. Table 12 lists conditions for the negative electrodes of the storage batteries and the loadings of the negative electrodes and the positive electrodes of the storage batteries. The ratios of the capacity of the positive electrode to the capacity of the negative electrode are also shown in Table 12. Here, the capacity ratios were calculated assuming that the capacity per unit weight of a positive electrode active material is 137 mAh/g and the capacity per unit weight of a negative electrode active material is 1800 mAh/g. The capacity ratios of Storage Batteries G-1, G-2, I-1, and I-2 are approximately 0.6, and those of Storage Batteries G-3, G-4, I-3, and I-4 are approximately 0.3.

TABLE 12

| | | Loading [mg/cm$^2$] | | Capacity |
|---|---|---|---|---|
| Storage battery | Negative electrode | Negative electrode | Positive electrode | ratio [%] |
| Storage battery I-1 | Electrode I | 2.1 | 19.4 | 60.6 |
| Storage battery I-2 | Electrode I | 2.1 | 19.6 | 60.0 |
| Storage battery G-1 | Electrode G | 2.2 | 20.9 | 61.2 |
| Storage battery G-2 | Electrode G | 2.2 | 21.1 | 61.7 |
| Storage battery I-3 | Electrode I | 1.8 | 10.1 | 36.7 |
| Storage battery I-4 | Electrode I | 1.8 | 10.4 | 37.3 |
| Storage battery G-3 | Electrode G | 2.1 | 9.9 | 30.7 |
| Storage battery G-4 | Electrode G | 2.1 | 10.2 | 31.2 |

The positive electrode was formed using lithium cobaltate, AB, and PVDF; the weight ratio of lithium cobaltate to AB and PVDF is 90:5:5 (wt %).

The electrolytic solution was formed in such a manner that lithium hexafluorophosphate (LiPF$_6$) was dissolved at a concentration of 1 mol/L in a solution in which EC and DEC were mixed at a volume ratio of 3:7. As a separator, polypropylene was used. An aluminum film covered with a heat sealing resin was used as an exterior body. A positive electrode active material layer and a negative electrode active material layer, which are one pair, were made to face each other with the separator interposed therebetween. The area of the positive electrode active material layer is 20.5 cm$^2$, and that of the negative electrode active material layer is 23.8 cm$^2$.

Next, the charge and discharge cycle performances of the fabricated Storage Batteries G-1, G-2, G-3, G-4, I-1, I-2, I-3, and I-4 were measured. In the first cycle, constant current charging and discharging were performed at a current density of 13.7 mA/g (corresponding to 0.1 C) until an upper limit of 4 V and a lower limit of 2.5 V were reached, and in the second and subsequent cycles, constant current charging and discharging were performed at a current density of 68.5 mA/g (corresponding to 0.5 C) until an upper limit of 4 V and a lower limit of 2.5 V were reached.

Figure 55A:
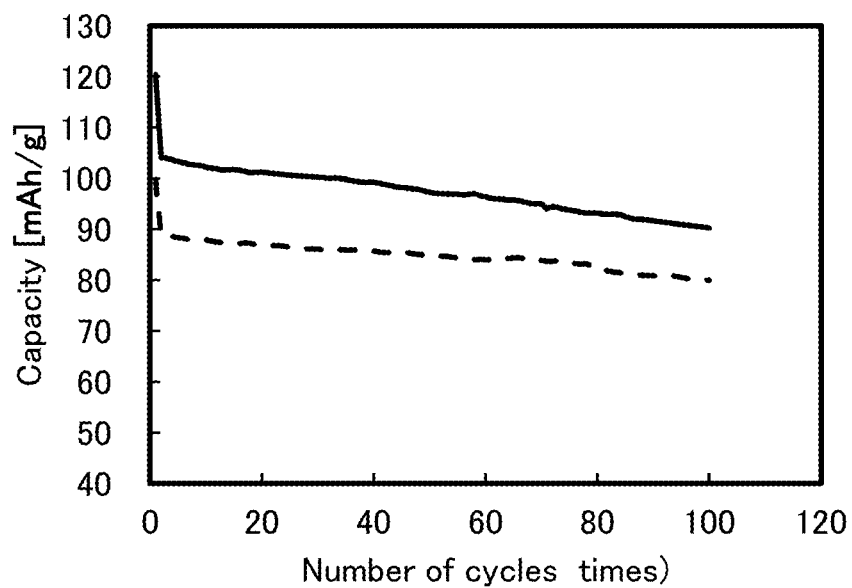
FIGS. 55A and 55B are graphs each showing the relation between charge and discharge cycles and discharge capacity of storage batteries.
Figure 55B:
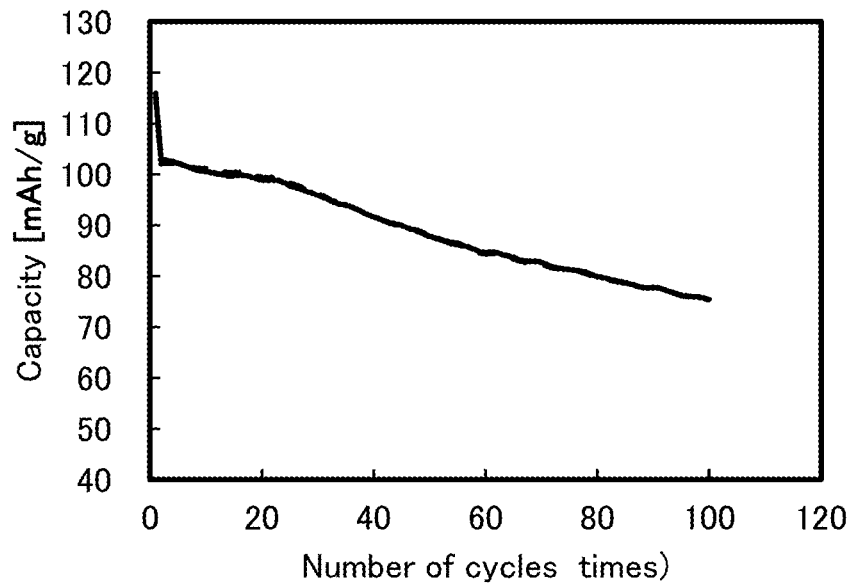
Figure 56A:
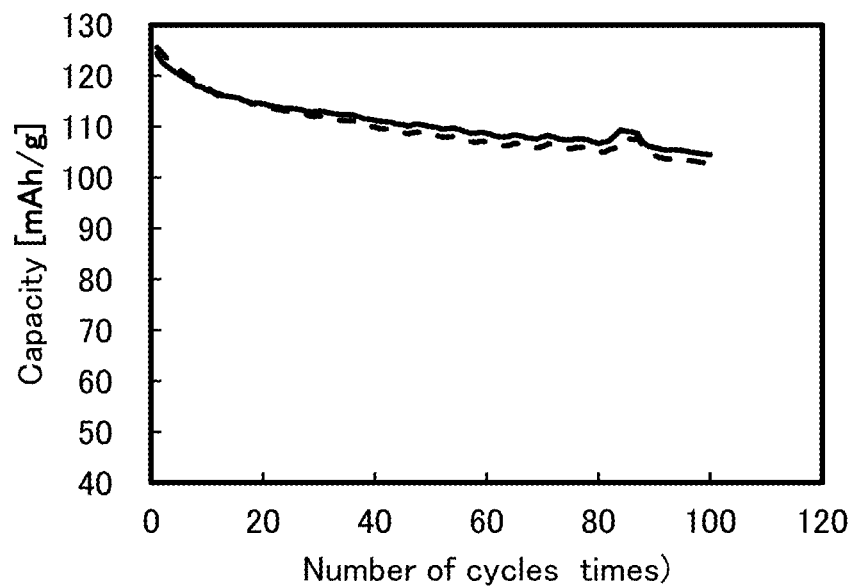
FIGS. 56A and 56B are graphs each showing the relation between charge and discharge cycles and discharge capacity of storage batteries.
Figure 56B:
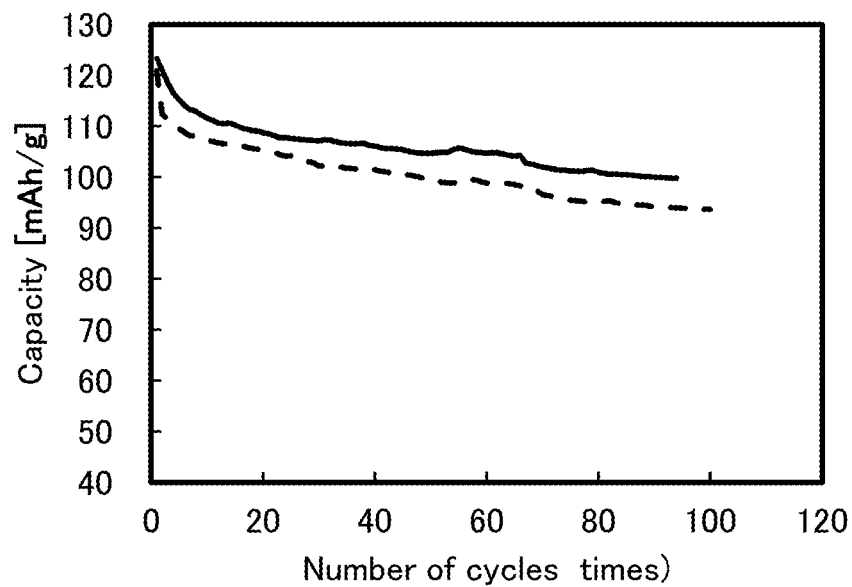

FIG. 55A shows the charge and discharge cycle performances of Storage Battery I-1 (solid line) and Storage Battery I-2 (broken line), FIG. 55B those of Storage Battery G-1 (solid line) and Storage Battery G-2 (broken line), FIG. 56A those of Storage Battery I-3 (solid line) and Storage Battery I-4 (broken line), and FIG. 56B those of Storage Battery G-3 (solid line) and Storage Battery G-4 (broken line). In FIGS. 55A and 55B and FIGS. 56A and 56B, the horizontal axis represents the number of charge and discharge cycles, and the vertical axis represents discharge capacity. A decrease in the capacity of the storage batteries using Electrode I as the negative electrode with the increasing number of cycles is smaller than that of the storage batteries using Electrode G as the negative electrode. The separation strength of Electrode I is higher than that of Electrode G, and the high separation strength presumably inhibits a decrease in adhesion of components of Electrode I with the increasing number of charge and discharge cycles. The storage batteries with higher capacity ratios noticeably have such a tendency. It is suggested that a larger charge and discharge depth of the negative electrode, that is, a larger change in volume due to expansion and contraction of the negative electrode active material more significantly affect the separation strength of the negative electrode.

<EPMA>

Next, cross sections of Electrodes G and I were analyzed by EPMA analysis. The electrodes were processed by an ion polishing method to obtain cross sections, and mapping data of the intensities of silicon, oxygen, nitrogen, and carbon was obtained. As an EPMA apparatus, JXA-8500F manufactured by JEOL Ltd. was used. The acceleration voltage is 8 kV, and the incident beam current is 50 nA.

Figure 57A:
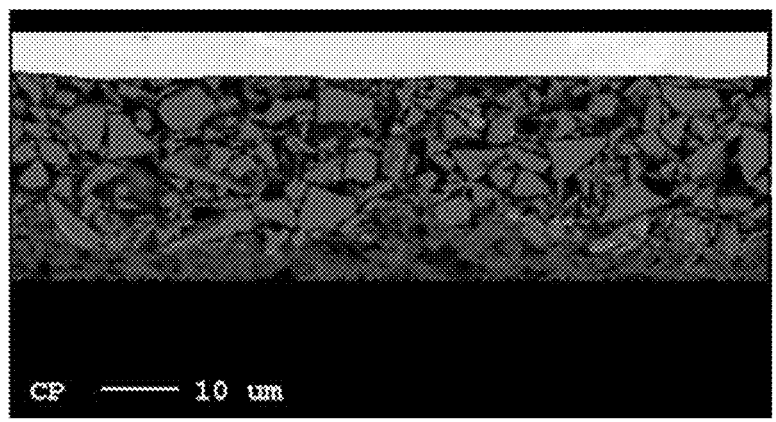
FIGS. 57A to 57C show EPMA analysis results of an electrode.
Figure 57B:
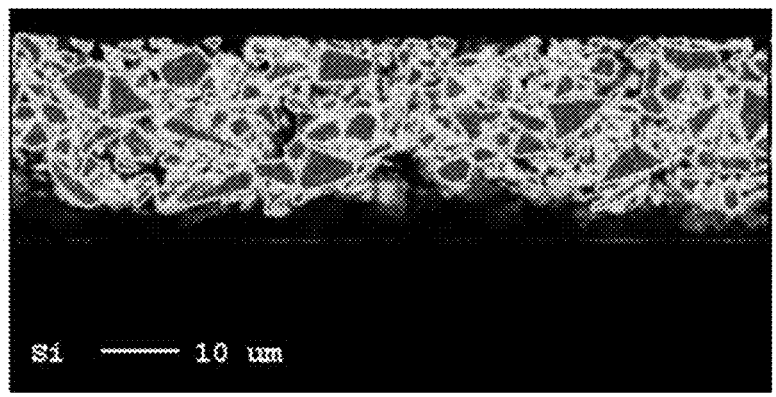
Figure 57C:
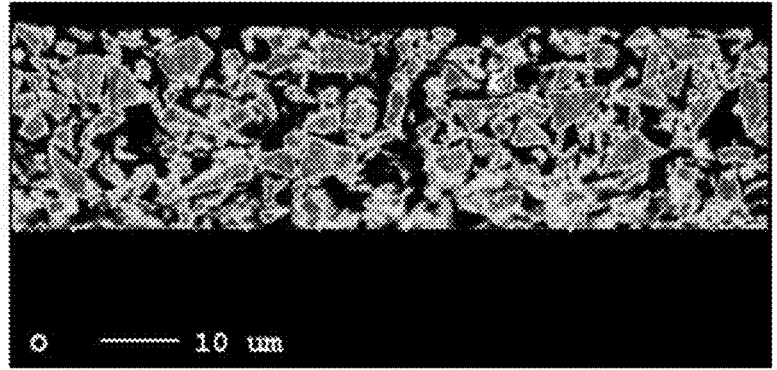
Figure 58A:
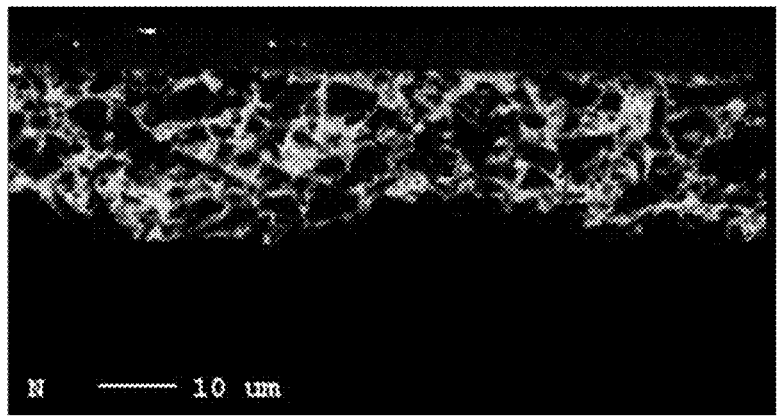
FIGS. 58A and 58B show EPMA analysis results of an electrode.
Figure 58B:
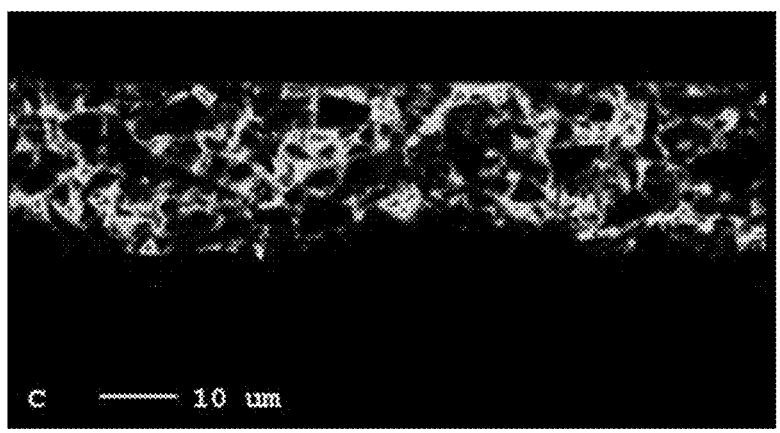
Figure 59A:
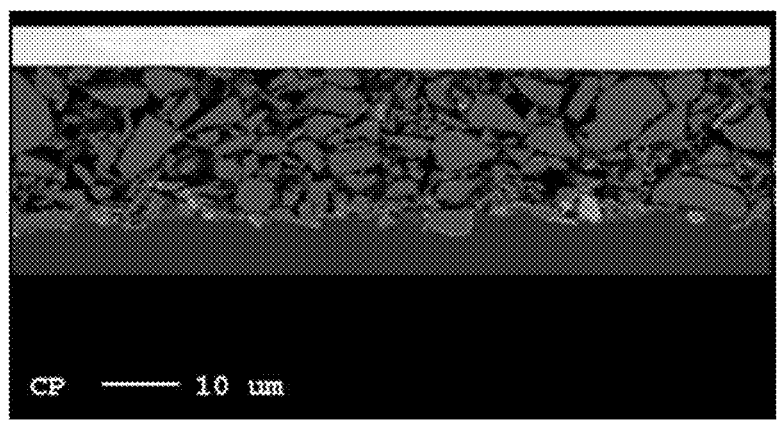
FIGS. 59A to 59C show EPMA analysis results of an electrode.
Figure 59B:
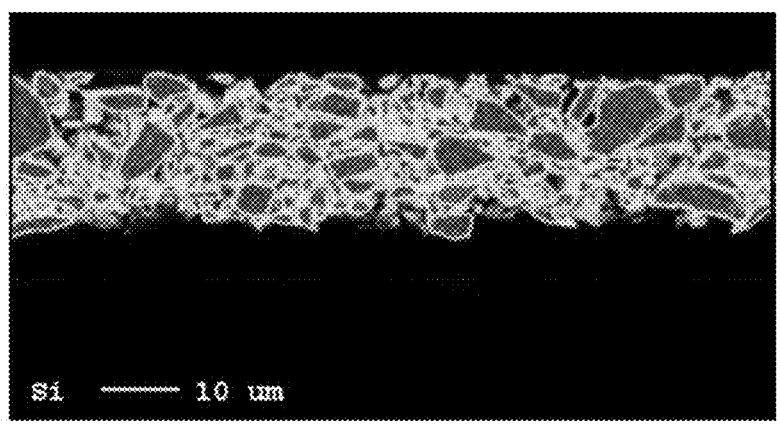
Figure 59C:
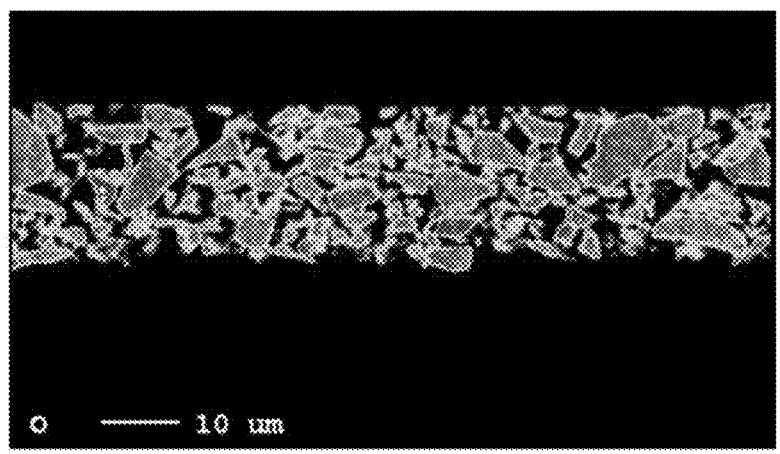
Figure 60A:
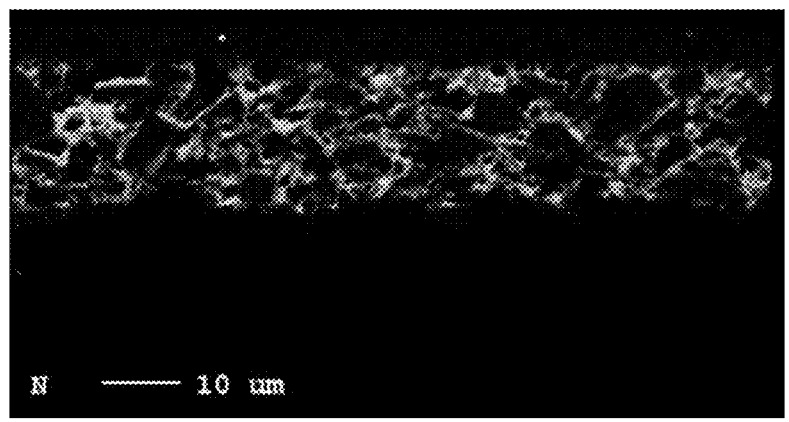
FIGS. 60A and 60B show EPMA analysis results of an electrode.
Figure 60B:
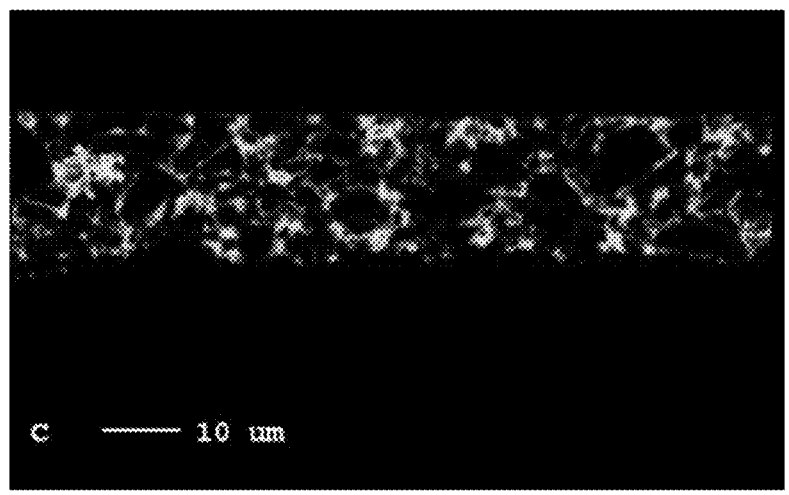

As for Electrode G, FIG. 57A shows a cross-sectional image, FIG. 57B a mapping image of silicon, FIG. 57C a mapping image of oxygen, FIG. 58A a mapping image of nitrogen, and FIG. 58B a mapping image of carbon. As for Electrode I, FIG. 59A shows a cross-sectional image, FIG. 59B a mapping image of silicon, FIG. 59C a mapping image of oxygen, FIG. 60A a mapping image of nitrogen, and FIG. 60B a mapping image of carbon. It is suggested that nitrogen be mainly attributed to polyimide. A bias in sensing intensity of nitrogen in an electrode layer of Electrode I looks smaller than that in an electrode layer of Electrode G.

Figure 63A:
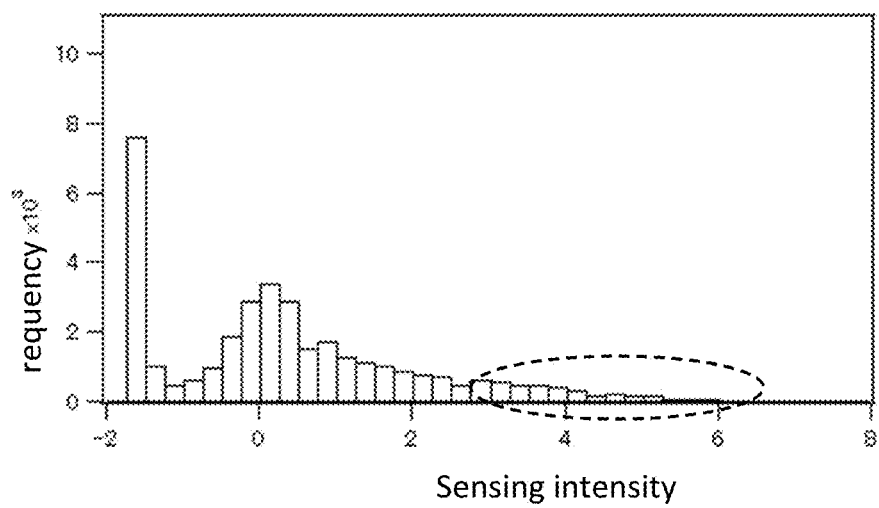
FIGS. 63A and 63B each show the relation between the sensing intensity of nitrogen and frequency.
Figure 63B:
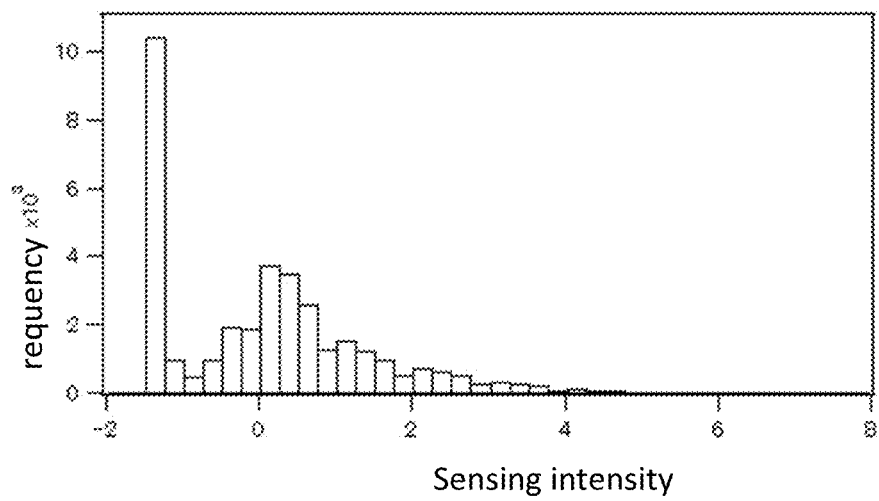

To further examine the biases in sensing intensity of nitrogen, the values of intensities in the plane were used to form histograms. FIG. 63A is a histogram showing the sensing intensity of nitrogen in Electrode G, and FIG. 63B is a histogram showing the sensing intensity of nitrogen in Electrode I. A bias in sensing intensity indicates, for example, that a region with high intensity locally exists. The frequency of regions with high intensity is higher in the histogram in FIG. 63A than in the histogram in FIG. 63B. This implies that a bias in the concentration of polyimide in Electrode I is smaller than that in Electrode G, and thus, Electrode I has a higher separation strength than Electrode G.

Example 5

In this example, a method for fabricating the electrode of one embodiment of the present invention will be described.
<Fabrication of Electrode>

First, slurries used for electrode application were formed. MCMB graphite having a specific surface area of 1.5 m$^2$/g was used as an active material. As a conductive additive, vapor grown carbon fiber (VGCF) (registered trademark)-H (manufactured by SHOWA DENKO K.K., the fiber diameter: 150 nm, the specific surface area: 13 m$^2$/g) was used. For a binder, CMC-Na and SBR were used. The polymerization degree of CMC-Na that was used was 600 to 800, and the viscosity of a 1 wt % of CMC-Na aqueous solution was in the range from 300 mPa·s to 500 mPa·s inclusive.

First, forming processes of the slurries will be described. As the slurries, two kinds of slurries of Conditions Q and R were formed.

First, graphite, VGCF (registered trademark)-H, and CMC-Na were mixed. After that, water was added to the mixture and kneading was performed, so that a resulting mixture in the paste form was obtained. The kneading time is 40 minutes for Condition Q and 100 minutes for Condition R.

Next, water was added to each mixture, and kneading was performed. Then, an SBR aqueous dispersion solution was added, water was further added, and kneading was performed. After that, water was further added and kneading was performed, so that two kinds of slurries of Conditions Q and R were obtained.

Next, the viscosities of the slurries of Conditions Q and R were measured. For the measurement of the viscosities, a rotating viscometer TVE-35H was used. The viscosity of the slurry of Condition Q is 1.07 Pa·s at a rotation rate of 100 rpm, and that of Condition R is 0.86 Pa·s at a rotation rate of 100 rpm.

Next, each of the formed two kinds of slurries was applied to one surface of a current collector. For the application of the slurries, a continuous coater was used. As the current collector, copper with a thickness of 18 μm was used. After that, heat treatment was performed using a drying furnace at 50° C. for two minutes and then performed at 70° C. for two minutes to volatilize a solvent. Through the above steps, electrodes were fabricated. An electrode fabricated using the slurry of Condition Q is referred to as Electrode Q, and an electrode fabricated using the slurry of Condition R is referred to as Electrode R. The weight per unit area of the active material of Electrode Q is 10.5 mg/cm$^2$, and that of Electrode R is 10.4 mg/cm$^2$.
<Separation Test>

Next, a region with a width of 2.5 cm and a length of 20 cm was cut out from each of Electrodes Q and R, and 180° separation tests were performed. Here, the active material layer is formed to have a region with a length of approximately 12 cm.

The separation tests were performed as shown in FIGS. 17A to 17C and FIGS. 18A and 18B described in the above embodiment.

The separation tests were performed as shown in the cross-sectional view in FIG. 18A. First, a Kapton (registered trademark) adhesive tape was attached as the tape 1006 to the active material layer 1002. Then, the current collector 1001 was separated from the active material layer 1002. Then, the tape 1005 was attached to the end of the separated portion of the current collector. After that, the tape was folded at an angle of 180°. The width of the tape 1005 is 1.9 cm. Next, a sample was fixed to the plate 1011 using a Scotch (registered trademark) tape as the tape 1010.

The tape 1006 attached to one surface of the active material layer 1002 was fixed to the plate, the tape 1005 was pulled at a rate of 20 mm/min. to separate the current collector 1001 from the active material layer 1002, and the force at the time was measured. A resin was used as a material of the plate. In that case, the direction in which the tape 1005 was pulled (the direction shown by the arrow 1008) is 180° from the direction in which the current collector was provided (the direction shown by the arrow 1009). The force was measured using EZ graph (produced by SHIMADZU CORPORATION).

Separation strength and separation strength normalized by the tape width are 0.17 N and 0.089 N/cm, respectively, for Electrode Q, and 0.08 N and 0.04 N/cm, respectively, for Electrode R.

Example 6

Cross sections of two electrodes with different separation strengths were observed and elementary analyses of the electrodes were performed.

<Staining Using Osmium Tetroxide>

Next, vapor staining using osmium tetroxide was performed on Electrodes Q and R to stain a double bond portion. By the staining, double bond parts of SBR in Electrodes Q and R reacted with an osmium compound, so that osmium was able to be added to SBR. Here, "SBR having a double bond to which an osmium atom is bonded" refers to a structure in which an osmium atom is bonded to a double bond of SBR cleaved by a reaction between SBR and the osmium compound.

<Cross-Sectional TEM Observation>

Next, the electrodes were processed using a focused ion beam system (FIB) into thin slices. The thickness of each slice is approximately 0.1 μm. After that, cross sections of the slices were observed with a transmission electron microscope (TEM). As a protective film 201 for the processing, a tungsten film was formed. For the TEM observation, H-9000NAR manufactured by Hitachi High-Technologies Corporation was used. The acceleration voltage is 200 kV.

Figure 64:
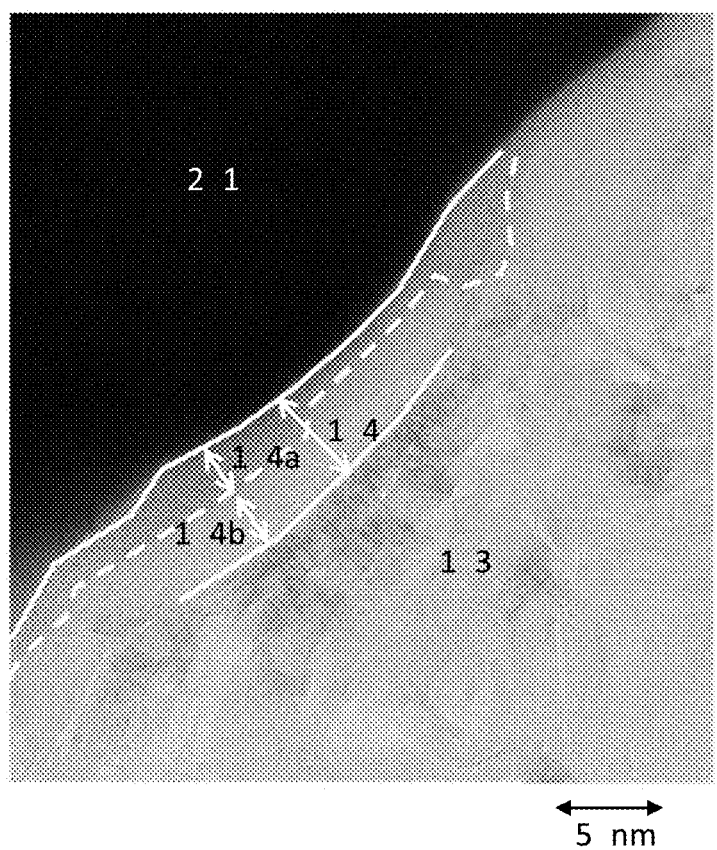
FIG. 64 is a cross-sectional TEM image of an electrode.
Figure 65:
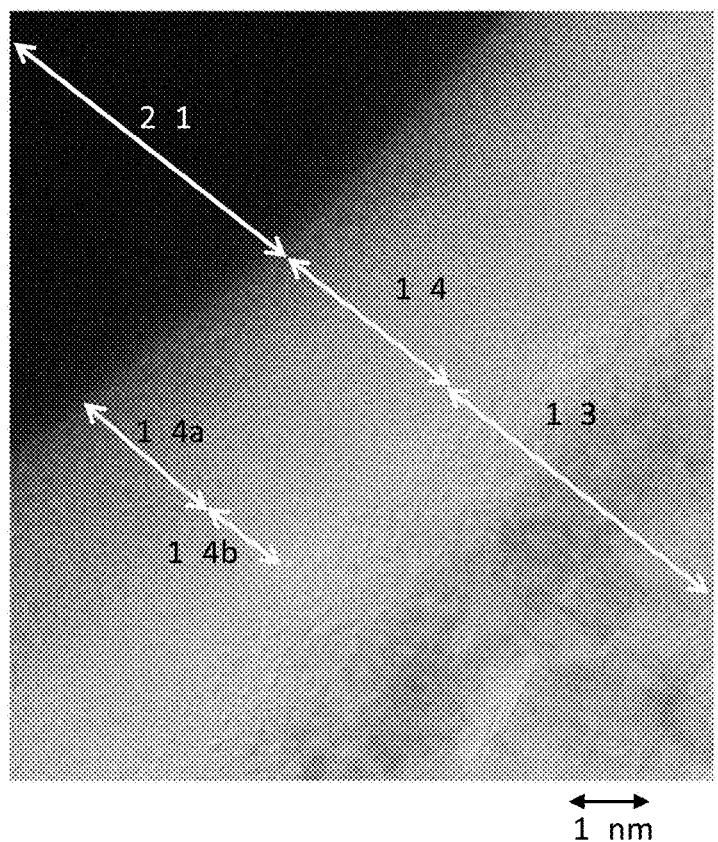
FIG. 65 is a cross-sectional TEM image of an electrode.
Figure 66:
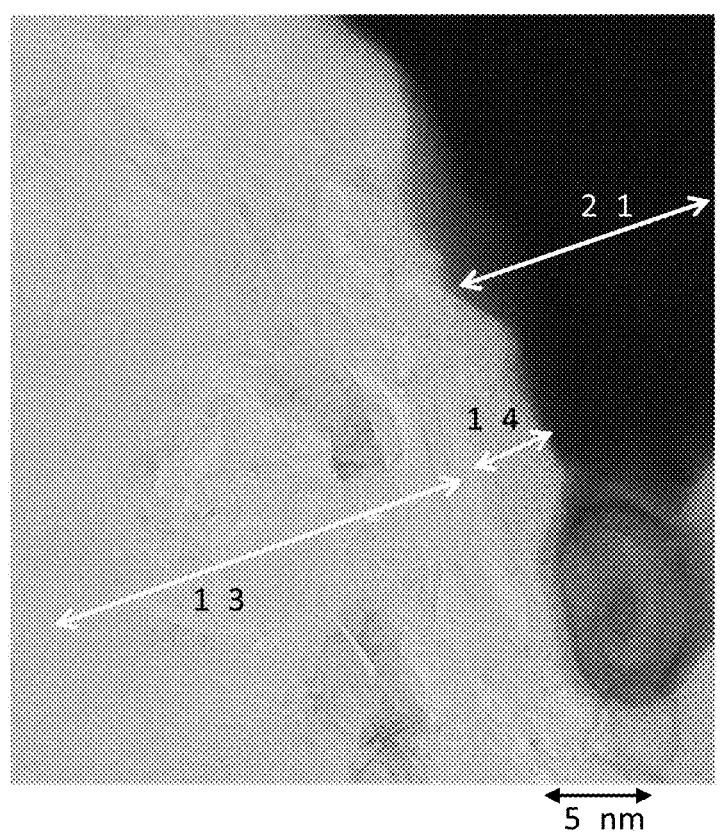
FIG. 66 is a cross-sectional TEM image of an electrode.
Figure 67:
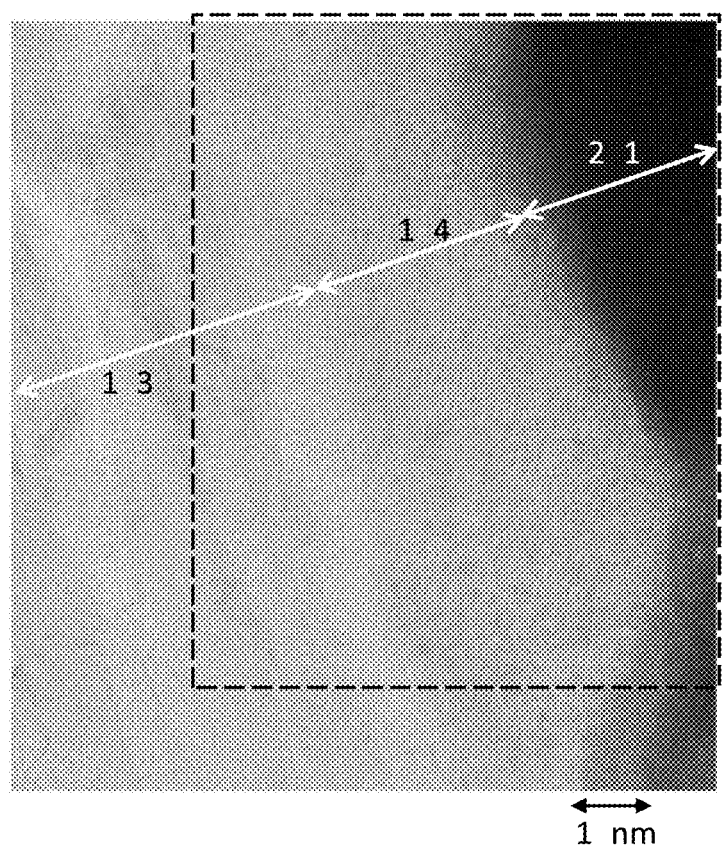
FIG. 67 is a cross-sectional TEM image of an electrode.
Figure 68:
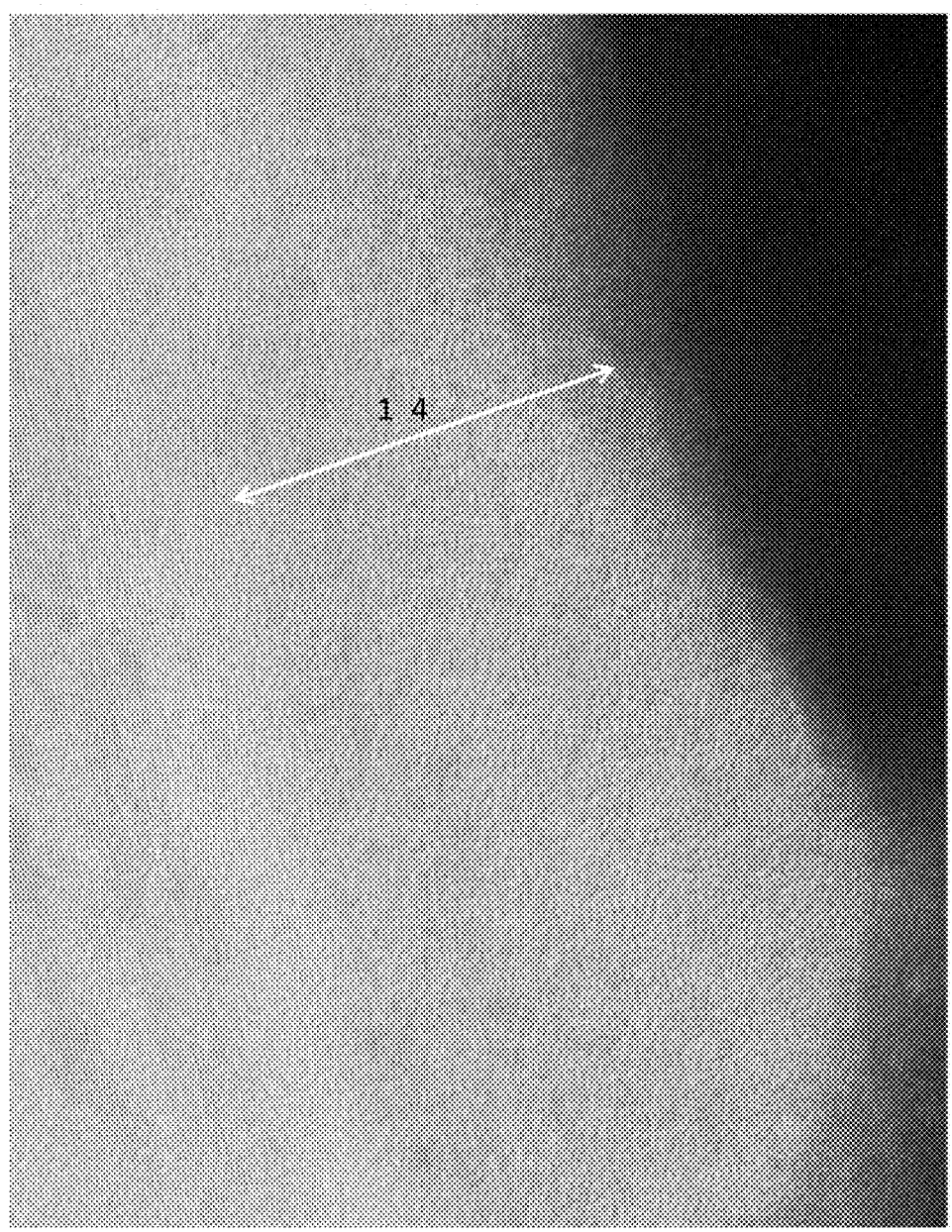
FIG. 68 is a cross-sectional TEM image of an electrode.

FIG. 64 to FIG. 67 show observed cross-sectional TEM images of parts of regions of Electrodes Q and R. FIG. 64 and FIG. 65 show images of Electrode Q observed at a 550,000-fold magnification and at a 2,050,000-fold magnification, respectively. FIG. 66 and FIG. 67 show images of Electrode R observed at a 550,000-fold magnification and at a 2,050,000-fold magnification, respectively. FIG. 68 is an enlarged view of a region surrounded by broken lines in FIG. 67.

As illustrated in FIG. 66 and FIG. 67, Electrode R includes the binder 104 provided on the active material particle 103. The protective film 201 is formed on the binder 104.

The binder 104 is formed in the shape of a layer on the active material particle 103. Furthermore, it is observed that dark regions in contrast with the surrounding region scatter in the layer of the binder 104. The dark regions are presumably regions containing osmium. The regions containing osmium presumably have a higher density than the other region and thus are dark. That is, the regions probably contain a larger amount of "SBR having a double bond to which an osmium atom is bonded" than the surrounding region.

As illustrated in FIG. 64 and FIG. 65, Electrode Q includes the binder 104 provided on the active material particle 103. The protective film 201 is formed on the binder 104. Furthermore, the binder 104 includes the layer 104b on the active material particle 103 and the layer 104a on the layer 104b.

In a region shown by the arrow in the cross section in FIG. 65, the thickness of the binder 104 is 26 nm, that of the layer 104a is 21 nm, and that of the layer 104b is 12 nm.

The layer 104a is a region that is wholly dark compared with the layer 104b. It is observed that dark regions scatter in the layer 104a. The regions probably contain a larger amount of "SBR having a double bond to which an osmium atom is bonded" than the surrounding region. In addition, the layer 104a probably contain a larger amount of "SBR having a double bond to which an osmium atom is bonded" than the layer 104b.

<EDX Analysis>

Next, observation of a HAADF-STEM image of Electrode Q and EDX analysis of Electrode Q were performed with HD-2700 manufactured by Hitachi High-Technologies Corporation. The acceleration voltage was set to 200 kV. The beam diameter is approximately 0.4 nm. As an elementary analyzer, Genesis manufactured by EDAX Inc. was used. As an X-ray detector, a Si/Li semiconductor detector was used.

Figure 69:
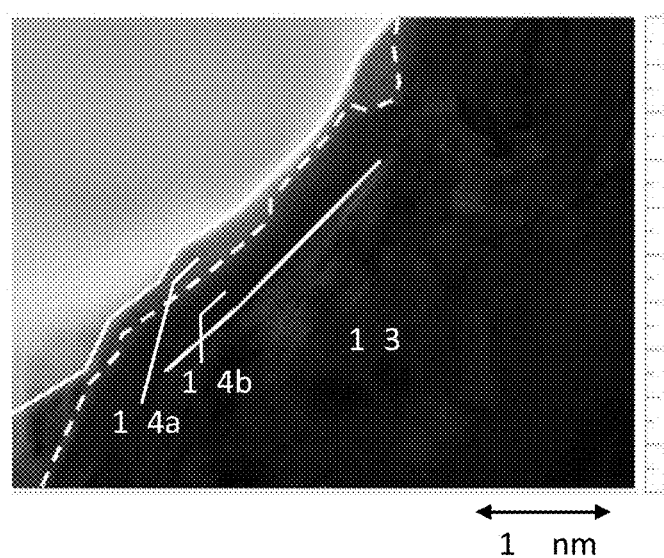
FIG. 69 is a cross-sectional HAADF-STEM image of an electrode.

FIG. 69 shows a HAADF image of Electrode Q. Electrode Q includes the binder 104 on the active material particle 103, and the binder 104 includes the layer 104b on the active material particle 103 and the layer 104a on the layer 104b.

Figure 70A:
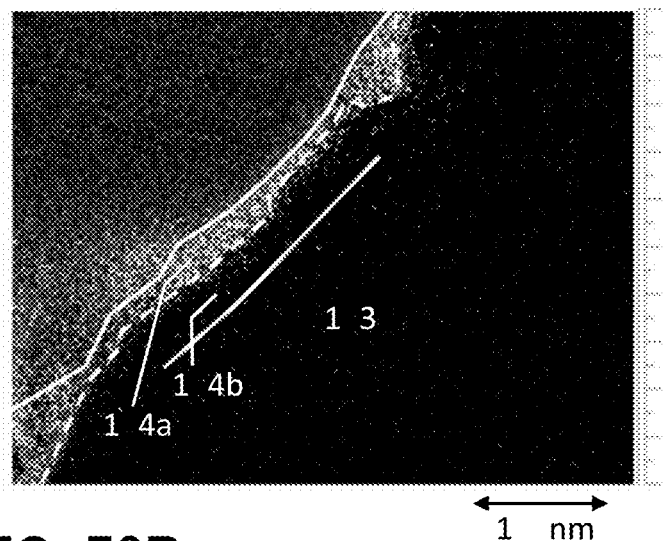
FIGS. 70A and 70B are each an EDX analysis result of a cross section of an electrode.
Figure 70B:
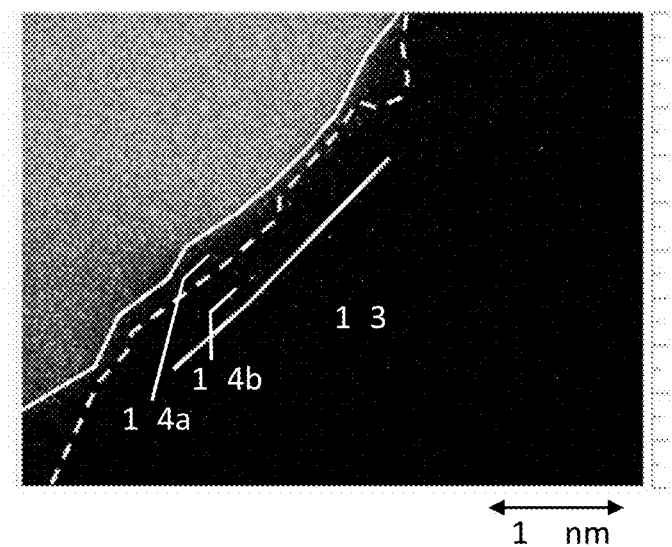
Figure 71A:
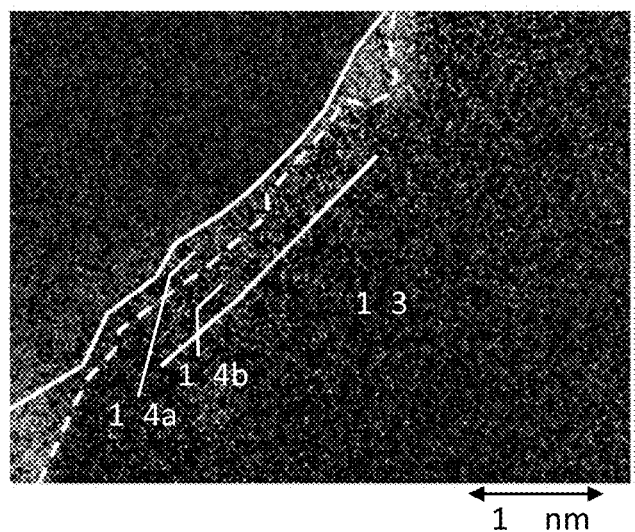
FIGS. 71A and 71B are each an EDX analysis result of a cross section of an electrode.
Figure 71B:
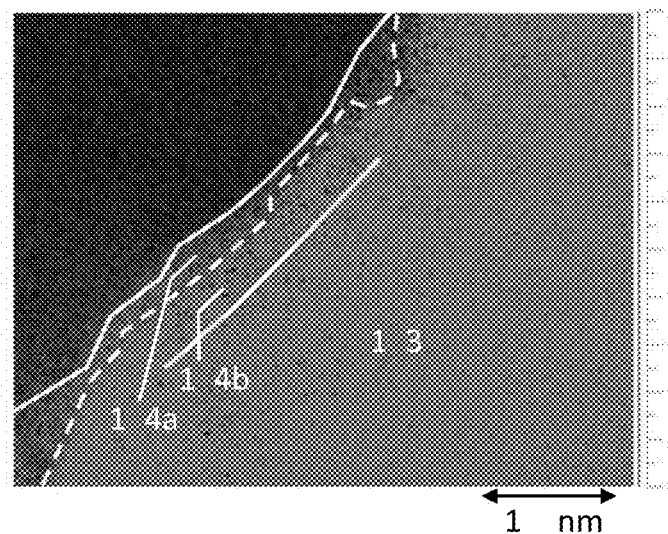

FIGS. 70A and 70B and FIGS. 71A and 71B show EDX analysis results. FIG. 70A shows a mapping image along the Os-L line, FIG. 70B a mapping image along the W-L line, FIG. 71A a mapping image along the O-K line, and FIG. 71B a mapping image along the C-K line.

FIG. 70A shows that the intensity of osmium is higher in the layer 104a than in the layer 104b. Thus, the EDX analysis results also imply that the layer 104a contains a larger amount of "SBR having a double bond to which an osmium atom is bonded" than the layer 104b.

Example 7

In this example, the separation strengths and charge and discharge characteristics of electrodes of embodiments of the present invention will be described.

Graphite, VGCF (registered trademark)-H, CMC-Na, SBR, and water were used to form slurry. The ratio of graphite:VGCF (registered trademark):CMC-Na:SBR was set to 96:1:1:2 (wt %). The proportion of the solid content in the slurry is 59 wt %. As graphite, natural spherical graphite with a specific surface area of 0.85 $m^2/g$ to 1.25 $m^2/g$ and an average particle size of 15 μm to 20 μm was used. The viscosity of slurry used for Condition D1 described later is 1061 mPa·s, and that of slurry used for Conditions D2 to D5 is 864 mPa·s. The viscosities were measured at a rotation rate of 100 rpm with a rotational viscometer TVE-35H.

The formed slurry was applied to one surface of a copper current collector. After that, heat treatment was performed using a drying furnace to fabricate electrodes. As drying conditions, five conditions, Conditions D1 to D5, were employed. As Condition D1, the condition described in Example 1 (treatment at 50° C. is performed for 2 minutes and then treatment at 70° C. is performed for 2 minutes) was used. For Conditions D2 and D4, the drying temperature was set to 40° C., and for Conditions D3 and D5, the drying temperature was set to 75° C. The wind velocity at the time of drying under Conditions D1 to D3 is approximately 13 m/min. to 15 m/min. The wind velocity at the time of drying under Conditions D4 and D5 is approximately 8 m/min. to 9 m/min.

Electrodes that were pressed after drying and electrodes that were not pressed after drying were prepared. The pressing was performed at 120° C. Table 13 lists the densities and the loadings before and after pressing of the electrodes fabricated using Conditions D1 to D5.

TABLE 13

|    | Density [g/cm$^3$] | | Loading [mg/cm$^2$] | |
| --- | --- | --- | --- | --- |
|    | Before Press | After Press | Before Press | After Press |
| D1 | 1.1 | 1.6 | 10.1 | 10.5 |
| D2 | 1.1 | 1.5 | 10.2 | 10.1 |
| D3 | 1.1 | 1.6 | 9.9 | 10.2 |
| D4 | 1.1 | 1.5 | 10.0 | 10.2 |
| D5 | 1.1 | 1.5 | 10.1 | 10.1 |

The fabricated electrodes were subjected to 180° separation tests. The rate of pulling the electrodes is 20 mm/min., and the width of samples is 19 mm. Table 14 lists the obtained separation strengths.

TABLE 14

|    | Separation strength [N] | |
| --- | --- | --- |
|    | Before Press | After Press |
| D1 | 0.11 | 0.33 |
| D2 | 0.11 | 0.31 |
| D3 | 0.11 | 0.22 |
| D4 | 0.32 | 0.99 |
| D5 | 0.25 | 0.86 |

Next, half cells were fabricated using the electrodes of Conditions D1 to D5. An electrolytic solution was formed in such a manner that lithium hexafluorophosphate (LiPF$_6$) was dissolved at a concentration of 1 mol/L in a solution in which EC and DEC were mixed at a volume ratio of 3:7.

Figure 72A:
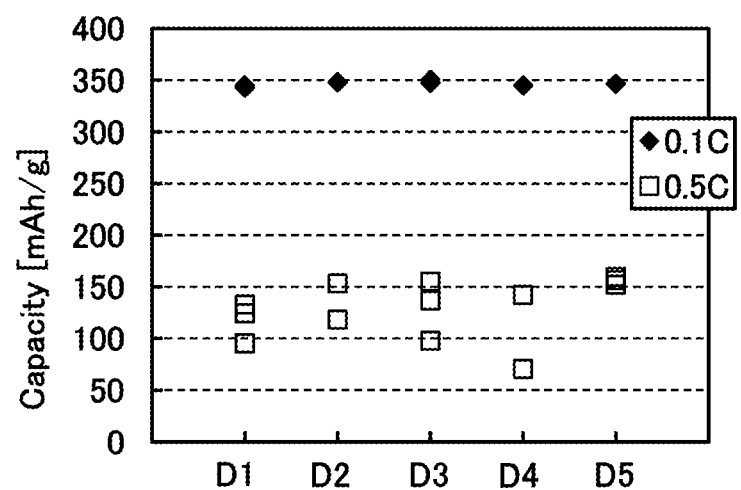
FIGS. 72A and 72B are graphs each showing the capacities of power storage devices.
Figure 72B:
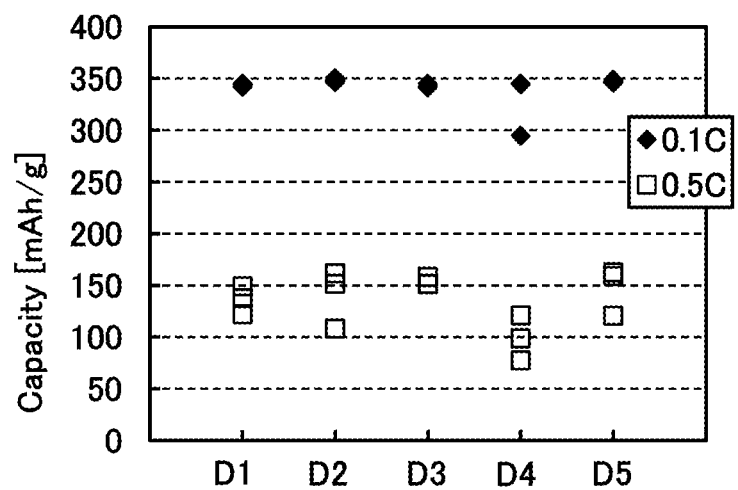

FIGS. 72A and 72B show the capacities of the electrodes when lithium is intercalated at 0.1 C and at 0.5 C. FIG. 72A shows the capacities before pressing, and FIG. 72B shows the capacities after pressing. The current value was set to 372 mA/g at 1 C. As shown in FIGS. 72A and 72B, it is possible to increase the separation strengths while maintaining the rate characteristics.

This application is based on Japanese Patent Application serial no. 2015-102079 filed with Japan Patent Office on May 19, 2015 and Japanese Patent Application serial no. 2015-102080 filed with Japan Patent Office on May 19, 2015, the entire contents of which are hereby incorporated by reference.

What is claimed is:

1. An electrode comprising:
an active material and a first layer,
wherein the first layer contains carbon and oxygen,
wherein the first layer contains unsaturated bonds,
wherein the first layer includes a first region and a second region,
wherein the second region is located on the active material,
wherein the first region is located on the second region, and
wherein a concentration of the unsaturated bonds contained in the second region is lower than a concentration of the unsaturated bonds contained in the first region.

2. The electrode according to claim 1,
wherein the unsaturated bonds and osmium tetroxide are reacted with each other so that osmium is added to the first layer.

3. The electrode according to claim 1,
wherein a value obtained by dividing an amount by mole of the unsaturated bonds contained in the first layer by a sum of the number of carbon atoms and oxygen atoms is larger in the first region than in the second region.

4. The electrode according to claim 1,
wherein a value obtained by dividing an amount by mole of the unsaturated bonds contained in the first layer by a sum of the number of carbon atoms and oxygen atoms in the first region is twice or more and 100 times or less as large as that in the second region.

5. The electrode according to claim 1,
wherein the first layer has a thickness larger than or equal to 1 nm and smaller than or equal to 150 nm.

6. The electrode according to claim 1,
wherein the first region and the second region each have a shape of a layer.

7. The electrode according to claim 1,
wherein the first layer includes a second material; and
wherein the second material is at least one of carboxymethyl cellulose, methyl cellulose, ethyl cellulose, hydroxypropyl cellulose, and diacetyl cellulose.

8. An electronic device comprising a power storage device comprising the electrode described in claim 1.

9. An electrode comprising:
an active material and a first layer,
wherein the first layer includes a first region and a second region,
wherein the first layer includes a first material,
wherein the first material is a diene-based polymer,
wherein the second region is located on the active material,
wherein the first region is located on the second region, and
wherein a concentration of the first material included in the second region is lower than a concentration of the first material included in the first region.

10. The electrode according to claim 9,
wherein a value obtained by dividing an amount by mole of unsaturated bonds contained in the first layer by a sum of the number of carbon atoms and oxygen atoms is larger in the first region than in the second region.

11. The electrode according to claim 9,
wherein a value obtained by dividing an amount by mole of unsaturated bonds contained in the first layer by a sum of the number of carbon atoms and oxygen atoms in the first region is twice or more and 100 times or less as large as that in the second region.

12. The electrode according to claim 9,
wherein the first layer has a thickness larger than or equal to 1 nm and smaller than or equal to 150 nm.

13. The electrode according to claim 9,
wherein the first region and the second region each have a shape of a layer.

14. The electrode according to claim 9,
wherein the first layer includes a second material; and
wherein the second material is at least one of carboxymethyl cellulose, methyl cellulose, ethyl cellulose, hydroxypropyl cellulose, and diacetyl cellulose.

15. An electronic device comprising a power storage device comprising the electrode described in claim 9.

* * * * *